(12) United States Patent
Matsumoto et al.

(10) Patent No.: US 8,169,305 B2
(45) Date of Patent: May 1, 2012

(54) VEHICLE WARNING DEVICE

(75) Inventors: Katsunari Matsumoto, Nishikamo-gun (JP); Takeshi Ishida, Nishikamo-gun (JP); Hirosato Ishigaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1364 days.

(21) Appl. No.: 11/792,379

(22) PCT Filed: Jan. 16, 2006

(86) PCT No.: PCT/JP2006/300909
§ 371 (c)(1),
(2), (4) Date: Jun. 6, 2007

(87) PCT Pub. No.: WO2006/077997
PCT Pub. Date: Jul. 27, 2006

(65) Prior Publication Data
US 2007/0257783 A1 Nov. 8, 2007

(30) Foreign Application Priority Data

Jan. 19, 2005 (JP) ................................ 2005-011798
Jan. 19, 2005 (JP) ................................ 2005-011799
Jan. 19, 2005 (JP) ................................ 2005-011839
Jan. 19, 2005 (JP) ................................ 2005-011854
Mar. 24, 2005 (JP) ................................ 2005-086224

(51) Int. Cl.
*G08B 3/00* (2006.01)
*B60Q 1/00* (2006.01)
*B60Q 1/22* (2006.01)
*G08G 1/16* (2006.01)

(52) U.S. Cl. .................. 340/384.1; 340/384.5; 340/463; 340/459; 340/435; 701/301

(58) Field of Classification Search .................. None
See application file for complete search history.

(56) References Cited

U.S. PATENT DOCUMENTS

| 3,569,927 | A | * | 3/1971 | Guyton et al. ................ 340/463 |
| 6,114,950 | A | * | 9/2000 | Schaible et al. .............. 340/435 |
| 6,406,049 | B1 | * | 6/2002 | Jimison et al. ............. 280/288.4 |
| 6,677,853 | B1 | * | 1/2004 | Canfield .................... 340/384.2 |

(Continued)

FOREIGN PATENT DOCUMENTS

JP U 59-157941 10/1984

(Continued)

OTHER PUBLICATIONS

Office Action issued in corresponding Japanese Patent Application No. 200511799, mailed Jul. 22, 2010. (with English-language translation).

(Continued)

*Primary Examiner* — Julie Lieu
(74) *Attorney, Agent, or Firm* — Oliff & Berridge, PLC

(57) ABSTRACT

A warning device (610) includes a horn A (630) for generating a first horn sound having a volume level satisfying the legal standard and a horn B (632) for generating a second horn sound satisfying at least one of a condition that it has a volume level equal to or lower than that of the first horn sound and a condition that it is of a type different from that of the first horn sound.

23 Claims, 30 Drawing Sheets

U.S. PATENT DOCUMENTS

| | | | |
|---|---|---|---|
| 6,879,248 B2 * | 4/2005 | Flick | 340/435 |
| 6,989,740 B2 * | 1/2006 | Tabe | 340/463 |
| 7,068,155 B2 * | 6/2006 | Kade et al. | 340/436 |
| 7,324,013 B2 * | 1/2008 | Esson | 340/903 |
| 7,463,165 B1 * | 12/2008 | Hessing | 340/903 |
| 7,697,698 B2 * | 4/2010 | Brown | 381/86 |
| 2002/0030591 A1 * | 3/2002 | Paranjpe | 340/436 |
| 2002/0171542 A1 * | 11/2002 | Bloomfield et al. | 340/464 |
| 2005/0046562 A1 * | 3/2005 | Stigall | 340/463 |
| 2006/0119473 A1 * | 6/2006 | Gunderson et al. | 340/435 |

FOREIGN PATENT DOCUMENTS

| | | |
|---|---|---|
| JP | U-63-159785 | 10/1988 |
| JP | A 02-246844 | 10/1990 |
| JP | A 03-292229 | 12/1991 |
| JP | A-5-58219 | 3/1993 |
| JP | A 05-252602 | 9/1993 |
| JP | U 06-037056 | 5/1994 |
| JP | A 07-182587 | 7/1995 |
| JP | A 07-209424 | 8/1995 |
| JP | A 7-244800 | 9/1995 |
| JP | A 10-083187 | 3/1998 |
| JP | A 10-201001 | 7/1998 |
| JP | A 11-139205 | 5/1999 |
| JP | A 11-208307 | 8/1999 |
| JP | A 11-245722 | 9/1999 |
| JP | A 11-288291 | 10/1999 |
| JP | A-11-334468 | 12/1999 |
| JP | A 2001-180430 | 7/2001 |
| JP | A 2001-307249 | 11/2001 |
| JP | A 2002-002424 | 1/2002 |
| JP | A 2002-233001 | 8/2002 |
| JP | A 2002-238101 | 8/2002 |
| JP | A 2002-254984 | 9/2002 |
| JP | U 3094635 | 7/2003 |
| JP | A 2004-153929 | 5/2004 |
| JP | A 2004-322990 | 11/2004 |
| JP | A 2004-357487 | 12/2004 |
| JP | A 2005-278281 | 10/2005 |

OTHER PUBLICATIONS

Office Action issued in Japanese Application No. 2005-011854 on Nov. 17, 2009 (with English translation).

Oct. 27, 2009 Office Action issued in Japanese Patent Application No. 2005-011798 (with translation).

* cited by examiner

F I G. 1 1
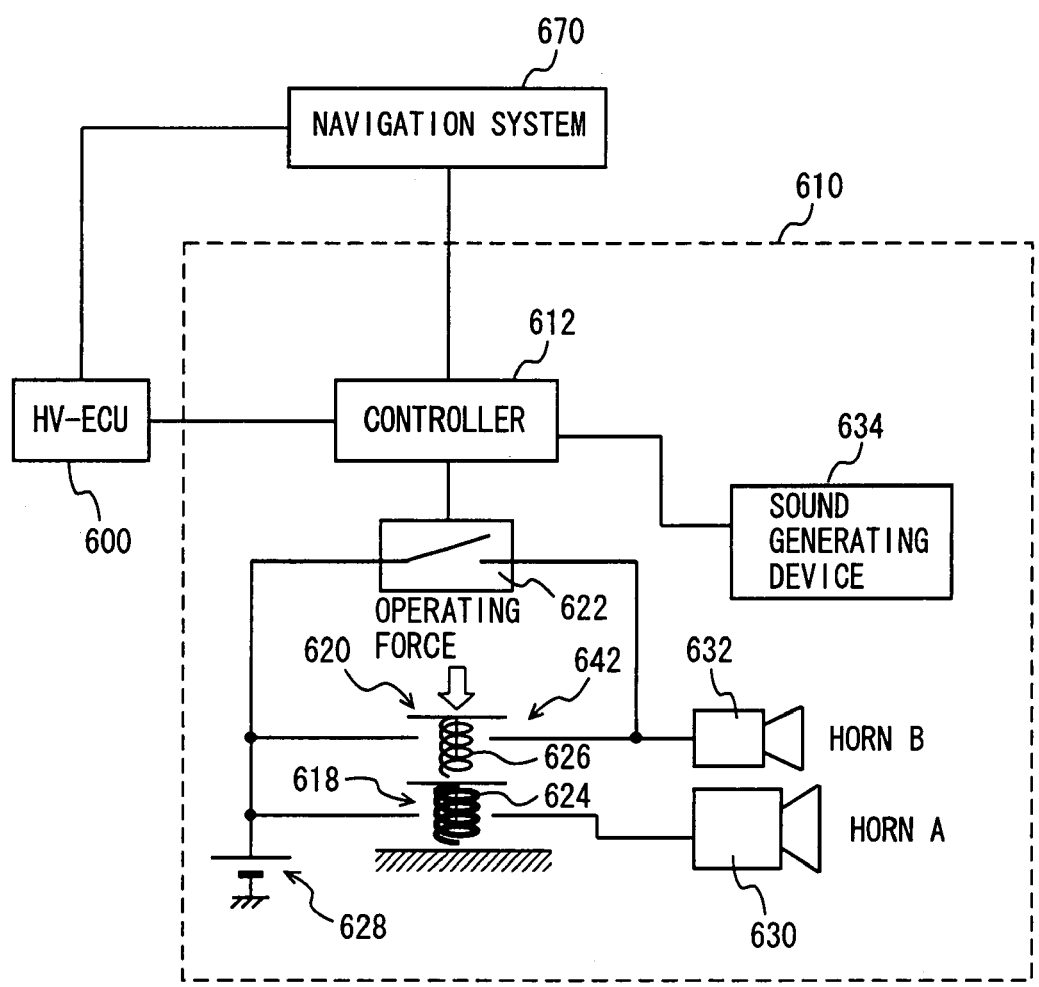

F I G. 1 5
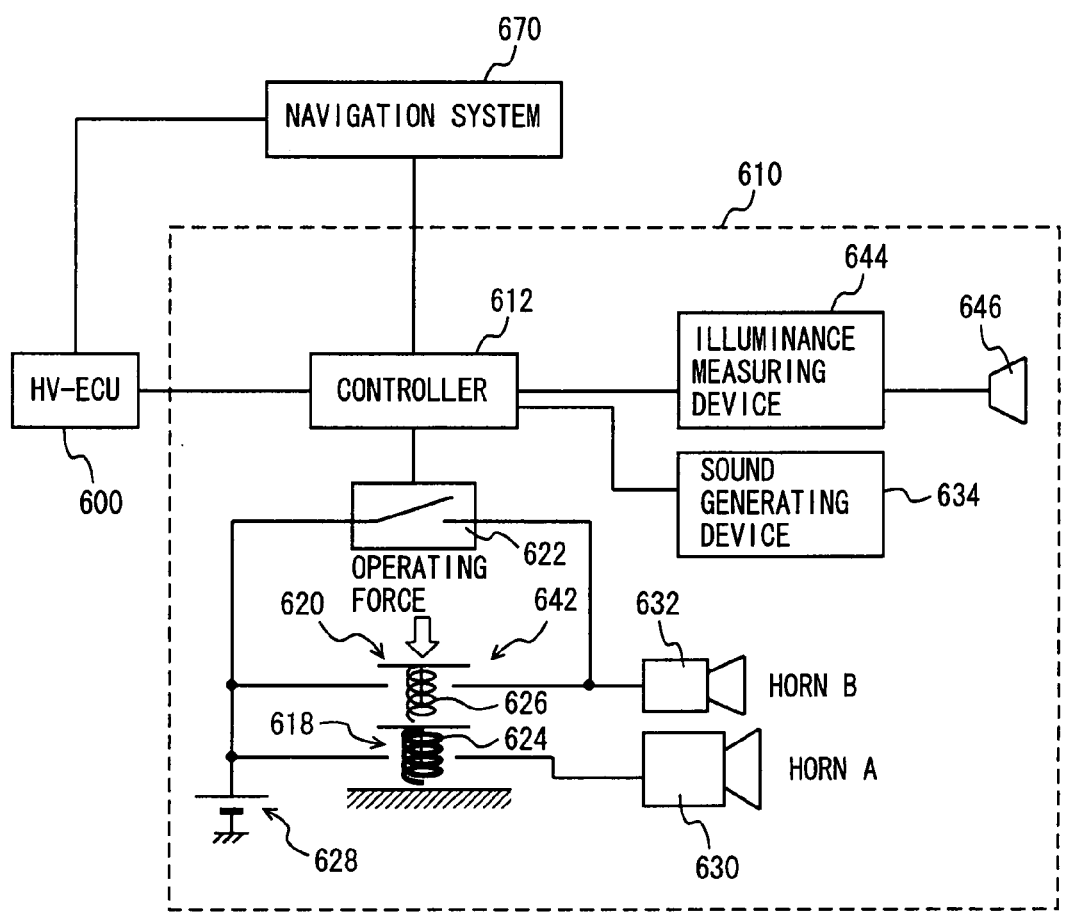

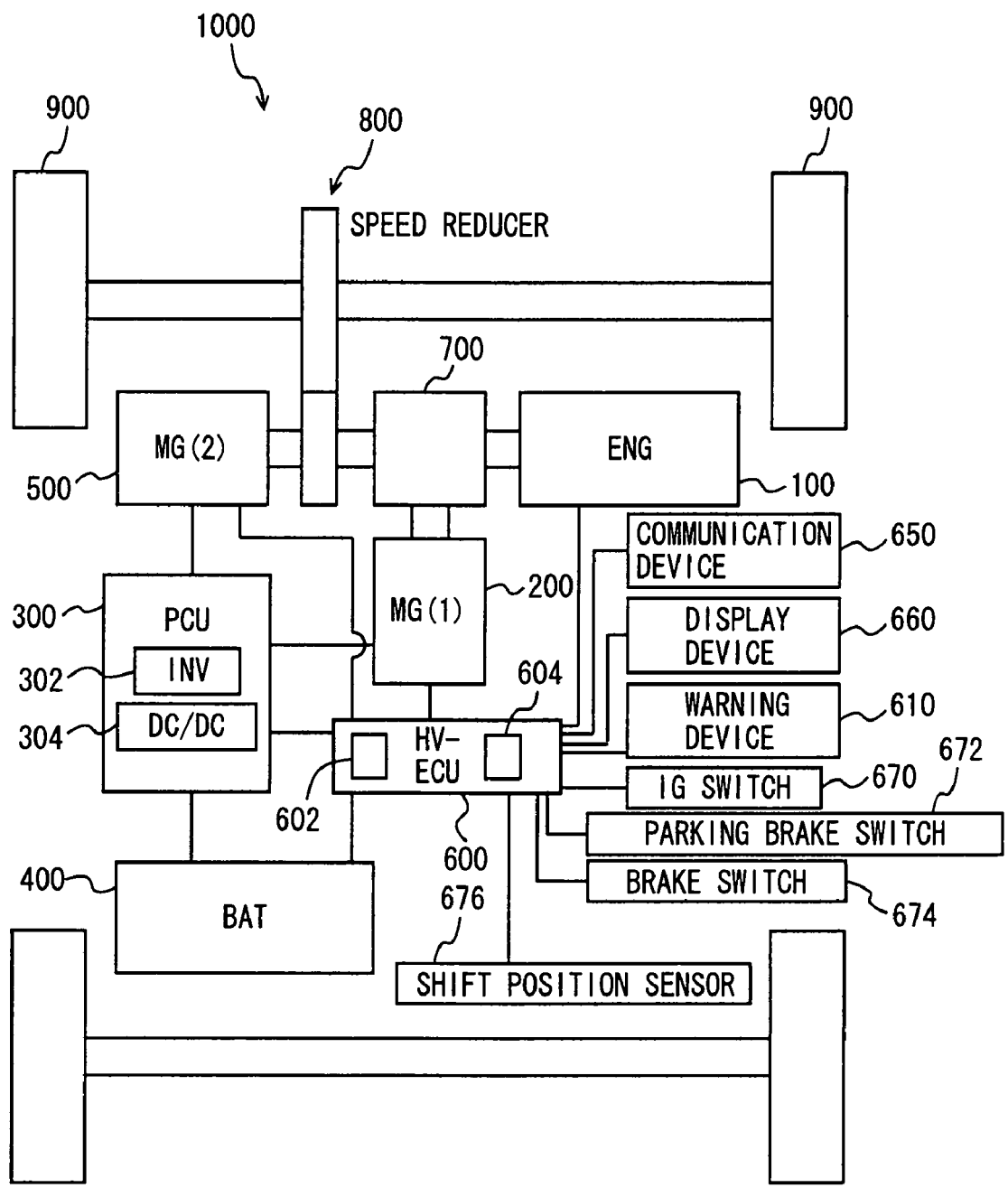
F I G. 2 0

VEHICLE WARNING DEVICE

TECHNICAL FIELD

The present invention relates to a vehicle warning device and particularly to a warning device for attracting attention of people around a vehicle.

BACKGROUND ART

Conventionally, a vehicle is mounted with a warning device for generating a warning for another vehicle, a pedestrian, or the like around the vehicle. A volume level of the warning is set of such a level as to satisfy the legal standard in order to make the warning recognized by a driver in another vehicle. As a result, pedestrians may feel that the volume level is excessively high in some cases.

In view of such a problem, there is a vehicle audible alarm device of an automobile or the like as disclosed in Japanese Utility Model Registration No. 3094635, for example, in which a volume level can be adjusted to produce a sound in an arbitrary volume level range in an audible range according to a place and time. This vehicle audible alarm is formed of a main audible alarm for producing a sound at a volume level set in a range of legal standard values and an audible alarm for pedestrians and a quiet audible alarm for producing sounds at volume levels lower than the main audible alarm and in an audible range. The vehicle audible alarm device can whistle and produce a sound while arbitrarily switching among the main audible alarm, the audible alarm for pedestrians, and the quiet audible alarm.

With the vehicle audible alarm device disclosed in the above-described gazette, the audible alarm for pedestrians can whistle and produce the sound to thereby call attention of pedestrians or passersby on bicycles and the like to approach of a vehicle such as an automobile to prevent danger. Moreover, especially in midnight residential areas and near medical facilities, educational facilities, and the like such as hospitals and schools where quiet is desired, the quiet audible alarm can whistle and produce the sound to thereby call attention of pedestrians or passersby on bicycles and the like in these areas to approach of a vehicle such as an automobile to prevent danger except when an audible alarm at a high volume level is absolutely necessary due to sudden danger or to prevent an accident.

In recent years, as one of measures for environmental issues, a hybrid car, a fuel-cell vehicle, an electric car, and the like which travel by a driving force from a motor are receiving attention. Because an operating sound of the motor is quieter than an engine operating sound in such a vehicle when it travels by the motor, it becomes necessary to make presence of the own vehicle recognized by another vehicle or pedestrians around the vehicle.

In view of such a problem, there is a hybrid vehicle for preventing pedestrians and the like from becoming less likely to notice approach of the vehicle when the vehicle travels only by a driving force of an electric motor as disclosed in Japanese Patent Laying-Open No. 2004-153929. The hybrid vehicle includes an engine and the electric motor for generating the driving force for the vehicle, a driving force source switching means for controlling a switch between generating sources of the driving force, and a vehicle approach informing means for generating a sound for informing an outside of the vehicle of approach of the vehicle when the driving force source switching means switches the generating source of the driving force to the electric motor.

With the hybrid vehicle disclosed in the above-described gazette, it is possible to prevent the pedestrians, passengers of light vehicles, and the like, for example, from becoming less likely to notice approach of the hybrid vehicle when the hybrid vehicle travels by obtaining the driving force from the electric motor.

There is also a pedestrian danger sensing system for an electric car or the like and for preventing an accident of a pedestrian caused by reduction of traveling noise due to introduction of the electric car by an inexpensive device as disclosed in Japanese Patent Laying-Open No. 2002-2424. The pedestrian danger sensing system is provided with an external volume level automatic measuring and sensing device controlled by a computer. The pedestrian danger sensing system generates automatically-variable mimic traveling noise according to a traveling environment from a speaker. The pedestrian danger sensing system senses an object by using a laser beam in a mountain-ringed region or in a low traffic area. The pedestrian danger sensing system automatically makes a switch to an object sensor by using a radio wave at the center of downtown or in a high traffic area. The pedestrian sensing system generates an emergency danger sound for a pedestrian or the like from the speaker to avoid a sudden accident and warns the pedestrian or the like by a sound transmitted from the vehicle to a cellular phone or the like to avoid a sudden accident.

The pedestrian danger sensing system disclosed in the above-described gazette is advantageous in that it is disposition of a device for contributing to prevention of a new type of traffic accident caused by introduction of the electric car, that the system can be formed readily by using existing devices, and that the system itself can readily utilize new technologies when a car navigation system and the new technologies are introduced.

Moreover, there is also a pedestrian danger sensing system for an electric car or the like and for preventing an accident of a pedestrian caused by reduction of traveling noise due to introduction of the electric car by an inexpensive device as disclosed in Japanese Patent Laying-Open No. 2002-2424. The pedestrian danger sensing system is provided with an external volume level automatic measuring and sensing device controlled by a computer. The pedestrian danger sensing system generates automatically-variable mimic traveling noise according to a traveling environment from a speaker. The pedestrian danger sensing system senses an object by using a laser beam in a mountain-ringed region or in a low traffic area. The pedestrian danger sensing system automatically makes a switch to an object sensor by using a radio wave at the center of downtown or in a high traffic area. The pedestrian sensing system generates an emergency danger sound for a pedestrian or the like from the speaker to avoid a sudden accident and warns the pedestrian or the like by a sound transmitted from the vehicle to a cellular phone or the like to avoid a sudden accident.

The pedestrian danger sensing system disclosed in the above-described gazette is advantageous in that it is disposition of a device for contributing to prevention of a new type of traffic accident caused by introduction of the electric car, that the system can be formed readily by using existing devices, and that the system itself can readily utilize new technologies when a car navigation system and the new technologies are introduced.

Because such a situation is not taken into consideration in Japanese Patent Laying-Open No. 2002-2424, there is a possibility that a person unexpectedly approaches the vehicle as described above.

Furthermore, in Japanese Patent Laying-Open No. 1083187, in a hybrid vehicle traveling in a plurality of operation modes, a dummy sound similar to an engine sound in traveling by using an engine as a power source is generated in a motor traveling mode in which the vehicle travels by using only an electric motor as the power source. Thus, it is possible to make existence of the own vehicle recognized by people around the vehicle and to prevent a sense of discomfort in passengers aroused by a change in the sound of the power source due to the operation mode.

There is also a technique for reducing a volume level of a dummy engine sound or silencing the sound so as to carefully listen to sounds in surroundings when an electric car is positioned in an area where the car is guided by a navigation system, a guidance area, an urban area, a vicinity of a railroad crossing, and the like as disclosed in Japanese Patent Laying-Open No. 2002-233001.

When a hybrid vehicle mounted with an engine and a driving electric motor travels by a driving force of the driving electric motor, an operating sound of the driving source is quieter than that in case of traveling by a driving force of the engine in some cases. Therefore, when the hybrid vehicle travels by the driving force of the driving electric motor, people around the vehicle may not notice existence of the vehicle. As a result, occasions of giving warnings become frequent. If the warnings at a volume level high enough to satisfy the legal standard are generated frequently, such warnings make people around the vehicle unpleasant. Because the vehicle audible alarm device disclosed in Japanese Utility Model Registration No. 3094635 is made without making provision for the hybrid vehicle, the above-described problem is not taken into consideration.

Moreover, in the hybrid vehicle, if the warning is generated when noise generated from the vehicle during operation of an internal combustion engine is loud, the people around the vehicle recognizes existence of the vehicle based on the noise generated from the vehicle and therefore generation of the warning may become unnecessary. Moreover, if the vehicle travels in an urban area, for example, there are many people around the vehicle. Therefore, if unnecessary warnings are generated frequently in such an area, the warnings make the people around the vehicle unpleasant.

In the hybrid vehicle disclosed in Japanese Patent Laying-Open No. 2004-153929, the switch is made to the driving force of the electric motor when the vehicle comes into a predetermined location to generate the warning and therefore the above-described generation of unnecessary warnings is not taken into consideration.

Moreover, if the warning is set to be generated when the object is detected, there is a possibility that the warnings are generated frequently. For example, in the urban area, there are many people around the vehicle and therefore the frequently generated warnings may make the people around the vehicle unpleasant. Especially, in case of the hybrid vehicle, the noise generated from the vehicle is loud during operation of the internal combustion engine and therefore it is possible to make the existence of the vehicle recognized by the people around the vehicle without generating the warning, which causes a problem of generation of unnecessary warnings.

Because the pedestrian danger sensing system disclosed in Japanese Patent Laying-Open No. 2002-2424 is made without making provision for the hybrid vehicle, the unnecessary warnings are generated as described above.

Furthermore, when the sound of the driving source is quiet, it is necessary to make the existence or a start of the vehicle recognized by the people around the vehicle earlier in order to allow the vehicle to start more safely. If the people around the vehicle recognize the existence or start of the vehicle late when the vehicle starts, there is a possibility that the people unexpectedly approach the vehicle.

Moreover, if the vehicles generating sounds other than traveling noise travel in a group, the sounds generated from the respective vehicles overlap each other and may make surrounding people unpleasant. For example, in a quiet residential area and the like, such a situation may worsen a residential environment.

Especially when music and melodies are generated from the vehicle, the people around the vehicles are expected to feel the vehicles extremely noisy. Therefore, it is preferable that a vehicle such as a hybrid car having a mechanism of generating a sound for making existence of the vehicle recognized by surrounding people is provided with a mechanism for controlling the generated sound according to the surrounding situation.

DISCLOSURE OF THE INVENTION

It is an object of the present invention to provide a vehicle warning device for attracting attention of people around a hybrid vehicle without making them unpleasant during traveling of the vehicle.

It is another object of the invention to provide a warning-device for attracting attention of people around the hybrid vehicle according to noise generated from the vehicle.

It is yet another object of the invention to provide a vehicle warning device for attracting attention of surrounding people according to a traveling state of the hybrid vehicle.

It is yet another object of the invention to provide a vehicle warning device for making existence of the vehicle recognized earlier than a start of the vehicle.

It is yet another object of the invention to suppress unpleasantness caused for surrounding people in a vehicle warning device capable of outputting a sound other than a traveling noise to surroundings of the vehicle.

According to an aspect of the invention, there is provided a vehicle warning device, the vehicle mounted with a driving electric motor and an internal combustion engine. The vehicle warning device includes a first horn portion for generating a first horn sound having a volume level satisfying the legal standard and a second horn portion for generating a second horn sound satisfying at least one of a condition that it has a volume level equal to or lower than that of the first horn sound and a condition that it is of a different type from the first horn sound.

With this invention, the warning device includes the first horn portion for generating the first horn sound having the volume level satisfying the legal standard and the second horn portion for generating the second horn sound satisfying at least one of the condition that it has the volume level equal to or lower than that of the first horn sound and the condition that it is of the different type from the first horn sound (e.g., a gentle tone less irritant to a human auditory sense). As a result, if the second horn sound is generated by the second horn portion when an operating sound of a driving source is quiet (e.g., during traveling by a driving force of a driving electric motor) during traveling of a vehicle (e.g., a hybrid vehicle) mounted with the driving electric motor and an internal combustion engine, it is possible to make existence of the vehicle recognized by people around the vehicle. Because the second horn sound satisfies at least one of the condition that it has the volume level equal to or lower than that of the first horn sound and the condition that it is the gentle tone, it is possible to attract attention of the people around the vehicle without making them unpleasant even if the second horn sound is generated frequently. Therefore, it is possible to provide the vehicle warning device that can attract attention of the surrounding people without making them unpleasant during traveling of the hybrid vehicle.

It is preferable that the vehicle warning device further includes a control portion for controlling the second horn portion. The control portion controls the second horn portion to generate the second horn sound during traveling by a driving force of the driving electric motor.

With this invention, the control portion controls the second horn portion to generate the second horn sound during traveling by the driving force of the driving electric motor. In this way, by generating the second horn sound when the operating sound of the driving source is quiet, e.g., during traveling of the vehicle by the driving force of the driving electric motor, it is possible to make existence of the vehicle recognized by people around the vehicle. Because the second horn sound satisfies at least one of the condition that it has the volume level equal to or lower than that of the first horn sound and the condition that it is of the type different from the first horn sound (e.g., the gentle tone less irritant to the human auditory sense), it is possible to attract attention of the people around the vehicle without making them unpleasant even if the second horn sound is generated frequently. Moreover, because the second horn sound can be generated without operation by a driver during traveling of the vehicle by the driving force of the driving electric motor, it is possible to lighten an operation load for the driver.

It is further preferable that the control portion controls the second horn portion to generate the second horn sound at the start time of the vehicle.

With this invention, the control portion controls the second horn portion to generate the second horn sound at the start time of the vehicle. For example, if the vehicle is started by the driving force of the driving electric motor when the parked vehicle starts, noise generated from the vehicle is quiet. Therefore, by generating the second horn sound at the start time of the vehicle, it is possible to make existence of the vehicle recognized by the people around the vehicle.

It is further preferable that the vehicle warning device further includes a person detecting portion for detecting a person around the vehicle. The control portion controls the second horn portion to generate the second horn sound if the person is detected during traveling of the vehicle.

With this invention, the control portion controls the second horn portion to generate the second horn sound if the person around the vehicle is detected during traveling of the vehicle. In this way, it is possible to make existence of the vehicle recognized by the person around the vehicle while suppressing generation of unnecessary horn sounds.

It is further preferable that the warning device further includes an illuminance detecting portion for detecting illuminance around the vehicle. The control portion suppresses generation of the second horn sound according to the detected illuminance.

With this invention, the control portion suppresses generation of the second horn sound according to the detected illuminance (e.g., illuminance corresponding to the nighttime). For example, frequent generation of the horn sound in residential areas in the nighttime may make residents around the vehicle unpleasant. Therefore, by suppressing generation of the second horn sound at detection that it is the nighttime, it is possible to prevent the residents around the vehicle from feeling unpleasant.

It is further preferable that the vehicle is mounted with a parking brake device. The warning device further includes an actuation detecting portion for detecting actuation of the parking brake device. The control portion controls the second horn portion to generate the second horn sound during traveling of the vehicle if actuation has been detected until a predetermined time has elapsed.

With this invention, the control portion controls the second horn portion to generate the second horn sound during traveling of the vehicle if actuation of the parking brake device has been detected until the predetermined time has elapsed. If the operating sound of the driving source is quiet when the vehicle starts traveling from a parked state, there is a possibility that the people around the vehicle do not notice existence of the vehicle. Therefore, by generating the second horn sound when the vehicle starts traveling after the vehicle has been parked for the predetermined time, it is possible to make existence of the vehicle recognized by the people around the vehicle to attract their attention.

It is further preferable that the warning device further includes a state detecting portion for detecting a state of the vehicle related to noise generated from the vehicle and a control portion for controlling the second horn portion. The control portion controls the second horn portion to generate the second horn sound according to the state during traveling of the vehicle.

With this invention, the control portion controls the second horn portion to generate the second horn sound during traveling of the vehicle according to the state (e.g., an engine speed, a vehicle speed) related to the noise generated from the vehicle. In this way, even if the noise generated from the vehicle is quiet during traveling of the vehicle, it is possible to make existence of the vehicle recognized by the people around the vehicle by generating the second horn sound. Because the second horn sound satisfies at least one of the condition that it has the volume level equal to or lower than that of the first horn sound and the condition that it is of the type different from the first horn sound (e.g., the gentle tone less irritant to the human auditory sense), it is possible to attract attention of the people around the vehicle without making them unpleasant even if the second horn sound is generated frequently. Moreover, because the second horn sound can be generated without operation by the driver during traveling of the vehicle, it is possible to lighten the operation load for the driver.

It is further preferable that the state detecting portion includes a vehicle speed detecting portion for detecting a vehicle speed of the vehicle.

With this invention, the state detecting portion includes the vehicle speed detecting portion for detecting the vehicle speed of the vehicle. If the vehicle speed reduces, the noise generated from the vehicle such as pattern noise of tires becomes quiet. Therefore, by controlling the second horn portion to generate the second horn sound when the vehicle speed is low (e.g., lower than a predetermined vehicle speed) during traveling of the vehicle, it is possible to make existence of the vehicle recognized by the people around the vehicle when the noise generated from the vehicle is quiet.

It is further preferable that the state detecting portion includes a speed detecting portion for detecting a speed of the internal combustion engine.

With this invention, the state detecting portion includes the speed detecting portion for detecting the speed of the internal combustion engine. If the speed of the internal combustion engine reduces, the operating sound of the internal combustion engine becomes quiet and therefore the noise generated from the vehicle becomes quiet. Therefore, by controlling the second horn portion to generate the second horn sound when the speed is low (e.g., lower than a predetermined speed) during traveling of the vehicle, it is possible to make existence of the vehicle recognized by the people around the vehicle when the noise generated from the vehicle is quiet.

It is further preferable that the vehicle warning device further includes an operating portion provided at a periphery of a passenger's seat of the vehicle for operating the second horn portion.

With this invention, because it is possible to operate the second horn portion in the passenger's seat of the vehicle, a passenger seated in the passenger's seat can generate the second horn sound to make the existence of the vehicle recognized by the people around the vehicle, for example.

It is further preferable that the vehicle warning device further includes an operating portion for operating the first horn portion and the second horn portion. The operating portion includes a generating portion for generating at least one of the first horn sound and the second horn sound according to an operating force.

With this invention, the operating portion generates at least one of the first horn sound and the second horn sound according to the operating force. Because it is possible to generate at least one of the first horn sound and the second horn sound by properly using the operating forces applied to the one operating portion, operability can be improved.

It is further preferable that the first horn portion includes a first horn sound generating portion for generating the first horn sound when it is electrically connected to a power supply mounted in the vehicle. The second horn portion includes a second horn sound generating portion for generating the second horn sound when it is electrically connected to the power supply. The operating portion includes a first conducting portion for electrically connecting the first horn portion and the power supply when a predetermined or greater operating force is applied and a second conducting portion for electrically connecting the second horn portion and the power supply if the operating force is smaller than the predetermined force.

With this invention, it is possible to generate the first horn sound when the predetermined or greater operating force is applied to the operating portion and it is possible to generate the second horn sound if the operating force is smaller than the predetermined force. Therefore, it is possible to properly use the first horn sound and the second horn sound by properly using the operating forces applied to the one operating portion. In this way, it is possible to improve operability.

It is further preferable that the vehicle warning device further includes a notification portion provided in an interior of the vehicle for notifying that the second horn sound is being generated.

With this invention, the notification portion is provided in the interior of the vehicle and notifies that the second horn sound is being generated. Because the second horn sound has the volume level lower than that of the first horn sound or of the type different from the first horn sound (e.g., the gentle tone less irritant to the human auditory sense) when it is generated, it is difficult for the driver to know whether or not the second horn sound is being generated. Therefore, by notifying that the second horn sound is generated by the notification portion, the driver can know that the second horn sound has been generated. Furthermore, if the second horn sound is set to be generated when a person is detected, for example, the driver can recognize that there is the person around the vehicle based on the notification by the notification portion.

It is further preferable that the notification portion notifies that the second horn sound is being generated by displaying information on generation of the second horn sound on a display device.

With this invention, the notification portion notifies that the second horn sound is being generated by displaying information on generation of the second horn sound on the display device. In this way, the driver can know that the second horn sound has been generated. Moreover, if the second horn sound is set to be generated when a person is detected, for example, the driver can recognize that the person exists around the vehicle based on the display on the display device.

It is further preferable that the notification portion notifies that the second horn sound is being generated by a sound generating device for generating a predetermined type of sound in the interior of the vehicle.

With this invention, the notification portion notifies that the second horn sound is being generated by a sound generating device for generating a predetermined type of sound (e.g., melody) in the interior of the vehicle. In this way, the driver can know that the second horn sound has been generated. Moreover, if the second horn sound is set to be generated when a person is detected, for example, the driver can recognize that the person exists around the vehicle based on the notification by the sound generating device.

It is further preferable that the vehicle is mounted with a communication device that can communicate with a base station outside the vehicle. The warning device further includes a receiving portion for receiving data corresponding to a type of the sound via the communication device and a type setting portion for setting the type of sound based on the received data.

With this invention, the warning device receives data corresponding to the type of the sound (e.g., melody) via the communication device and sets the type of sound based on the received data. In this way, it is possible to set the melody desired by the driver as the type of sound for notifying generation of the second horn sound in the vehicle interior.

According to another aspect of the invention, there is provided the vehicle warning device, the device being for the vehicle mounted with the driving electric motor and the internal combustion engine. The warning device includes a warning portion for generating a warning to surroundings of the vehicle, a detecting portion for detecting a present location of the vehicle, a state detecting portion for detecting a state of the vehicle related to noise generated from the vehicle, and a control portion for controlling the warning portion to generate the warning. The control portion includes a warning control portion for controlling the warning portion to generate the warning according to the state if the location of the vehicle satisfies a predetermined condition during traveling of the vehicle. The vehicle is mounted with a horn device for generating the first horn sound. The warning portion generates the second horn sound satisfying at least one of a condition that it has a volume level equal to or lower than that of the first horn sound and a condition that it is of a different type from the first horn sound.

With this invention, the control portion controls the warning portion to generate the warning according to the state (e.g., an operating state of the driving source, a speed of the internal combustion engine, and a vehicle speed) if the location of the vehicle satisfies a predetermined condition (e.g., a condition that the location of the vehicle is in a predetermined range of distance from a location entered in advance) during traveling of the vehicle. In this way, by generating the warning when the vehicle approaches the entered location (e.g., school) when the noise generated from the vehicle is quiet (e.g., during traveling of the vehicle by the driving force of the driving electric motor) during traveling of the vehicle, it is possible to make existence of the vehicle recognized by people around the entered location to attract their attention.

Moreover, by not generating the warning when the vehicle approaches the entered location if the noise generated from the vehicle is loud (e.g., when the speed of the internal combustion is high), it is possible to make existence of the vehicle recognized to attract attention by the noise generated from the vehicle. As a result, it is possible to suppress generation of unnecessary warnings. Therefore, it is possible to provide the warning device for attracting attention of the people around the vehicle according to the noise generated from the hybrid vehicle.

It is preferable that the state detecting portion further includes a traveling state detecting portion for detecting that the vehicle is traveling by a driving force of the driving electric motor.

With this invention, the control portion controls the warning portion to generate the warning during traveling by the driving force of the driving electric motor. In this way, by generating the warning when the vehicle approaches the entered location (e.g., school) when the noise generated from the vehicle traveling by the driving force of the driving electric motor is quiet, it is possible to make existence of the vehicle recognized by people around the vehicle to attract their attention. Moreover, because the warning can be generated without operation by the driver during traveling of the vehicle by the driving force of the driving electric motor, it is possible to lighten the operation load for the driver.

It is further preferable that the state detecting portion includes a vehicle speed detecting portion for detecting the vehicle speed of the vehicle.

With this invention, the state detecting portion detects the vehicle speed of the vehicle. If the vehicle speed reduces, the noise generated form the vehicle such as the pattern noise of the tires becomes quiet. Therefore, by controlling the warning portion to generate the warning when the vehicle speed is low (e.g., lower than a predetermined vehicle speed) during traveling of the vehicle, it is possible to make existence of the vehicle recognized by the people around the vehicle when the noise generated from the vehicle is quiet.

It is further preferable that the state detecting portion includes a speed detecting portion for detecting a speed of the internal combustion engine.

With this invention, the state detecting portion detects the speed of the internal combustion engine. If the speed of the internal combustion engine reduces, the operating sound of the internal combustion engine becomes quiet and therefore the noise generated from the vehicle becomes quiet. Therefore, by controlling the warning portion to generate the warning when the speed is low (e.g., lower than a predetermined speed) during traveling of the vehicle, it is possible to make existence of the vehicle recognized by the people around the vehicle when the noise generated from the vehicle is quiet.

It is further preferable that the vehicle warning device further includes a person detecting portion for detecting a person around the vehicle. The control portion controls the warning portion to generate the warning when a person is detected in addition to when the location of the vehicle satisfies the predetermined condition.

With this invention, the control portion controls the warning portion to generate the warning when a person is detected around the vehicle in addition to when the location of the vehicle satisfies the predetermined condition (e.g., a condition that the location of the vehicle is in the predetermined range of distance from the entered location) during traveling of the vehicle. In this way, it is possible to make existence of the vehicle recognized by the person around the vehicle while suppressing generation of unnecessary warnings.

It is further preferable that the warning device further includes an illuminance detecting portion for detecting illuminance around the vehicle. The control portion suppresses generation of the warning according to the detected illuminance.

With this invention, the control portion suppresses generation of the warning according to the detected illuminance (e.g., illuminance corresponding to the nighttime). For example, frequent generation of the warning in residential areas in the nighttime may make residents around the vehicle unpleasant. Therefore, by suppressing generation of the warning at detection that it is the nighttime, it is possible to prevent the residents around the vehicle from feeling unpleasant.

It is further preferable that the volume level of the first horn sound satisfies the legal standard.

With this invention, by generating the second horn sound by the warning portion when the operating sound of the driving source is quiet (e.g., during traveling by the driving force of the driving electric motor) at the start time or during traveling of the vehicle (e.g., the hybrid vehicle) mounted with the driving electric motor and the internal combustion engine, it is possible to make existence of the vehicle recognized by people around the vehicle. Because the second horn sound satisfies at least one of the condition that it has the volume level equal to or lower than that of the first horn sound and the condition that it is of the type different from the first horn sound (e.g., the gentle tone less irritant to the human auditory sense), it is possible to attract attention of the people around the vehicle without making them unpleasant.

It is further preferable that the vehicle warning device further includes an operating portion for operating the warning device and the warning portion. The operating portion generates at least one of the first horn sound and the second horn sound according to an operating force.

With this invention, the operating portion generates at least one of the first horn sound and the second horn sound according to the operating force. Because it is possible to properly use the first horn sound and the second horn sound by properly using the operating forces, operability can be improved.

It is further preferable that the vehicle warning device further includes a warning operating portion provided at a periphery of a passenger's seat of the vehicle for operating the warning portion.

With this invention, because it is possible to operate the warning portion in the passenger's seat of the vehicle, it is possible to generate the warning for the people around the vehicle to make the existence of the vehicle recognized by them by operation by a passenger seated in the passenger's seat, for example.

It is further preferable that the plurality of warning portions are provided in the vehicle. The control portion selects at least one of the warning portions to control it to generate the warning if the predetermined condition is satisfied.

With this invention, if the plurality of warning portions are provided to a periphery of the vehicle and the control portion selects at least one warning portion provided in a direction of the entered location out of the plurality of warning portions to generate the warning when the vehicle approaches the entered location (e.g., a school), for example, it is possible to more effectively make the existence of the vehicle recognized by the people around the entered location around the vehicle to attract their attention.

It is further preferable that the vehicle warning device further includes a notification portion provided in an interior of the vehicle for notifying that the warning is being generated.

With this invention, the notification portion is provided in the interior of the vehicle and notifies that the warning is being generated. By notifying that the warning is generated by the notification portion, the driver can know that the warning has been generated. Furthermore, if the warning is set to be generated when a person is detected, for example, the driver can recognize that there is the person around the vehicle based on the notification by the notification portion.

It is further preferable that the notification portion notifies that the warning is being generated by displaying information on generation of the warning on a display device.

With this invention, the notification portion notifies that the warning is being generated by displaying information on generation of the warning on the display device. In this way, the driver can know that the warning has been generated. Moreover, if the warning is set to be generated when a person is detected, for example, the driver can recognize that the person exists around the vehicle based on the display on the display device.

It is further preferable that the notification portion notifies that the warning is being generated by a sound generating device for generating a sound in the interior of the vehicle.

With this invention, the notification portion notifies that the warning is being generated by a sound generating device for generating a predetermined type of sound (e.g., melody) in the interior of the vehicle. In this way, the driver can know that the warning has been generated. Moreover, if the warning is set to be generated when a person is detected, for example, the driver can recognize that the person exists around the vehicle based on the notification by the sound generating device.

It is further preferable that the vehicle is mounted with a communication device that can communicate with a base station outside the vehicle. The warning device further includes a receiving portion for receiving data corresponding to a type of the sound via the communication device and a type setting portion for setting the type based on the received data.

With this invention, the warning device receives data corresponding to the type of the sound (e.g., melody) via the communication device and sets the type of sound based on the received data. In this way, it is possible to set the melody desired by the driver as the type of sound for notifying generation of the warning in the vehicle interior.

According to yet another aspect of the invention, there is provided the vehicle warning device, the device being for the vehicle mounted with the driving electric motor and the internal combustion engine. The warning device includes a warning portion for generating a warning to surroundings of the vehicle, a person detecting portion for detecting a person around the vehicle, and a control portion for controlling the warning portion to generate the warning. The control portion includes a warning control portion for controlling the warning portion to generate the warning according to a traveling state of the vehicle if the person is detected. The vehicle is mounted with a horn device for generating the first horn sound. The warning portion generates the second horn sound satisfying at least one of a condition that it has a volume level equal to or lower than that of the first horn sound and a condition that it is of a different type from the first horn sound.

With this invention, the control portion generates the warning according to the traveling state of the vehicle (e.g., the operating state of the driving source, the speed of the internal combustion engine, and the vehicle speed) if the person is detected around the vehicle. By generating the warning if the person is detected when the noise generated from the vehicle is quiet (e.g., during traveling of the vehicle by the driving force of the driving electric motor) during traveling of the vehicle, it is possible to make existence of the vehicle recognized by the people around the vehicle to attract their attention. By not generating the warning if the person is detected when the noise generated from the vehicle is loud (e.g., when the speed of the internal combustion engine is high), it is possible to make existence of the vehicle recognized to attract attention by the noise generated from the vehicle. As a result, it is possible to suppress generation of unnecessary warning. Therefore, it is possible to provide the vehicle warning device for attracting attention of the people around the vehicle according to the traveling state of the hybrid vehicle.

It is preferable that the control portion controls the warning portion to generate the warning if a person is detected during traveling by a driving force of the driving electric motor.

With this invention, the control portion controls the warning portion to generate the warning during traveling by the driving force of the driving electric motor. In this way, by generating the warning if a person is detected when the noise generated from the vehicle is quiet, e.g., when the vehicle travels by the driving force of the driving electric motor, it is possible to make existence of the vehicle recognized by people around the vehicle to attract their attention. Moreover, because the warning can be generated without operation by the driver during traveling of the vehicle by the driving force of the driving electric motor, it is possible to lighten the operation load for the driver.

It is further preferable that the vehicle warning device further includes a state detecting portion for detecting a state of the vehicle related to noise generated from the vehicle. The control portion controls the warning portion to generate the warning according to the state if the person is detected during traveling of the vehicle.

With this invention, the control portion controls the warning portion to generate the warning during traveling of the vehicle according to the state of the vehicle related to the noise generated from the vehicle (e.g., the engine speed, the vehicle speed). In this way, by generating the warning if a person is detected when the noise generated from the vehicle is quiet (e.g., when the engine speed is lower than a predetermined speed) during traveling of the vehicle, it is possible to make existence of the vehicle recognized by the person around the vehicle to attract his/her attention. Moreover, because the warning can be generated without operation by the driver during traveling of the vehicle, it is possible to lighten the operation load for the driver.

It is further preferable that the state detecting portion includes a vehicle speed detecting portion for detecting the vehicle speed of the vehicle.

With this invention, the state detecting portion detects the vehicle speed of the vehicle. If the vehicle speed reduces, the noise generated form the vehicle such as the pattern noise of the tires becomes quiet. Therefore, by controlling the warning portion to generate the warning when the vehicle speed is low (e.g., lower than a predetermined vehicle speed) during traveling of the vehicle, it is possible to make existence of the vehicle recognized by the people around the vehicle when the noise generated from the vehicle is quiet.

It is further preferable that the state detecting portion includes a speed detecting portion for detecting a speed of the internal combustion engine.

With this invention, the state detecting portion detects the speed of the internal combustion engine. If the speed of the internal combustion engine reduces, the operating sound of the internal combustion engine becomes quiet and therefore the noise generated from the vehicle becomes quiet. Therefore, by controlling the warning portion to generate the warning when the speed is low (e.g., lower than a predetermined speed) during traveling of the vehicle, it is possible to make existence of the vehicle recognized by the people around the vehicle when the noise generated from the vehicle is quiet.

It is further preferable that the control portion controls the warning portion to generate the warning if a person is detected in a predetermined range of distance from the vehicle.

With this invention, the control portion generates the warning if a person is detected in the predetermined range of distance from the vehicle. By generating the warning when a person who is in the predetermined range of distance from the vehicle and whose attention need be attracted is detected during traveling of the vehicle, it is possible to make existence of the vehicle recognized by the detected person. Because the warning is not generated for a person who is outside the predetermined range of distance from the vehicle and whose attention need not be attracted during traveling of the vehicle, it is possible to suppress generation of unnecessary warnings.

It is further preferable that the vehicle warning device further includes an illuminance detecting portion for detecting illuminance around the vehicle. The control portion suppresses generation of the warning according to the detected illuminance.

With this invention, the control portion suppresses generation of the warning according to the detected illuminance (e.g., illuminance corresponding to the nighttime). For example, frequent generation of the warning in residential areas in the nighttime may make residents around the vehicle unpleasant. Therefore, by suppressing generation of the warning at detection that it is the nighttime, it is possible to prevent the residents around the vehicle from feeling unpleasant.

It is further preferable that the volume level of the first horn sound satisfies the legal standard.

With this invention, by generating the second horn sound by the warning portion when the operating sound of the driving source is quiet (e.g., during traveling by the driving force of the driving electric motor) during traveling of the vehicle (e.g., the hybrid vehicle) mounted with the driving electric motor and the internal combustion engine, it is possible to make existence of the vehicle recognized by people around the vehicle. Because the second horn sound satisfies at least one of the condition that it has the volume level equal to or lower than that of the first horn sound and the condition that it is of the type different from the first horn sound (e.g., the gentle tone less irritant to the human auditory sense), it is possible to attract attention of the people around the vehicle without making them unpleasant.

It is further preferable that the vehicle warning device further includes an operating portion for operating the warning device and the warning portion. The operating portion generates at least one of the first horn sound and the second horn sound according to an operating force.

With this invention, the operating portion generates at least one of the first horn sound and the second horn sound according to the operating force. Because it is possible to properly use the first horn sound and the second horn sound by properly using the operating forces, operability can be improved.

It is further preferable that the vehicle warning device further includes a warning operating portion provided at a periphery of a passenger's seat of the vehicle for operating the warning portion.

With this invention, because it is possible to operate the warning portion in the passenger's seat of the vehicle, it is possible to generate the warning for the people around the vehicle to make the existence of the vehicle recognized by them by operation by a passenger seated in the passenger's seat, for example.

It is further preferable that the plurality of warning portions are provided in the vehicle. The control portion selects at least one of the warning portions to control it to generate the warning if a person is detected.

With this invention, if the plurality of warning portions are provided to a periphery of the vehicle and at least one warning portion provided in a direction of the detected person is selected out of the plurality of warning portions to generate the warning, for example, it is possible to more effectively make the existence of the vehicle recognized by the detected person around the vehicle to attract his/her attention.

It is further preferable that the vehicle warning device further includes a notification portion provided in an interior of the vehicle for notifying that the warning is being generated.

With this invention, the notification portion is provided in the interior of the vehicle and notifies that the warning is being generated. By notifying that the warning is generated by the notification portion, the driver can know that the warning has been generated. Furthermore, if the warning is set to be generated when a person is detected, for example, the driver can recognize that there is the person around the vehicle based on the notification by the notification portion.

It is further preferable that the notification portion notifies that the warning is being generated by displaying information on generation of the warning on a display device.

With this invention, the notification portion notifies that the warning is being generated by displaying information on generation of the warning on the display device. In this way, the driver can know that the warning has been generated. Moreover, if the warning is set to be generated when a person is detected, for example, the driver can recognize that the person exists around the vehicle based on the display on the display device.

It is further preferable that the notification portion notifies that the warning is being generated by a sound generating device for generating a sound in the interior of the vehicle.

With this invention, the notification portion notifies that the warning is being generated by a sound generating device for generating a predetermined type of sound (e.g., melody) in the interior of the vehicle. In this way, the driver can know that the warning has been generated. Moreover, if the warning is set to be generated when a person is detected, for example, the driver can recognize that the person exists around the vehicle based on the notification by the sound generating device.

It is further preferable that the vehicle is mounted with a communication device that can communicate with a base station outside the vehicle. The warning device further includes a receiving portion for receiving data corresponding to a type of the sound via the communication device and a type setting portion for setting the type based on the received data.

With this invention, the warning device receives data corresponding to the type of the sound (e.g., melody) via the communication device and sets the type of sound based on the received data. In this way, it is possible to set the melody desired by the driver as the type of sound for notifying generation of the warning in the vehicle interior.

According to yet another aspect of the invention, there is provided a vehicle warning device including a warning portion for generating a warning to surroundings of the vehicle, a person detecting portion for detecting a person around the vehicle, and a control portion for controlling the warning portion to generate the warning. The control portion includes a warning control portion for controlling the warning portion to generate the warning if the person is detected when the vehicle is operated to enable the parked vehicle to start. The vehicle is mounted with a horn device for generating the first horn sound. The warning portion generates the second horn sound satisfying at least one of a condition that it has a volume level equal to or lower than that of the first horn sound and a condition that it is of a different type from the first horn sound.

With this invention, the control portion generates the warning to the detected person when the vehicle is operated (e.g., when an ignition switch is turned on) to enable the parked vehicle to start. In this way, it is possible to make existence of the vehicle recognized by the person around the vehicle to attract his/her attention earlier before the vehicle starts. Because it is possible to make existence of the vehicle recognized by the person before the vehicle starts even if the person approaches the vehicle, the vehicle can start more safely. Therefore, it is possible to provide the vehicle warning device for making existence of the vehicle recognized earlier than the start of the vehicle.

It is further preferable that the control portion controls the warning portion to generate the warning if the person is detected when the vehicle is operated to enable the driving source of the vehicle to be actuated.

With this invention, the control portion generates the warning to the detected person when the vehicle is operated (e.g., when the ignition switch is turned on) to enable the driving source of the vehicle (e.g., the driving electric motor) to be actuated. In this way, it is possible to make existence of the vehicle recognized by the person around the vehicle to attract his/her attention earlier before the vehicle starts. Because it is possible to make existence of the vehicle recognized by the person before the vehicle starts even if the person approaches the vehicle, the vehicle can start more safely.

It is further preferable that the vehicle is mounted with a brake for generating a braking force. The control portion controls the warning portion to generate the warning when the vehicle is operated to enable a driving source of the vehicle to be actuated and the brake is operated.

With this invention, the control portion generates the warning to the detected person when the vehicle is operated (e.g., when the ignition switch is turned on) to enable the driving source of the vehicle (e.g., the driving electric motor) to be actuated and the brake (e.g., a foot brake) is operated. The brake may be operated by the start time of the vehicle after the ignition switch is turned on in some cases (e.g., a case where the ignition switch is turned on after the driver operates the foot brake to the pressed-down side to actuate the brake or a case where the driver operates the foot brake to a cancellation side to cancel actuation of the brake device before the driver starts the vehicle). Therefore, by generating the warning to the detected person when the ignition switch is turned on and brake is operated (e.g., the foot brake is operated to the pressed-down side or the cancellation side), it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

It is further preferable that the brake is a parking brake device.

With this invention, the control portion generates the warning to the detected person when the vehicle is operated (e.g., when the ignition switch is turned on) to enable the driving source to be actuated and the parking brake device is operated (e.g., to cancel actuation of the parking brake). Actuation of the parking brake is canceled by the start time of the vehicle after the ignition switch is turned on. Therefore, by generating the warning to the detected person when the ignition switch is turned on and parking brake device is operated, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

It is further preferable that the control portion controls the warning portion to generate the warning if a person is detected when the vehicle is operated to enable the driving source of the vehicle to be actuated and a shift lever is operated.

With this invention, the control portion generates the warning to the detected person when the vehicle is operated (e.g., when the ignition switch is turned on) to enable the driving source to be actuated and the shift lever is operated (e.g., the shift lever is operated from a parking position to a driving position). The shift lever may be operated by the start time of the vehicle after the ignition switch is turned on in some cases (e.g., a case where the shift lever is operated from the parking position to the driving position). Therefore, by generating the warning to the detected person when the shift lever is operated after the ignition switch is turned on, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

It is further preferable that a plurality of warning portions are provided in the vehicle. The control portion selects at least one of the warning portions to control it to generate the warning if a person is detected.

With this invention, if the plurality of warning portions are provided to a periphery of the vehicle and at least one warning portion provided in a direction of the detected person is selected out of the plurality of warning portions to generate the warning, for example, it is possible to more effectively make the existence of the vehicle recognized by the detected person around the vehicle to attract his/her attention.

It is further preferable that the warning is a predetermined type of audible alert.

With this invention, by generating the predetermined type of audible alert (e.g., melody) to the people around the vehicle, it is possible to make existence of the vehicle recognized by the people around the vehicle to attract their attention without making them unpleasant.

It is further preferable that the vehicle is mounted with a communication device that can communicate with a base station outside the vehicle. The warning device further includes a receiving portion for receiving data corresponding to a type of the audible alert via the communication device and a type setting portion for setting the type based on the received data.

With this invention, the warning device receives data corresponding to the type of the audible alert (e.g., melody) via the communication device and sets the type of audible alert based on the received data. In this way, it is possible to set the melody desired by the driver as the type of audible alert.

It is further preferable that the volume level of the first horn sound satisfies the legal standard.

With this invention, by generating the second horn sound by the warning portion when the operating sound of the driving source is quiet (e.g., during traveling by the driving force of the driving electric motor) at the start time of the vehicle (e.g., the hybrid vehicle) mounted with the driving electric motor and the internal combustion engine, it is possible to make existence of the vehicle recognized by people around the vehicle. Because the second horn sound satisfies at least one of the condition that it has the volume level equal to or lower than that of the first horn sound and the condition that it is of the type different from the first horn sound (e.g., the gentle tone less irritant to the human auditory sense), it is possible to attract attention of the people around the vehicle without making them unpleasant.

It is further preferable that the vehicle warning device further includes an operating portion for operating the warning device and the warning portion. The operating portion generates at least one of the first horn sound and the second horn sound according to an operating force.

With this invention, the operating portion generates at least one of the first horn sound and the second horn sound according to the operating force. Because it is possible to properly use the first horn sound and the second horn sound by properly using the operating forces, operability can be improved.

It is further preferable that the vehicle warning device further includes a warning operating portion provided at a periphery of a passenger's seat of the vehicle for operating the warning portion.

With this invention, because it is possible to operate the warning portion in the passenger's seat of the vehicle, it is possible to generate the warning for the people around the vehicle to make the existence of the vehicle recognized by them by operation by a passenger seated in the passenger's seat, for example.

It is further preferable that the vehicle is mounted with at least the internal combustion engine. The warning is the warning by the sound. The sound is the operating sound of the internal combustion engine.

With this invention, the warning is the warning by the sound and the sound is the operating sound of the internal combustion engine. In other words, it is possible to actuate the internal combustion if a person is detected around the vehicle to thereby make the existence of the vehicle recognized by the person around the vehicle to attract his/her attention by the operating sound of the internal combustion engine.

It is further preferable that the vehicle warning device further includes a notification portion provided in an interior of the vehicle for notifying that the warning is being generated.

With this invention, the notification portion is provided in the interior of the vehicle and notifies that the warning is being generated. By notifying that the warning is generated by the notification portion, the driver can know that the warning has been generated. Furthermore, because the warning is generated when a person is detected, the driver can recognize that there is the person around the vehicle based on the notification by the notification portion.

It is further preferable that the notification portion notifies that the warning is being generated by displaying information on generation of the warning on a display device.

With this invention, the notification portion notifies that the warning is being generated by displaying information on generation of the warning on the display device. In this way, the driver can know that the warning has been generated. Moreover, because the warning is generated when a person is detected, the driver can recognize that the person exists around the vehicle based on the display on the display device.

It is further preferable that the notification portion notifies that the warning is being generated by a sound generating device for generating a sound in the interior of the vehicle.

With this invention, the notification portion notifies that the warning is being generated by a sound generating device for generating a predetermined type of sound (e.g., melody) in the interior of the vehicle. In this way, the driver can know that the warning has been generated. Moreover, because the warning is generated when a person is detected, the driver can recognize that the person exists around the vehicle based on the notification by the sound generating device.

It is further preferable that the vehicle is mounted with a communication device that can communicate with a base station outside the vehicle. The warning device further includes a receiving portion for receiving data corresponding to a type of the sound via the communication device and a type setting portion for setting the type based on the received data.

With this invention, the warning device receives data corresponding to the type of the sound (e.g., melody) via the communication device and sets the type of sound based on the received data. In this way, it is possible to set the melody desired by the driver as the type of sound for notifying generation of the warning in the vehicle interior.

According to yet another aspect of the invention, there is provided the vehicle warning device including a situation determination portion, a warning output portion, an another vehicle sensing portion, and a control portion. The situation determination portion determines that output of the warning for making existence of the vehicle (own vehicle) recognized by surrounding people is necessary when traveling noise of the vehicle is at a predetermined or lower level. The warning output portion outputs the warning to the surroundings of the vehicle when it is determined by the situation determination portion that output of the warning is necessary. The another vehicle sensing portion senses another vehicle around or in a vicinity of the vehicle. The control portion controls generation of the warning from the warning output portion according to a relationship between the own vehicle and another vehicle when another vehicle is sensed by the another vehicle sensing portion.

Especially, the control portion includes a warning setting portion and a warning restricting portion. The warning setting portion sets the warning output from the warning output portion at a reference level when a distance between the vehicle (own vehicle) and another vehicle is longer than a reference distance. The warning restricting portion stops the warning output from the warning output portion or reduces a level of the warning to a level lower than the reference level when the distance between the own vehicle and another vehicle is a reference or shorter distance.

With this invention, it is possible to generate the warning for making the existence of own vehicle recognized by the surrounding people during traveling with quiet traveling noise of the vehicle and it is possible to stop generation of the warning or reduce a level of the output when another vehicle (vehicle ahead) exists within the predetermined distance. In this case, even if the output of the warning is reduced or stopped, it is possible to make the existence of the vehicles including own vehicle recognized by surrounding pedestrians and the like by existence of the vehicle ahead. Therefore, in such a situation, it is possible to prevent people around the vehicle from feeling unpleasant by excessively attracting their attention by further generation of the warning from own vehicle.

It is preferable that the control portion further includes a restriction prohibiting portion in the vehicle warning device according to the invention. The restriction prohibiting portion prohibits the stop or reduction of the warning by the warning restricting portion even if the distance between the own vehicle and another vehicle is the reference or shorter distance when a start of the vehicle (own vehicle) is detected.

With the above vehicle warning device, at the start time of the vehicle when there is a special necessity for making existence of own vehicle recognized by people around the vehicle, it is possible to generate the warning at the predetermined reference level for making existence of own vehicle recognized by the surrounding people regardless of presence or absence of another vehicle within the reference distance. As a result, it is possible to sufficiently attract attention of each person around the vehicle at the start time of vehicle.

It is preferable that the control portion further includes a warning regulating portion in the vehicle warning device according to the invention. The warning regulating portion regulates generation of the warning from the warning output portion according to a relationship between a warning generated from another vehicle and the warning generated from the warning output portion of the own vehicle when a distance between the vehicle (own vehicle) and another vehicle is the reference or shorter distance.

Especially, the warning regulating portion produces a command for outputting a warning from the warning output portion, the warning being related to the warning generated from another vehicle. Alternately, the warning regulating portion suppresses generation of the warning from the warning output portion when another vehicle sensed by another vehicle sensing portion is outputting the warning similar to that of the vehicle (own vehicle).

With the above vehicle warning device, when another vehicle (vehicle ahead) mounted with the same type of warning device is generating the same type of warning, the vehicle travels while generating the same type of or the same sound (warning) as that of the vehicle ahead. Therefore, it is possible to suppress unpleasant feelings given to the surrounding people by different melodies and meaningful sounds overlapping each other. As a result, it is possible to make existence of own vehicle recognized by the surrounding people without increasing unpleasant feelings given to the people around the vehicle.

It is further preferable that the vehicle warning device according to the invention further includes a state detecting portion. The state detecting portion detects a situation of the vehicle. The control portion further includes a reference distance setting portion. The reference distance setting portion sets a reference distance based on at least one of an environment (e.g., illuminance, precipitation, and the like) related to recognition of the vehicle (own vehicle) by the pedestrian detected by the state detecting portion and the vehicle speed.

With the above vehicle warning device, setting of the reference distance is variable according to the environmental conditions related to recognition of the vehicle by the pedestrians around the vehicle. Therefore, the reference distance can be set of a long distance in a situation where recognition of the vehicle is difficult for the pedestrians to actively attract attention by the warning. On the other hand, the reference distance can be set of a short distance in a situation where recognition of the vehicle is easy for the pedestrians to restrict generation of the warning to prevent making surrounding people unpleasant.

It is further preferable that the warning is a predetermined type of audible alert in the vehicle warning device according to the invention.

With the above vehicle warning device, by generating the predetermined type of audible alert (e.g., melody) to the people around the vehicle, it is possible to make existence of the vehicle recognized by the people around the vehicle to attract their attention without making them unpleasant.

It is preferable that the vehicle warning device according to the invention further includes a notification portion. The notification portion notifies output of the warning by the warning output portion in the interior of the vehicle. Especially, the notification portion notifies output of the warning by the warning output portion in the interior of the vehicle by generation of a predetermined sound.

With the above vehicle warning device, it is possible to notify output of the warning by the warning output portion in the interior of the vehicle. In this way, the driver can know that the warning has been generated. Furthermore, the driver can recognize that there is the person around the vehicle based on the notification by the notification portion.

It is preferable that the vehicle warning device according to the invention further includes a receiving command portion and a memory portion. The vehicle is mounted with a communication portion that can communicate with a base station outside the vehicle. The receiving command portion is provided to receive data corresponding to types of an audible alert and the predetermined sound via the communication portion. The memory portion stores the received data. Moreover, at least one of the warning output portion and the notification portion includes a type setting portion for setting the type of the audible alert or the predetermined sound based on the data stored in the memory portion.

In the above vehicle warning device, it is possible to receive data corresponding to the type of warning (e.g., melody, electronic sounds, music, and the like) via the communication device and to set the type of the audible alert and/or the predetermined sound for notifying output of the warning in the vehicle interior by the communication portion based on the received data. As a result, it is possible to set the melody or the like that can be obtained by downloading from the base station and desired by the driver as the type of warning and predetermined sound.

It is preferable that the vehicle is mounted with an electric motor as a driving source in the vehicle warning device according to the invention.

With the above vehicle warning device, because the traveling noise of the vehicle becomes quiet during traveling by the electric motor, it is effective to attract attention of the people around the vehicle by the vehicle warning device.

It is preferable that the vehicle is mounted with an internal combustion engine and an electric motor as the driving source and the situation determination portion determines necessity for outputting the warning based on at least one of a speed of the internal combustion engine and a speed of the electric motor in the vehicle warning device according to the invention.

With the above vehicle warning device, it is possible to easily determine necessity for making the existence of own vehicle recognized by the surrounding people based on the traveling noise of own vehicle estimated from the speeds of the internal combustion engine and the electric motor.

It is preferable that the warning generating portion generates the first horn sound in response to operation of a first operating portion in the vehicle warning device according to the invention. The vehicle warning device generates the warning as the second horn sound satisfying at least one of a condition that it has a volume level equal to or lower than that of the first horn sound and a condition that it is of a type different from the first horn sound.

With the above vehicle warning device, the first horn sound (e.g., the conventional horn sound satisfying the legal standard) can be generated in response to operation of the first operating portion (horn switch) by a passenger of the vehicle while the second horn sound can be generated to make existence of the vehicle recognized by a person around or in a vicinity of the vehicle sensed by a person detecting mechanism (person sensing portion). Because the second horn sound satisfies at least one of the condition that it has the volume level equal to or lower than that of the first horn sound and the condition that it is of the type different from the first horn sound (e.g., the gentle tone less irritant to the human auditory sense), it is possible to call attention of the people around the vehicle to approach of own vehicle without making them unpleasant.

It is preferable that the vehicle warning device according to the invention further includes a second operating portion. The second operating portion is provided to generate the second horn sound. The vehicle warning device outputs the warning as the second horn sound in response to input to the second operating portion.

With the above vehicle warning device, it is possible to output the warning (second horn sound) from the warning output device by operating the second operating portion (warning switch) provided to the vehicle. Therefore, it is possible to reliably attract attention of the person around the vehicle without making him/her unpleasant when the passenger of the vehicle detects the person.

Especially, if the second operating portion is disposed in such a position that it can be operated from the passenger's seat, it is possible to operate the second operating portion in the passenger's seat of the vehicle. Therefore, it is possible to generate the warning (second horn sound) for the people around the vehicle to make the existence of the vehicle recognized by them by operation by a passenger seated in the passenger's seat, for example.

It is also possible that the warning is output as the second horn sound in response to input to the first operating portion. In this way, it is possible to output the warning (second horn sound) for the people around the vehicle in synchronization with generation of the conventional horn sound (first horn sound). As a result, it is possible to more reliably make approach of own vehicle recognized by the people around the vehicle.

BRIEF DESCRIPTION OF THE DRAWINGS

FIG. 11 is a drawing showing a structure of a vehicle warning device according to the fifth embodiment.

FIG. 15 is a drawing showing a structure of a vehicle warning device according to a seventh embodiment.

FIG. 20 is a drawing showing a structure of a hybrid vehicle in a tenth embodiment.

BEST MODE FOR CARRYING OUT THE INVENTION

Figure 1:
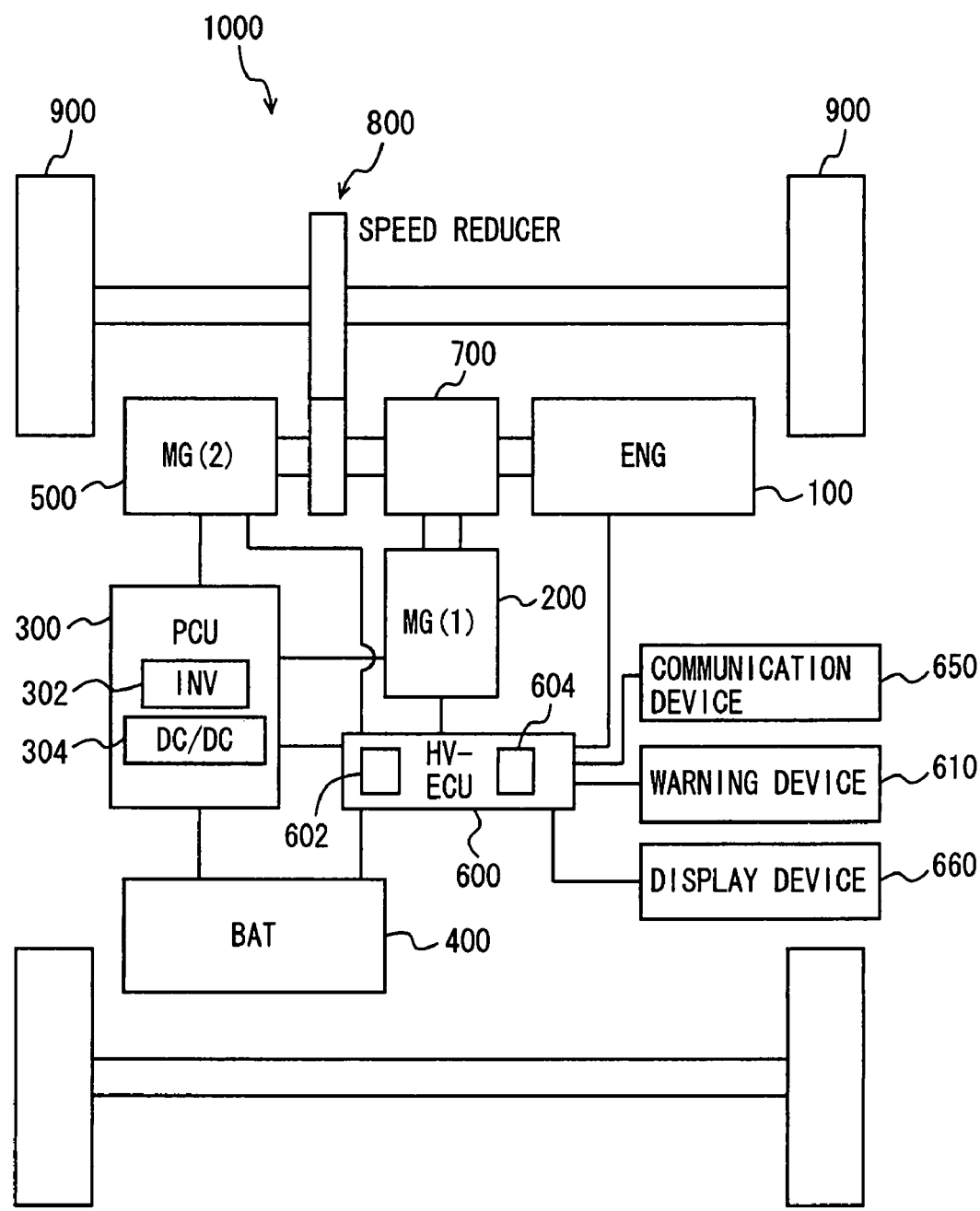
FIG. 1 is a drawing showing a structure of a hybrid vehicle in a first embodiment.

With reference to the drawings, vehicle warning devices according to embodiments of the present invention will be described below. In the following description, the same parts are provided with the same reference numerals. They have the same names and functions. Therefore, they will not be described repeatedly in detail.

First Embodiment

As shown in FIG. 1, a hybrid vehicle 1000 mounted with a vehicle warning device 610 according to the present embodiment includes an engine 100, a Motor Generator (hereafter abbreviated as MG) (1) 200, a PCU (Power Control Unit) 300, a battery 400 as an electric storage device, an MG (2) 500, a communication device 650, a display device 660, and an HV-ECU (Hybrid Vehicle Electronic Control Unit) 600 connected to all of them.

Engine 100 burns an air-fuel mixture of fuel and air and rotates a crankshaft (not shown) to generate a driving force. The driving force generated by engine 100 is split by a power split device 700 into two paths. One of them is a path for driving wheels 900 through a speed reducer 800. The other is a path for driving MG (1) 200 to generate electricity.

MG (1) 200 is driven by mechanical power of engine 100 split by power split device 700 to generate electricity. Electric power generated by MG (1) 200 is used properly according to a driving state of the vehicle and an SOC (State Of Charge) of battery 400. During normal traveling or abrupt acceleration, for example, the electric power generated by MG (1) 200 is supplied to MG (2) 500 via PCU 300.

On the other hand, if the SOC of battery 400 is lower than a predetermined value, the electric power generated by MG (1) 200 is converted from alternating-current electric power into direct-current electric power by an inverter 302 of PCU 300 and stored in battery 400 after its voltage is adjusted by a converter 304.

Battery 400 as the electric storage device is an assembled battery formed by connecting a plurality of battery modules in series, each battery module being formed by integrating a plurality of battery cells. As the electric storage device, it is also possible to use a capacitor (condenser) instead of battery 400.

MG (2) 500 is a three-phase AC rotating electrical machine. MG (2) 500 drives by at least one of the electric power stored in battery 400 and the electric power generated by MG (1) 200.

A driving force of MG (2) 500 is transmitted to wheels 900 via speed reducer 800. Thus, MG (2) 500 assists engine 100 to cause the vehicle to travel or causes the vehicle to travel only by the driving force from MG (2) 500.

At a time of regenerative braking of the vehicle, MG (2) 500 is driven by wheels 900 through speed reducer 800 and MG (2) 500 is actuated as a power generator. Thus, MG (2) 500 is actuated as a regenerative brake for converting braking energy into electric power. The electric power generated by MG (2) 500 is stored in battery 400 via inverter 302 and converter 304.

HV-ECU 600 includes a CPU (Central Processing Unit) 602 and a memory 604. CPU 602 performs arithmetic processing based on a traveling state of the vehicle, an accelerator pedal position, a brake pedal press-down amount, a shift position, the SOC of battery 400, maps and programs stored in memory 604, and the like. In this way, hybrid ECU 600 controls devices mounted on the vehicle so as to bring the vehicle into a desired driving state.

Communication device 650 carries out bidirectional information communication with a base station (not shown) outside vehicle 1000. For example, communication device 650 receives the information from a communication network via the base station. The communication network may be the Internet or a private communication line. In the embodiment, a known technique may be used for communication device 650 and therefore the device will not be described in detail. Display device 660 is provided in a vehicle interior and displays various pieces of information. Display device 660 is an LCD (Liquid Crystal Display), for example.

Figure 2:
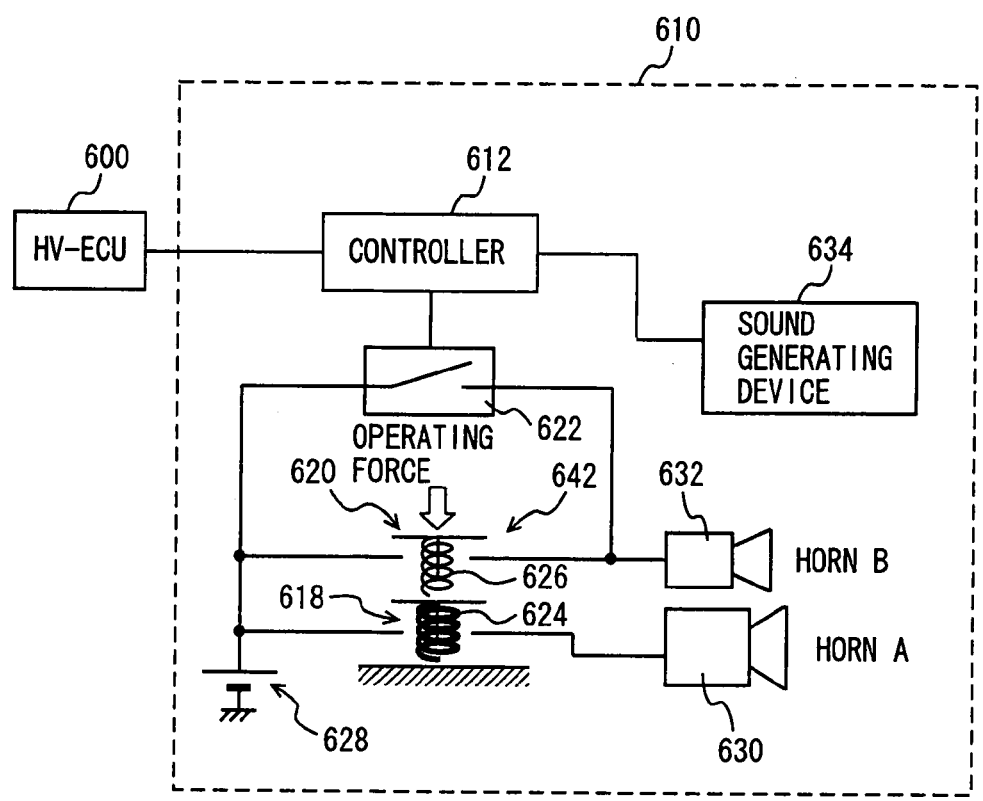
FIG. 2 is a drawing showing a structure of a vehicle warning device according to the first embodiment.

Warning device 610 generates a warning to people around vehicle 1000. Warning device 610 includes, as shown in FIG. 2, a controller 612 connected to be able to communicate with HV-ECU 600, a horn A 630, a horn B 632, an operation switch 642 provided to a steering wheel (not shown) at a driver's seat to operate horn A 630 and horn B 632, and a sound generating device 634.

Horn A 630 generates a horn sound (1) satisfying a legal standard. Horn A 630 is connected to a power supply 628 through a conducting switch (1) 618. If conducting switch (1) 618 comes into conduction, electric power of power supply 628 is supplied to horn A 630. When the electric power is supplied from power supply 628, horn A 630 generates horn sound (1). Conducting switch (1) 618 is maintained in a disconnected state by an elastic body 624.

In other words, elastic body 624 is provided so that contacts at opposite end portions of conducting switch (1) 618 are at predetermined distances from a contact connected to power supply 628 and a contact connected to horn B, respectively. If an operating force in a downward direction in FIG. 2 is applied to conducting switch (1) 618, elastic body 624 contracts and the contacts at the opposite end portions of conducting switch (1) 618 come in contact with the contact connected to power supply 628 and the contact connected to horn B to bring conducting switch (1) 618 into conduction.

Horn B 632 generates a horn sound (2) satisfying one of a condition that it has a volume level equal to or lower than that of horn sound (1) of horn A 630 and a condition that it is of a different type from horn sound (1). It is essential only that horn sound (2) be a sound at such a volume level or of such a type as not make people around vehicle 1000 unpleasant. For example, horn sound (2) may be a gentle tone or melody less irritant to a human auditory sense or may be a horn sound having a volume level lower than horn sound (1). Horn B 632 is connected to power supply 628 through a conducting switch (2) 620. If conducting switch (2) 620 comes into conduction, electric power of power supply 628 is supplied to horn B 632. When the electric power is supplied from power supply 628, horn B 632 generates horn sound (2). Conducting switch (2) 620 is maintained in a disconnected state by an elastic body 626 having a smaller spring constant than elastic body 624.

In other words, elastic body 626 is provided so that contacts at opposite end portions of conducting switch (2) 620 are at predetermined distances from a contact connected to power supply 628 and a contact connected to horn B, respectively. If an operating force in a downward direction in FIG. 2 is applied to conducting switch (2) 620, elastic body 626 contracts and the contacts at the opposite end portions of conducting switch (2) 620 come in contact with the contact connected to power supply 628 and the contact connected to horn B to bring conducting switch (2) 620 into conduction.

Operation switch 642 is formed by providing conducting switch (1) 618 and conducting switch (2) 620 in series in a vertical direction in FIG. 2. Conducting switch (2) 620 is provided with a member penetrating elastic body 626, the member transmitting the operating force to conducting switch (1) 618 when it moves a predetermined distance in the downward direction in the drawing. Operation switch 642 generates at least one of horn sound (1) and horn sound (2) according to the operating force. In other words, when an operating force equal to or greater than a predetermined force is applied to operation switch 642, conducting switch (1) 618 comes into conduction. If the operating force is smaller than the predetermined force, conducting switch (2) 620 comes into conduction.

To put it concretely, if the operating force is applied to operation switch 642 from above in FIG. 2, elastic body 626 having the smaller spring constant contracts first. If the operating force greater than an elastic force of elastic body 626 is applied, conducting switch (2) 620 comes into conduction. At this time, horn B 632 generates horn sound (2).

If conducting switch (2) 620 moves the predetermined distance downward, the operating force is transmitted to conducting switch (1) 618. Conducting switch (2) 620 is structured to follow conducting switch (1) 618 after coming into conduction. Therefore, if elastic body 624 contracts and the predetermined operating force is applied, the operating force exceeds an elastic force of elastic body 624 and conducting switch (1) 618 comes into conduction. At this time, horn A 630 generates horn sound (1). Thus, horn A 630 and horn B 632 generate horn sound (1) and horn sound (2) according to the operating force. It is also possible to provide a relay circuit or the like between circuits of horn A 630 and horn B 632 so that horn B 632 and power supply 628 are disconnected from each other when horn A 630 and power supply 628 are electrically connected to each other. In this way, it is possible to properly use horn sound (1) and horn sound (2) according to the operating force in one operation switch 642.

A conducting switch (3) 622 is connected to horn B 632 in parallel with conducting switch (2) 620. Conducting switch (3) 622 is controlled to be in one of a conductive state and a disconnected state according to a control signal from controller 612.

Sound generating device 634 includes a speaker (not shown) provided in the interior of vehicle 1000. Sound generating device 634 generates a predetermined type of sound from the speaker according to the control signal from controller 612. The predetermined type of sound is not especially limited and may be the same type of sound as the second horn sound, a different type of sound, or a melody. In the embodiment, controller 612 generates the predetermined type of sound from the speaker by sound generating device 634 in synchronization with generation of horn sound (2) by horn B 632.

Figure 3:
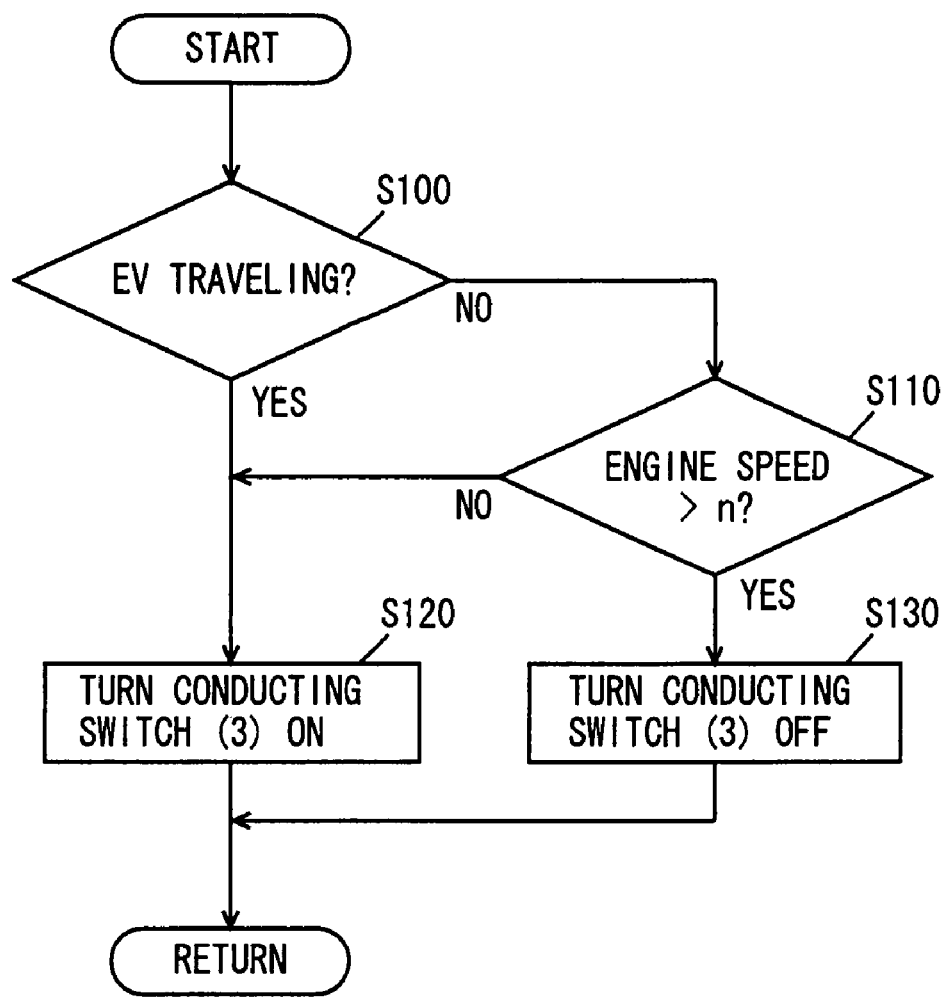
FIG. 3 is a flow chart showing a control configuration of a program executed in a controller of the vehicle warning device according to the first embodiment.

With reference to FIG. 3, a control configuration of a program executed in controller 612 of vehicle warning device 610 according to the embodiment will be described below.

In step (hereafter "step" will be abbreviated as "S") 100, controller 612 determines whether it is EV (Electric Vehicle) traveling or not. The "EV traveling" refers to traveling of the vehicle by the driving force of MG (2) 500 when engine 100 is stopped. Controller 612 receives signals indicating a sate of engine 100 and indicating that vehicle 1000 is traveling by the driving force of MG (2) 500 from HV-ECU 600 and determines whether it is the EV traveling or not. If it is determined that it is the EV traveling (YES in S100), processing goes to S120. Otherwise (NO in S100), the processing goes to S110.

In S110, controller 612 determines whether or not a speed of engine 100 is higher than a predetermined speed n. "Predetermined speed n" is not especially limited as long as it is such a speed of engine 100 that noise generated from the vehicle is quiet. Controller 612 may receive a signal corresponding to the speed of engine 100 from HV-ECU 600 or may receive the signal corresponding to the speed of engine 100 from an engine ECU (not shown). If the speed of engine 100 is higher than predetermined speed n (YES in S110), the processing goes to S130. Otherwise (NO in S110), the processing goes to S120.

In S120, controller 612 turns conducting switch (3) 622 on. In other words, controller 612 controls conducting switch (3) 622 to come into conduction. In S130, controller 612 turns conducting switch (3) 622 off. In other words, controller 612 controls conducting switch (3) 622 to come into a disconnected state.

Operation of controller 612 of vehicle warning device 610 according to the embodiment based on the above structure and flow chart will be described.

If it becomes the EV traveling during traveling of the vehicle (YES in S100), conducting switch (3) 622 is turned on (S120) and horn sound (2) is generated. Then, if engine 100 has started (NO in S100) and the speed of engine 100 is higher than predetermined speed n (YES in S110), conducting switch (3) 622 is turned off (S130). Even if engine 100 has been started (NO in S100), conducting switch (3) 622 is turned on (S120) and horn sound (2) is generated when the speed of engine 100 is lower than predetermined speed n (NO in S110).

As described above, with the vehicle warning device according to the embodiment, if horn B generates horn sound (2) when the vehicle travels by the driving force of MG (2) during traveling of the hybrid vehicle mounted with MG (2) and the engine, it is possible to make existence of the vehicle recognized by people around the vehicle. Because horn (2) satisfies one of the condition that it has the volume level equal to or lower than that of horn sound (1) and the condition that it is the gentle tone less irritant to the human auditory sense, it is possible to attract attention of the people around the vehicle without making them unpleasant even if horn sounds (2) are generated frequently. Therefore, it is possible to provide the vehicle warning device that can attract attention of the people around the vehicle without making them unpleasant.

The controller controls horn B to generate horn sound (2) during traveling by the driving force of MG (2). As a result, if horn sound (2) is generated when the noise generated from the vehicle is quiet during traveling of the vehicle by the driving force of MG (2), it is possible to attract attention of the people around the vehicle without making them unpleasant. Moreover, because horn sound (2) can be generated without operation by a driver, it is possible to lighten an operation load for the driver.

Furthermore, the controller carries out the control to generate horn sound (2) during traveling of the vehicle according to the state of the vehicle related to the noise generated from the vehicle, i.e., the engine speed. In this way, if horn sound (2) is generated when the engine speed is low and the noise generated from the vehicle is small, it is possible to attract attention of the people around the vehicle without making them unpleasant. Moreover, because horn sound (2) can be generated without operation by the driver, it is possible to lighten the operation load for the driver.

Although horn sound (2) is generated when the speed of engine 100 is lower than predetermined speed n in the embodiment, the state is not especially limited to the speed of engine 100 as long as it is a state related to the noise generated from the vehicle. For example, it is also possible to generate horn sound (2) if a detected vehicle speed is equal to or lower than a predetermined speed. If the vehicle speed reduces, noise such as pattern noise of tires generated from the vehicle becomes quiet. Therefore, if the control is carried out to generate horn sound (2) when the vehicle speed is lower than the predetermined vehicle speed during traveling of the vehicle, it is possible to make the existence of the vehicle recognized by the people around the vehicle when the noise generated from the vehicle is quiet. It is also possible to set a contribution ratio (weighting factors) of the vehicle speed and the engine speed affecting the noise generated from the vehicle. In other words, if the sum of values obtained by multiplying the detected engine speed and vehicle speed by their respective weighting factors is equal to or smaller than a predetermined value, horn sound (2) may be generated.

It is preferable that the controller generates horn sound (2) at a start of the vehicle. In this way, if the sound of the driving source is small when the parked vehicle starts, it is possible to make the existence of the vehicle recognized by the people around the vehicle.

Moreover, by properly using the operating forces applied to the one operation switch, it is possible to generate at least one of horn sound (1) and horn sound (2) to thereby improve operability.

Furthermore, a switch for operating horn B may be further provided at a periphery of a passenger's seat of the vehicle. In this way, it is possible to operate horn B in the passenger's seat of the vehicle and therefore a passenger seated in the passenger's seat can generate horn sound (2) to make the existence of the vehicle recognized by the people around the vehicle, for example.

Moreover, the sound generating device can generate the predetermined type of sound in the vehicle interior to notify that horn sound (2) is being generated. As a result, the driver can recognize that horn sound (2) has been generated. Furthermore, if horn sound (2) is set to be generated when a person around the vehicle is detected, the driver can recognize that there is the person around the vehicle based on the notification by the sound generating device. Although the sound generating device generates the sound to thereby notify generation of horn sound (2) in the embodiment, the way of notification is not limited to this. For example, information notifying generation of horn sound (2) may be displayed on display device 660 in synchronization with generation of horn sound (2) by horn B.

It is preferable that the controller receives data corresponding to the type of sound such as a melody through the HV-ECU and the communication device and that the type of sound is set based on the received data. In this way, the melody desired by the driver can be set as the type of sound for notifying generation of horn sound (2).

Second Embodiment

A vehicle warning device according to a second embodiment of the invention will be described below. A vehicle mounted with the vehicle warning device according to the present embodiment is different from the structure of vehicle 1000 mounted with the vehicle warning device according to the above-described first embodiment in that warning device 610 further includes a person sensor 614 and information obtaining device 616. Other structures are the same as those of vehicle 1000 mounted with the vehicle warning device according to the above-described first embodiment. They are provided with the same reference numerals. They have the same functions. Therefore, they will not be described repeatedly here in detail.

Figure 4:
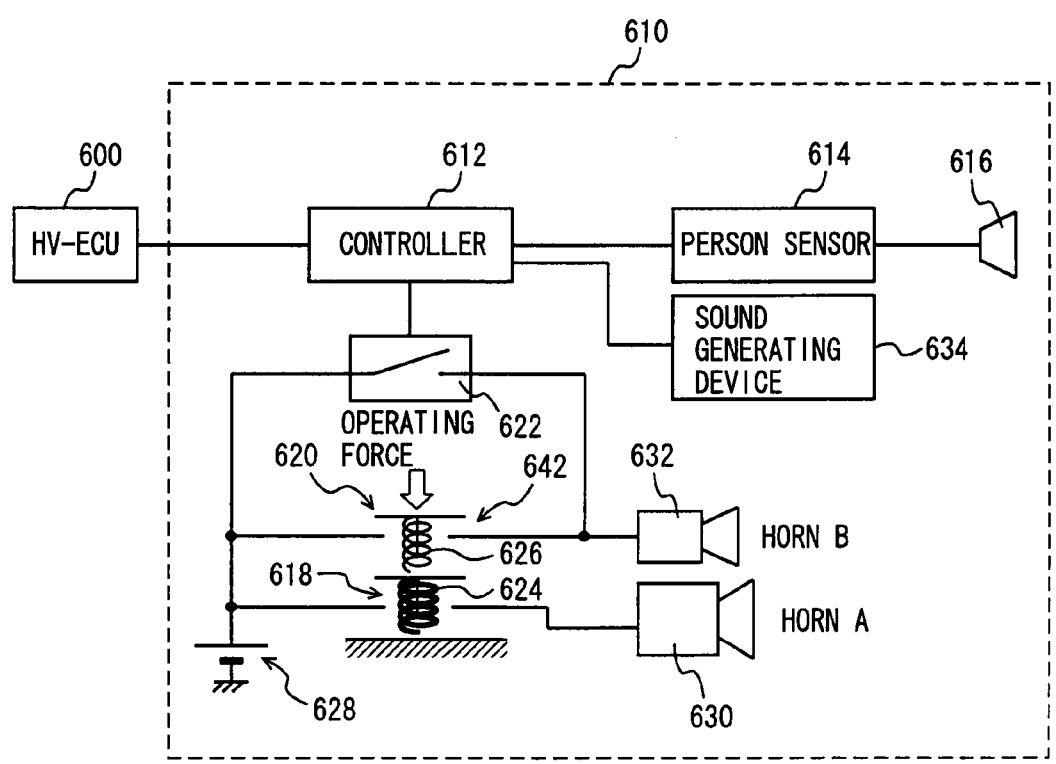
FIG. 4 is a drawing showing a structure of a vehicle warning device according to a second embodiment.

Warning device 610 according to the embodiment further includes person sensor 614 and information obtaining device 616 for obtaining information on surroundings of the vehicle as shown in FIG. 4.

Person sensor 614 detects a person around vehicle 1000 based on a detection signal from information obtaining device 616. For example, information obtaining device 616 may be a camera provided to a periphery of vehicle 1000 to obtain images of surroundings and person sensor 614 may analyze the images obtained by information obtaining device 616 to detect a person based on a shape or movement of an object. Alternatively, information obtaining device 616 may be an infrared sensor and person sensor 614 may detect the shape or temperature distribution based on the detection signal received from the information obtaining device to detect a person. The person detecting sensor is not especially limited to them.

In the embodiment, controller 612 is characterized in that it carries out a control to turn conducting switch (3) 622 on so as to generate horn sound (2) when a person is detected during traveling of vehicle 1000.

Figure 5:
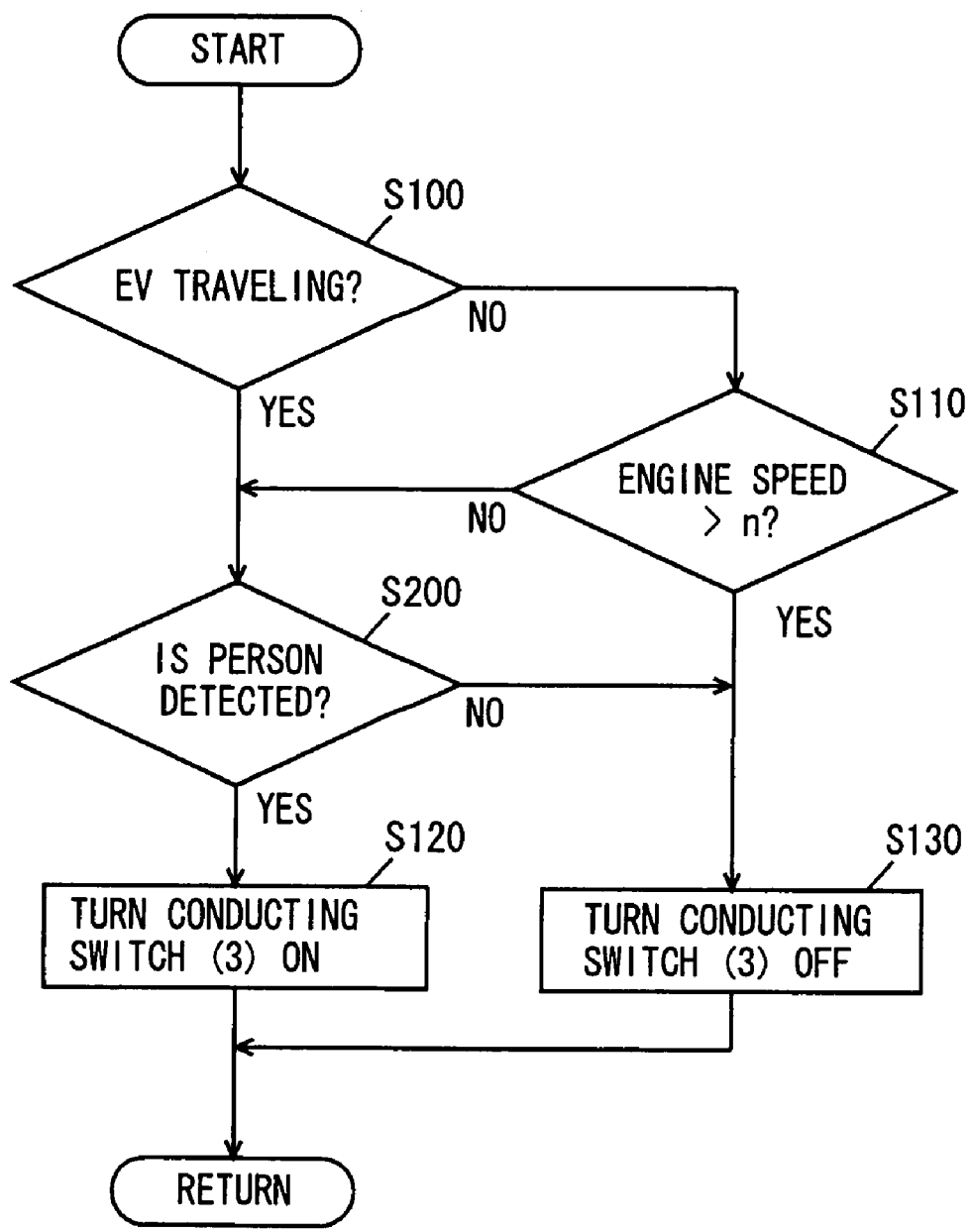
FIG. 5 is a flow chart showing a control configuration of a program executed in a controller of the vehicle warning device according to the second embodiment.

With reference to FIG. 5, a control configuration of a program executed in controller 612 of vehicle warning device 610 according to the embodiment will be described below. In the flow chart shown in FIG. 5, the same processings as those in the above-described flow chart shown in FIG. 3 are provided with the same step numbers. They are the same processings. Therefore, they will not be described repeatedly here in detail.

In S200, controller 612 determines whether a person is detected around the vehicle or not. For example, controller 612 detects a person who is in a predetermined range of distance from vehicle 1000 and whose attention need be attracted. If it is determined that the person is detected around vehicle 1000 (YES in S200), the processing goes to S120. Otherwise (NO in S200), the processing goes to S130.

Operation of controller 612 of vehicle warning device 610 according to the embodiment based on the above structure and flow chart will be described.

If the vehicle comes into the EV traveling state (YES in S100) during traveling of the vehicle and a person is detected around vehicle 1000 (YES in S200), conducting switch (3) 622 is turned on (S120) to generate horn sound (2). If engine 100 has started (NO in S100) and the speed of engine 100 is higher than predetermined speed n (YES in S110), conducting switch (3) 622 is turned off (S130). Even when engine 100 has started (NO in S100), if the speed of engine 100 is lower than the predetermined speed n (NO in S110) and a person is detected around vehicle 1000 (YES in S200), conducting switch (3) 622 is turned on (S120) to generate horn sound (2). Even when it is the EV traveling (YES in S100) or even when engine 100 has started (NO in S100) and the speed of engine 100 is lower than predetermined speed n (NO in S110), conducting switch (3) 622 is turned off (S130) if no person is detected around the vehicle (NO in S200).

In the above manner, with the vehicle warning device according to the embodiment, in addition to effects of the vehicle warning device according to the above-described first embodiment, the controller generates horn sound (2) when a person is detected around the vehicle during traveling of the vehicle to thereby make the existence of the vehicle recognized by the people around the vehicle while suppressing generation of unnecessary horn sound.

Third Embodiment

A vehicle warning device according to a third embodiment of the invention will be described below. A vehicle mounted with the vehicle warning device according to the present embodiment is different from the structure of vehicle 1000 mounted with the vehicle warning device according to the above-described first embodiment in that warning device 610 further includes an illuminance measuring device 644 and an illuminance sensor 646. Other structures are the same as those of vehicle 1000 mounted with the vehicle warning device according to the above-described first embodiment. They are provided with the same reference numerals. They have the same functions. Therefore, they will not be described repeatedly here in detail.

Figure 6:
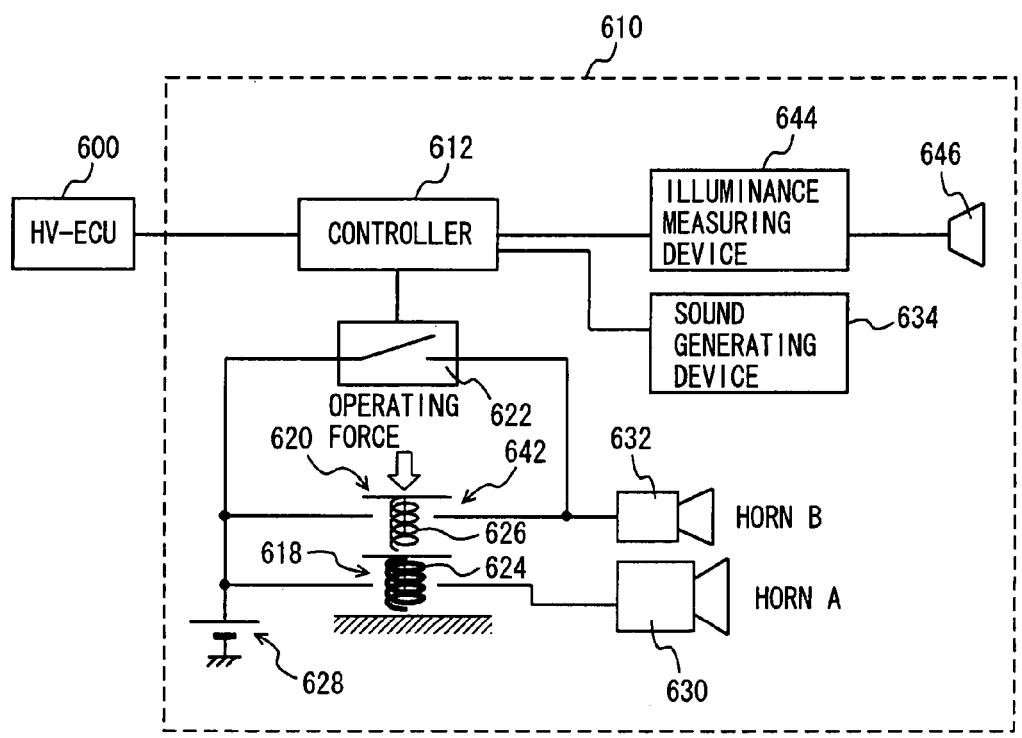
FIG. 6 is a drawing showing a structure of a vehicle warning device according to a third embodiment.

Warning device 610 according to the embodiment further includes illuminance measuring device 644 and illuminance sensor 646 as shown in FIG. 6.

Illuminance measuring device 644 detects illuminance of the surroundings of vehicle 1000. For example, illuminance measuring device 644 detects whether the illuminance of the surroundings of vehicle 1000 corresponds to the daytime or the nighttime based on signals corresponding to intensity and a wavelength of light received from illuminance sensor 646. However, a method of detecting the illuminance is not especially limited to this.

In the embodiment, controller 612 is characterized in that it suppresses generation of horn sound (2) according to the detected illuminance.

Figure 7:
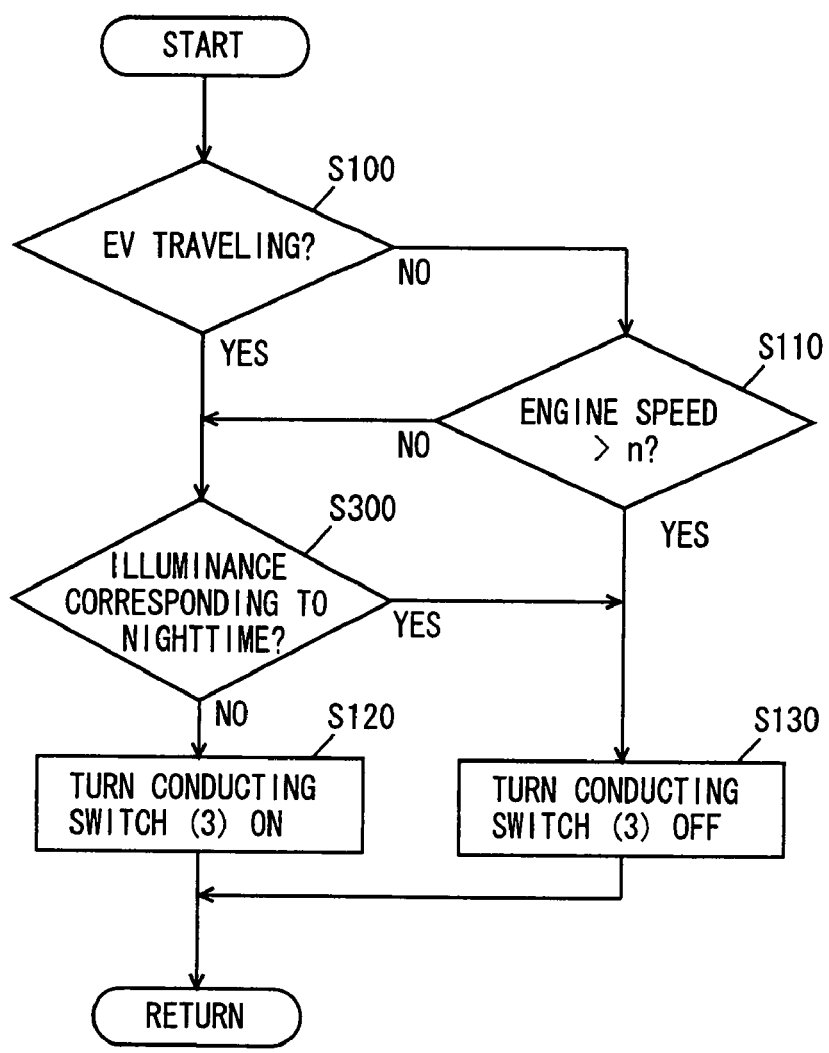
FIG. 7 is a flow chart showing a control configuration of a program executed in a controller of the vehicle warning device according to the third embodiment.

With reference to FIG. 7, a control configuration of a program executed in controller 612 of vehicle warning device 610 according to the embodiment will be described below. In the flow chart shown in FIG. 7, the same processings as those in the above-described flow chart shown in FIG. 3 are provided with the same step numbers. They are the same processings. Therefore, they will not be described repeatedly here in detail.

In S300, controller 612 determines whether the detected illuminance of the surroundings of the vehicle is illuminance corresponding to the nighttime or not. Controller 612 determines that the detected illuminance is the illuminance corresponding to the nighttime when it is lower than predetermined illuminance. If it is determined that the illuminance of the surroundings of the vehicle is the illuminance corresponding to the nighttime (YES in S300), the processing goes to S130. Otherwise (NO in S300), the processing goes to S120.

Operation of controller 612 of vehicle warning device 610 according to the embodiment based on the above structure and flow chart will be described.

If the vehicle comes into the EV traveling state (YES in S100) during traveling of the vehicle and the detected illuminance of the surroundings of vehicle 1000 is not the illuminance corresponding to the nighttime (NO in S300), conducting switch (3) 622 is turned on (S120) to generate horn sound (2). If engine 100 has started (NO in S100) and the speed of engine 100 is higher than predetermined speed n (YES in S110), conducting switch (3) 622 is turned off (S130). Even when engine 100 has started (NO in S100), if the speed of engine 100 is lower than predetermined speed n (NO in S110) and the detected illuminance of the surroundings of vehicle 1000 is not the illuminance corresponding to the nighttime (NO in S300), conducting switch (3) 622 is turned on (S120) to generate horn sound (2). Even when it is the EV traveling (YES in S100) or even when engine 100 has started (NO in S100) and the speed of engine 100 is lower than predetermined speed n (NO in S110), conducting switch (3) 622 is turned off (S130) if the detected illuminance of the surroundings of the vehicle is the illuminance corresponding to the nighttime (YES in S300).

In the above manner, with the vehicle warning device according to the embodiment, in addition to effects of the vehicle warning device according to the above-described first embodiment, by suppressing generation of horn sound (2) at detection that it is the nighttime, it is possible to prevent residents around the vehicle from feeling unpleasant.

Fourth Embodiment

A vehicle warning device according to a fourth embodiment of the invention will be described below. A vehicle mounted with the vehicle warning device according to the present embodiment is different from the structure of vehicle 1000 mounted with the vehicle warning device according to the above-described first embodiment in that warning device 610 further includes a parking brake switch 638 and a parking brake device 640. Other structures are the same as those of vehicle 1000 mounted with the vehicle warning device according to the above-described first embodiment. They are provided with the same reference numerals. They have the same functions. Therefore, they will not be described repeatedly here in detail.

Figure 8:
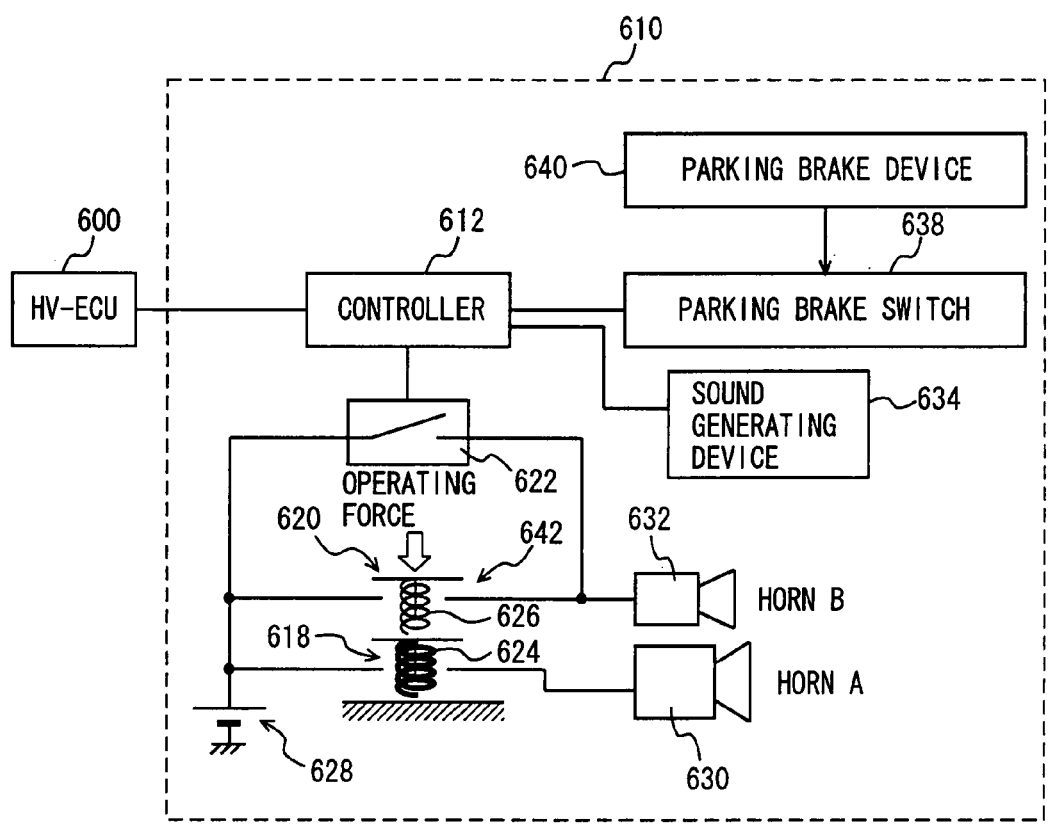
FIG. 8 is a drawing showing a structure of a vehicle warning device according to a fourth embodiment.

Warning device 610 according to the embodiment further includes parking brake switch 638 and parking brake device 640 as shown in FIG. 8.

Parking brake device 640 is actuated by pulling a parking lever (not shown) provided in the driver's seat or pressing down a parking pedal (not shown) and exerts a braking force by mechanically locking rear wheels of vehicle 1000 or restricting rotation of the rear wheels.

Parking brake switch 638 is provided to the parking lever or the parking pedal and sends an ON signal to controller 612 when parking brake device 640 is actuated. Parking brake switch 638 sends an OFF signal to controller 612 when actuation of parking brake device 640 is canceled.

In the embodiment, controller 612 is characterized in that it carries out a control to turn conducting switch (3) 622 on so as to generate horn sound (2) during traveling of vehicle 1000 after it is detected that parking brake device 640 has been actuated until a predetermined time has elapsed.

Figure 9:
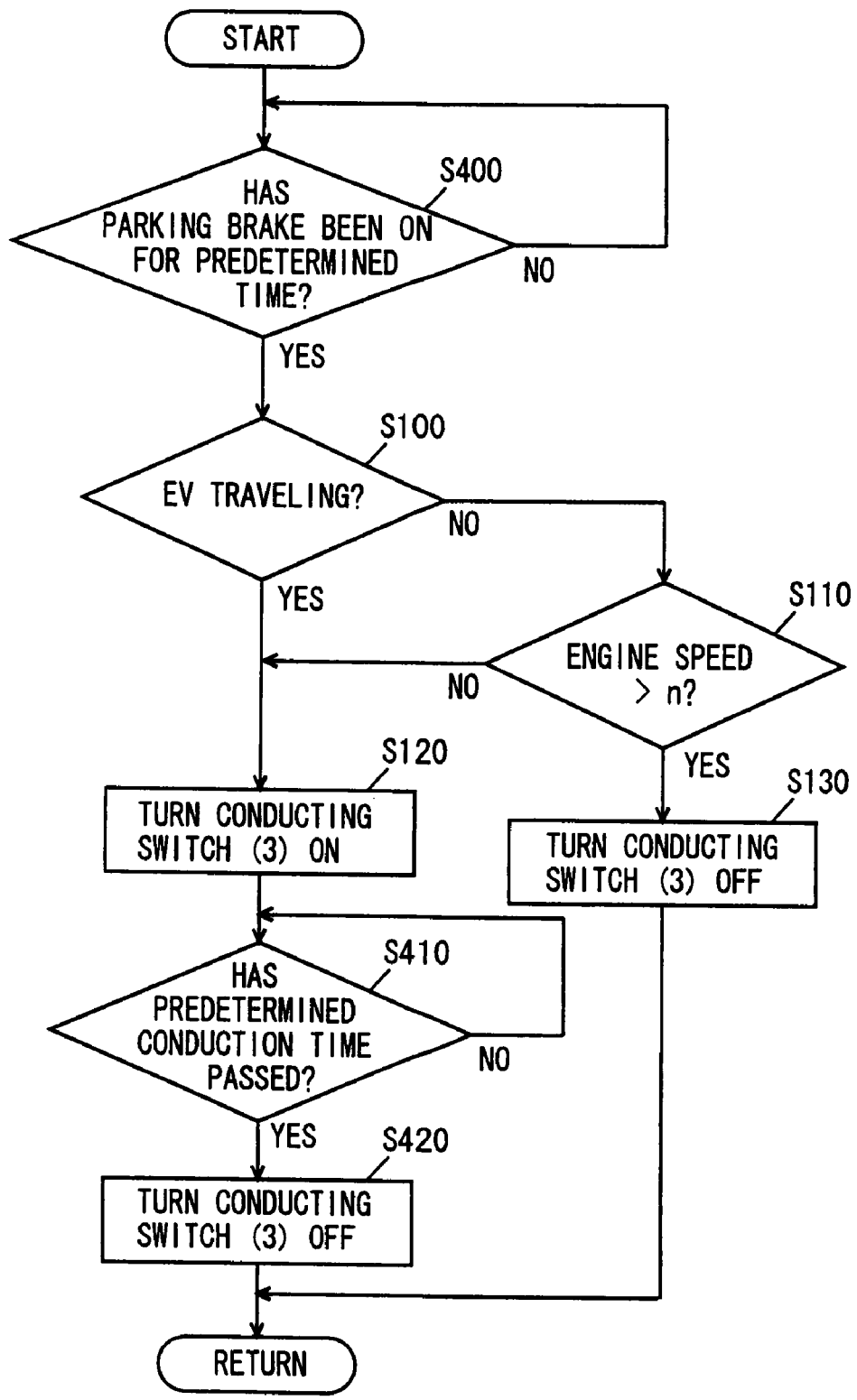
FIG. 9 is a flow chart showing a control configuration of a program executed in a controller of the vehicle warning device according to the fourth embodiment.

With reference to FIG. 9, a control configuration of a program executed in controller 612 of vehicle warning device 610 according to the embodiment will be described below. In the flow chart shown in FIG. 9, the same processings as those in the above-described flow chart shown in FIG. 3 are provided with the same step numbers. They are the same processings. Therefore, they will not be described repeatedly here in detail.

In S400, controller 612 determines whether parking brake device 640 has been actuated until the predetermined time has elapsed or not. For example, when controller 612 receives the ON signal from parking brake switch 638, it starts measurement of time by a timer provided in itself. Then, if controller 612 receives the OFF signal from parking brake switch 638 or stops receiving the ON signal, it finishes the time measurement and determines whether or not parking brake device 640 has been actuated until the predetermined time has elapsed. If it is determined that parking brake device 640 has been actuated until the predetermined time has elapsed (YES in S400), the processing goes to S100. Otherwise (NO in S400), the processing returns to S400.

In S410, controller 612 determines whether or not a predetermined conduction time has elapsed since conducting switch (3) 622 was turned on. If the predetermined conduction time has elapsed (YES in S410), the processing goes to S420. Otherwise (NO in S410), the processing returns to S410. In S420, controller 612 turns off conducting switch (3) 622.

Operation of controller 612 of vehicle warning device 610 according to the embodiment based on the above structure and flow chart will be described.

Parking brake device 640 is actuated when the driver pulls the parking lever or pressing down the parking pedal to restrict rotation of the rear wheels of vehicle 1000. If parking brake device 640 is turned off after the predetermined time has elapsed since parking brake device 640 was actuated (YES in S400) and the vehicle comes into the EV traveling state (YES in S100), conducting switch (3) 622 is turned on (S120) and horn sound (2) is generated. Then, when the predetermined conduction time has elapsed (YES in S410), conducting switch (3) 622 is turned off (S420).

Moreover, if parking brake device 640 is turned off after the predetermined time has elapsed since parking brake device 640 was actuated (YES in S400) while engine 100 has started (NO in S100) and the speed of engine 100 is higher than predetermined speed n (YES in S110), conducting switch (3) 622 is turned off (S130).

Furthermore, even when parking brake device 640 is turned off after the predetermined time has elapsed since parking brake device 640 was actuated (YES in S400) while engine 100 has started (NO in S100), conducting switch (3) 622 is turned on (S120) to generate horn sound (2) if the speed of engine 100 is lower than predetermined speed n (NO in S110). Then, when the predetermined conduction time has elapsed (YES in S410), conducting switch (3) 622 is turned off (S420).

In the above manner, with the vehicle warning device according to the embodiment, in addition to effects of the vehicle warning device according to the above-described first embodiment, when the operating sound of the driving source is too small at the start time of the vehicle from the parked state to make the people around the vehicle aware of the start of the vehicle, it is possible to generate horn sound (2) when the vehicle starts after the vehicle has been parked for the predetermined time to thereby make the existence of the vehicle recognized by the people around the vehicle and attract their attention.

Fifth Embodiment

A vehicle warning device according to a fifth embodiment of the invention will be described below. A vehicle mounted with the vehicle warning device according to the present embodiment is different from the structure of vehicle 1000 mounted with the vehicle warning device according to the above-described first embodiment in that a navigation system 670 is included and in the structure of warning device 610. Other structures are the same as those of vehicle 1000 mounted with the vehicle warning device according to the above-described first embodiment. They are provided with the same reference numerals. They have the same functions. Therefore, they will not be described repeatedly here in detail.

Figure 10:
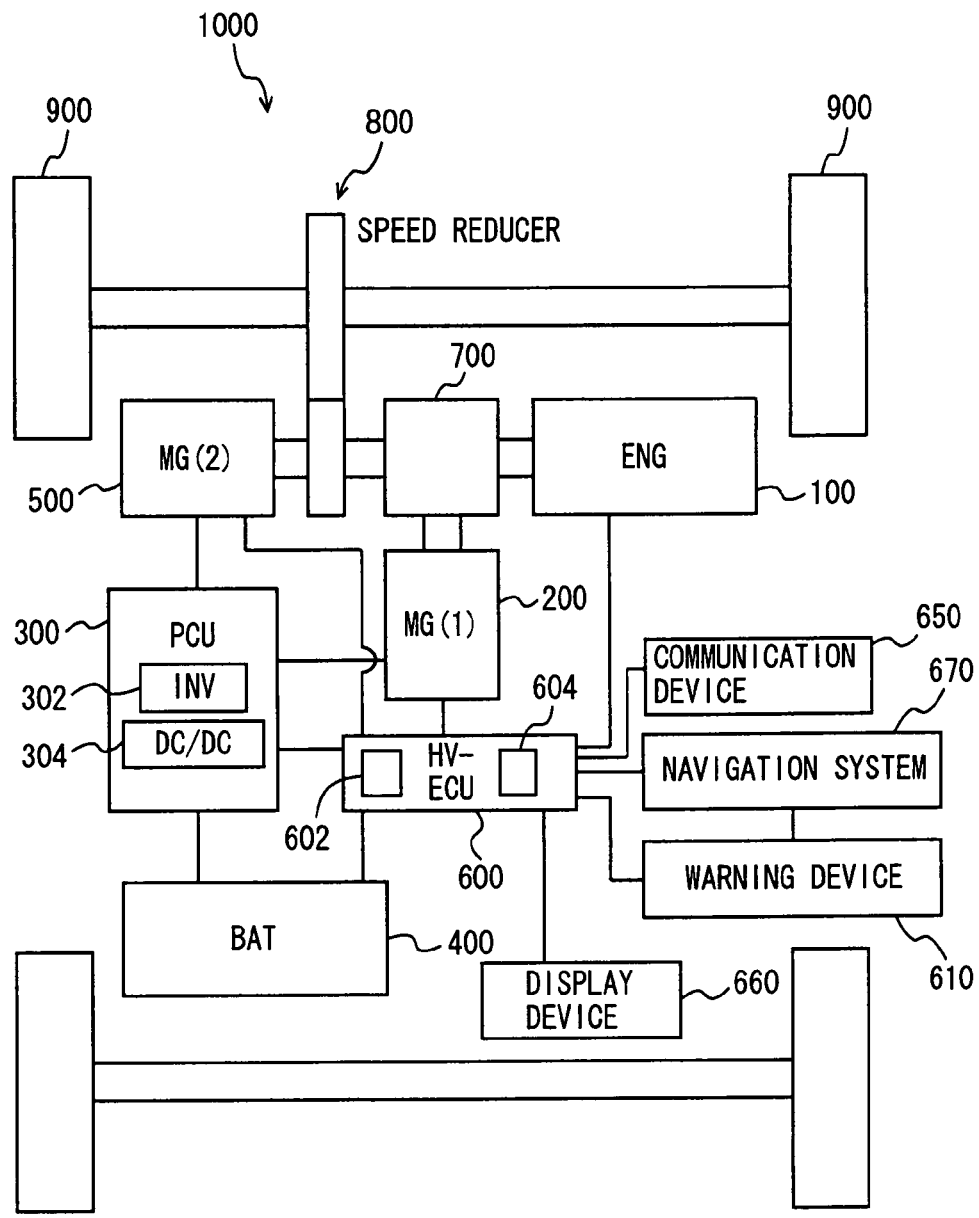
FIG. 10 is a drawing showing a structure of a hybrid vehicle in a fifth embodiment.

Hybrid vehicle 1000 mounted with vehicle warning device 610 according to the embodiment further includes navigation system 670 as shown in FIG. 10.

Navigation system 670 detects a present location of vehicle 1000 by utilizing the GPS (Global Positioning System). A signal corresponding to the detected present location is sent to HV-ECU 600. In navigation system 670, map information around the present location of the own vehicle is stored in advance. Moreover, in navigation system 670, a location on the map and entered by input from an operating portion (not shown) provided to navigation system 670 or a location on the map and entered in advance is stored.

Warning device 610 generates a warning to people around vehicle 1000. Warning device 610 includes controller 612 connected to be able to communicate with HV-ECU 600, horn A 630, horn B 632, operation switch 642 for operating horn A 630 and horn B 632, sound generating device 634, person sensor 614, and information obtaining device 616, as shown in FIG. 11.

Figure 12:
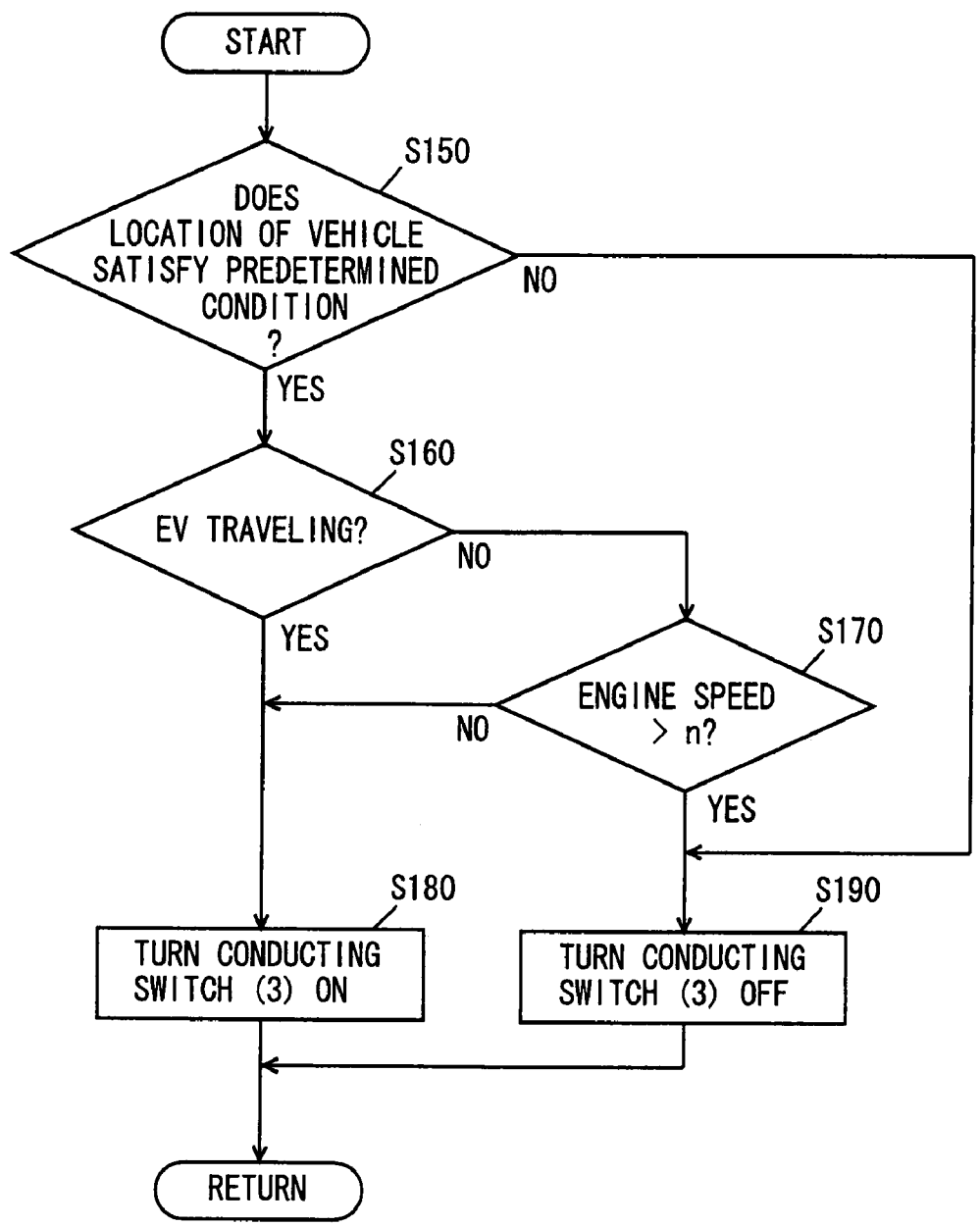
FIG. 12 is a flow chart showing a control configuration of a program executed in a controller of the vehicle warning device according to the fifth embodiment.

With reference to FIG. 12, a control configuration of a program executed in controller 612 of vehicle warning device 610 according to the embodiment will be described below.

In S150, controller 612 determines whether or not the location of the vehicle received from navigation system 670 satisfies a predetermined condition. The "predetermined condition" may be a condition that the location of the vehicle is in a predetermined range of distance from a location entered in navigation system 670 or a condition that the location of the vehicle is in a predetermined area on the map, for example, and is not especially limited. If the position of the vehicle satisfies the predetermined condition (YES in S150), the processing goes to S160. Otherwise (NO in S150), the processing goes to S190.

In S160, controller 612 determines whether it is the EV (Electric Vehicle) traveling or not. The "EV traveling" refers to traveling of the vehicle by the driving force of MG (2) 500 when engine 100 is at a stop. Controller 612 receives signals indicating a sate of engine 100 and indicating that vehicle 1000 is traveling by the driving force of MG (2) 500 from HV-ECU 600 and determines whether it is the EV traveling or not. If it is determined that it is the EV traveling (YES in S160), processing goes to S180. Otherwise (NO in S160), the processing goes to S170.

In S170, controller 612 determines whether the speed of engine 100 is higher than predetermined speed n. "Predetermined speed n" is not especially limited as long as it is such a speed of engine 100 that noise generated from the vehicle is quiet. Controller 612 may receive a signal corresponding to the speed of engine 100 from HV-ECU 600 or may receive the signal corresponding to the speed of engine 100 from the engine ECU (not shown). If the speed of engine 100 is higher than predetermined speed n (YES in S170), the processing goes to S190. Otherwise (NO in S170), the processing goes to S180.

In S180, controller 612 turns conducting switch (3) 622 on. In other words, controller 612 controls conducting switch (3) 622 to come into conduction. In S190, controller 612 turns conducting switch (3) 622 off. In other words, controller 612 controls conducting switch (3) 622 to come into a disconnected state.

Operation of controller 612 of vehicle warning device 610 according to the embodiment based on the above structure and flow chart will be described.

For example, if the assumption is made that the driver has entered a location (e.g., a school) where there are many pedestrians and bicycles in navigation system 670 in advance. If the location of vehicle 1000 is in the predetermined range of distance from the entered location (YES in S150) and vehicle 1000 is during the EV traveling (YES in S160), conducting switch (3) 622 is turned on (S180) and horn sound (2) is generated.

Moreover, even when the location of vehicle 1000 is in the predetermined range of distance from the entered location (YES in S150), if engine 100 has started (NO in S160) and the speed of engine 100 is higher than predetermined speed n (YES in S170), conducting switch (3) 622 is turned off (S190).

Furthermore, when the location of vehicle 1000 is in the predetermined range of distance from the entered location (YES in S150), even if engine 100 has been started (NO in S160), conducting switch (3) 622 is turned on (S180) and horn sound (2) is generated when the speed of engine 100 is lower than predetermined speed n (NO in S170).

If the location of vehicle 1000 gets out of the predetermined range of distance from the entered location (NO in S150), conducting switch (3) 622 is turned off (S190).

In the above manner, with the vehicle warning device according to the embodiment, the controller generates horn sound (2) if the location of the vehicle satisfies the predetermined condition and if it is traveling by the driving force of the driving electric motor or if the speed of the engine is lower than the predetermined speed during traveling of the vehicle. If horn sound (2) is generated when the vehicle approaches the entered location in case where the noise generated from the vehicle is quiet during traveling of the vehicle, e.g., during traveling by the driving force of the driving electric motor or when the speed of the engine is lower than the predetermined speed, it is possible to make the existence of the vehicle recognized by people around the entered location and attract their attention. Furthermore, by not generating the warning when the location of the vehicle approaches the entered location in case where the noise generated from the vehicle is loud, e.g., when the speed of the engine is higher than the predetermined speed, it is possible to make the existence of the vehicle recognized by utilizing the noise generated from the vehicle to thereby attract attention. As a result, it is possible to suppress giving of unnecessary warnings. Thus, it is possible to provide the warning device for attracting attention of the people around the vehicle according to the noise generated from the hybrid vehicle. Moreover, because it is possible to generate horn sound (2) without operation by the driver during traveling of the vehicle by the driving force of the driving electric motor or when the speed of the engine is lower than the predetermined speed, it is possible to lighten an operation load for the driver.

If horn sound (2) satisfies at least one of a condition that it has a volume level lower than horn sound (1) and a condition that it is a gentle tone less irritant to a human auditory sense, it is possible to attract attention of the people around the vehicle without making them unpleasant.

Although horn sound (2) is generated when the speed of engine 100 is smaller than predetermined speed n in the embodiment, the state is not especially limited to the speed of engine 100 as long as it is a state related to the noise generated from the vehicle. For example, it is also possible to generate horn sound (2) if a detected vehicle speed is equal to or lower than a predetermined speed. If the vehicle speed reduces, noise such as pattern noise of tires generated from the vehicle becomes quiet. Therefore, if the control is carried out to generate horn sound (2) when the vehicle speed is lower than the predetermined vehicle speed during traveling of the vehicle, it is possible to make the existence of the vehicle recognized by the people around the vehicle when the noise generated from the vehicle is quiet. It is also possible to set a contribution ratio (weighting factors) of the vehicle speed and the engine speed affecting the noise generated from the vehicle. In other words, if the sum of values obtained by multiplying the detected engine speed and vehicle speed by their respective weighting factors is equal to or smaller than a predetermined value, horn sound (2) may be generated.

Moreover, by properly using the operating forces applied to the one operation switch, it is possible to generate at least one of horn sound (1) and horn sound (2) to thereby improve operability.

Furthermore, a switch for operating horn B may be further provided at a periphery of a passenger's seat of the vehicle. In this way, it is possible to operate horn B in the passenger's seat of the vehicle and therefore a passenger seated in the passenger's seat can generate horn sound (2) to make the existence of the vehicle recognized by the people around the vehicle.

Moreover, the sound generating device can generate the predetermined type of sound in the vehicle interior to notify that horn sound (2) is being generated. As a result, the driver can recognize that horn sound (2) has been generated. Furthermore, if horn sound (2) is set to be generated when a person around the vehicle is detected, the driver can recognize that there is the person around the vehicle based on the notification by the sound generating device. Although the sound generating device generates the sound to thereby notify generation of horn sound (2) in the embodiment, the way of notification is not especially limited to this. For example, information notifying generation of horn sound (2) may be displayed on display device 660 in synchronization with generation of horn sound (2) by horn B.

It is preferable that the controller receives data corresponding to the type of sound such as a melody through the HV-ECU and the communication device and that the type of sound is set based on the received data. In this way, the melody desired by the driver can be set as the type of sound for notifying generation of horn sound (2).

Moreover, a plurality of horns B may be provided to the vehicle. The controller may select at least one of them to generate horn sound (2) when the location of the vehicle satisfies the predetermined condition. For example, a plurality of horns B are provided to a periphery of the vehicle and at least one of horns B provided in a direction of the entered location out of the plurality of horns B is selected to generate a warning when the vehicle approaches the entered location (e.g., a school). In this way, it is possible to more effectively make the existence of the vehicle recognized by the people around the entered location around the vehicle to attract their attention.

In the invention, it is essential only that horn B can make the existence of the vehicle recognized by the people around the vehicle and horn B is not limited to generation of a sound as a warning. For example, horn B may generate light or may generate a smell.

Sixth Embodiment

A vehicle warning device according to a sixth embodiment of the invention will be described below. A vehicle mounted with the vehicle warning device according to the present embodiment is different from the structure of vehicle 1000 mounted with the vehicle warning device according to the above-described fifth embodiment in that warning device 610 further includes person sensor 614 and information obtaining device 616. Other structures are the same as those of vehicle 1000 mounted with the vehicle warning device according to the above-described fifth embodiment. They are provided with the same reference numerals. They have the same functions. Therefore, they will not be described repeatedly here in detail.

Figure 13:
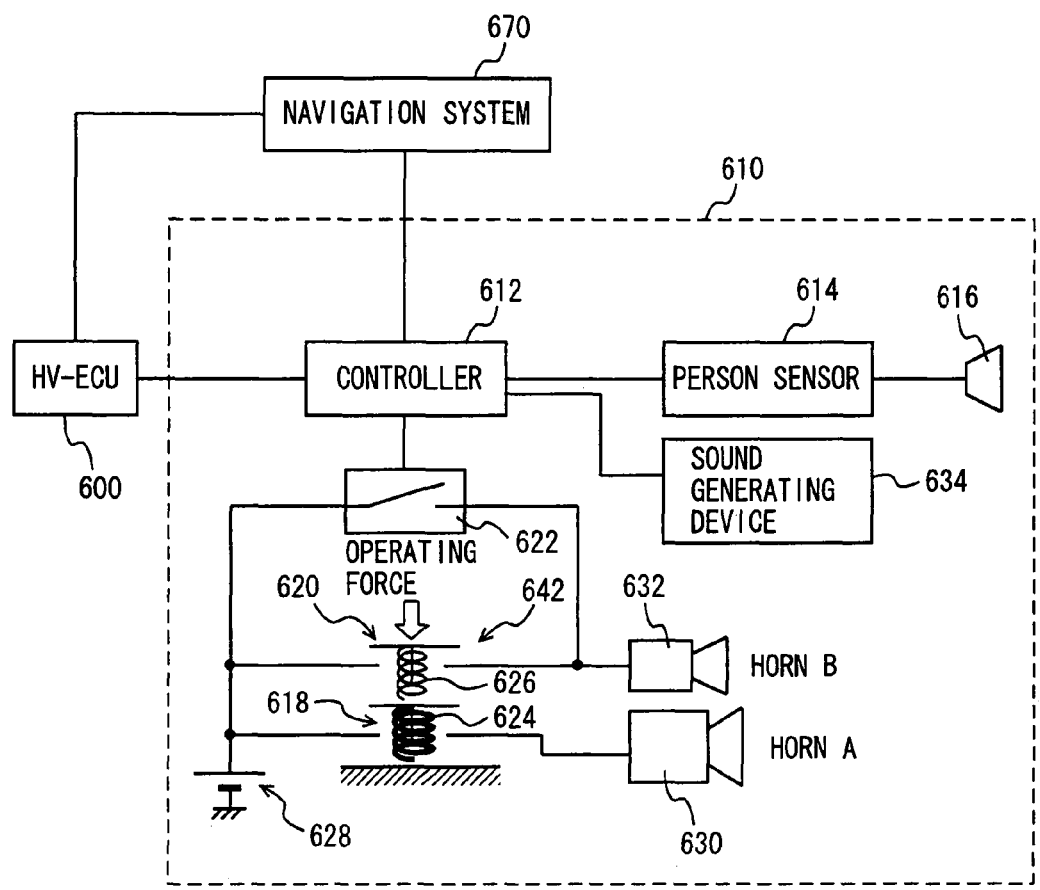
FIG. 13 is a drawing showing a structure of a vehicle warning device according to a sixth embodiment.

Warning device 610 according to the embodiment further includes person sensor 614 and information obtaining device 616 for obtaining information on surroundings of the vehicle as shown in FIG. 13.

Person sensor 614 detects a person around vehicle 1000 based on a detection signal from information obtaining device 616. For example, information obtaining device 616 may be a camera provided to a periphery of vehicle 1000 to obtain images of surroundings and person sensor 614 may analyze the images obtained by information obtaining device 616 to detect a person based on a shape or movement of an object.

Alternatively, information obtaining device 616 may be an infrared sensor and person sensor 614 may detect the shape or temperature distribution based on the detection signal received from the information obtaining device to detect a person. They are not especially limited to them.

In the embodiment, controller 612 is characterized in that it carries out a control to turn conducting switch (3) 622 on so as to generate horn sound (2) when a person is detected in addition to when the location of the vehicle satisfies the predetermined condition during traveling of vehicle 1000.

Figure 14:
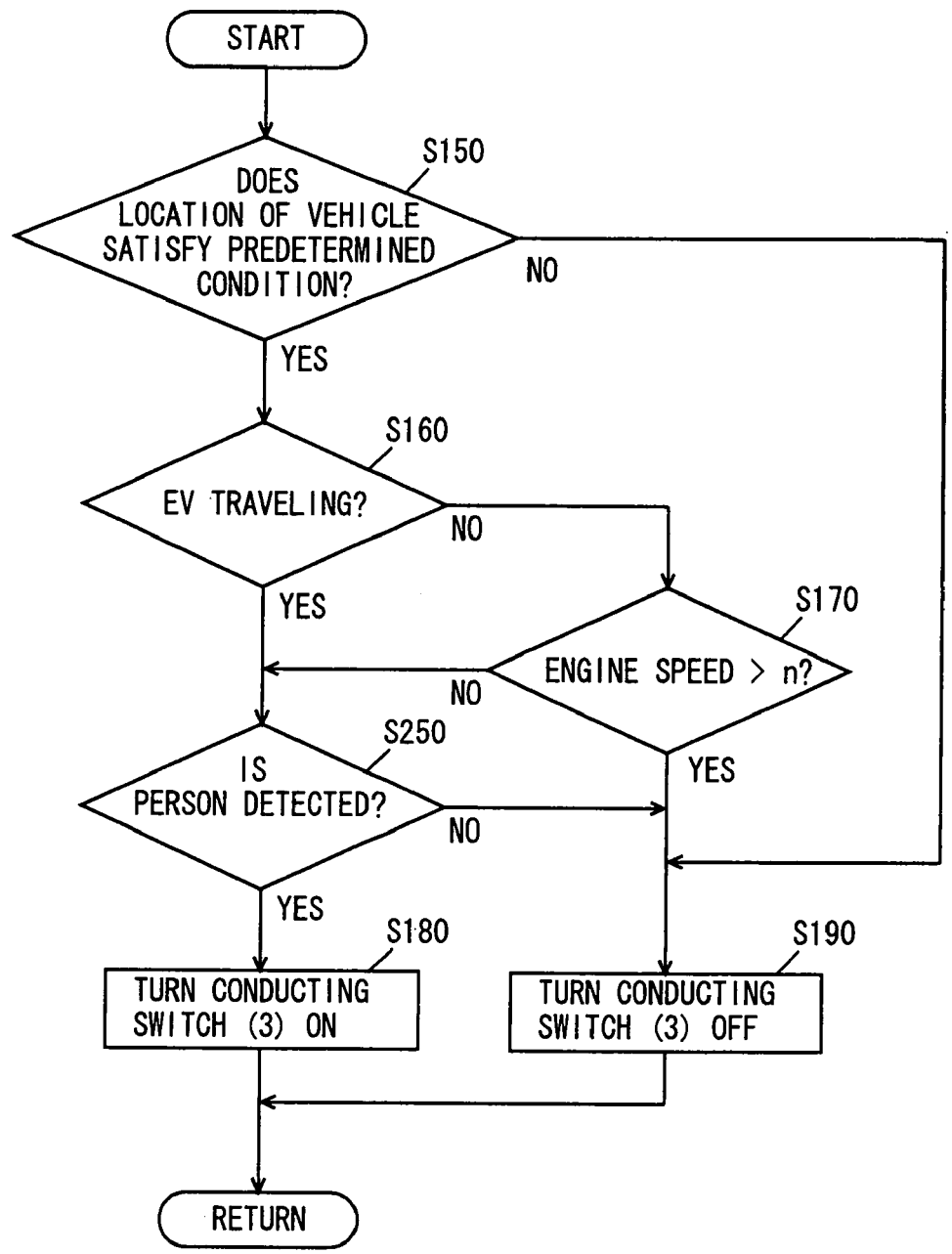
FIG. 14 is a flow chart showing a control configuration of a program executed in a controller of the vehicle warning device according to the sixth embodiment.

With reference to FIG. 14, a control configuration of a program executed in controller 612 of vehicle warning device 610 according to the embodiment will be described below. In the flow chart shown in FIG. 14, the same processings as those in the above-described flow chart shown in FIG. 12 are provided with the same step numbers. They are the same processings. Therefore, they will not be described repeatedly here in detail.

In S250, controller 612 determines whether a person is detected around the vehicle or not. For example, controller 612 detects a person who is in a predetermined range of distance from vehicle 1000 and whose attract need be attracted. If it is determined that the person is detected around vehicle 1000 (YES in S250), the processing goes to S180. Otherwise (NO in S250), the processing goes to S190.

Operation of controller 612 of vehicle warning device 610 according to the embodiment based on the above structure and flow chart will be described.

For example, if the assumption is made that the driver has entered a location (e.g., a school) where there are many pedestrians and bicycles in navigation system 670 in advance. If the location of vehicle 1000 is in the predetermined range of distance from the entered location (YES in S150) while vehicle 1000 is during the EV traveling (YES in S160) and a person is detected around vehicle 1000 (YES in S250), conducting switch (3) 622 is turned on (S180) and horn sound (2) is generated.

Moreover, even when the location of vehicle 1000 is in the predetermined range of distance from the entered location (YES in S150), if engine 100 has started (NO in S160) and the speed of engine 100 is higher than predetermined speed n (YES in S170), conducting switch (3) 622 is turned off (S190).

Furthermore, when the location of vehicle 1000 is in the predetermined range of distance from the entered location (YES in S150), even if engine 100 has been started (NO in S160), conducting switch (3) 622 is turned on (S180) and horn sound (2) is generated when the speed of engine 100 is lower than predetermined speed n (NO in S170) and a person is detected around vehicle 1000 (YES in S250).

Even if the location of vehicle 1000 is in the predetermined range of distance from the entered location (YES in S150) or even if it is the EV traveling (YES in S160) or engine 100 has been started (NO in S160) and the speed of engine 100 is lower than predetermined speed n (NO in S160), conducting switch (3) 622 is turned off (S190) when no person is detected around vehicle 1000 (NO in S250).

If the location of vehicle 1000 gets out of the predetermined range of distance from the entered location (NO in S150), conducting switch (3) 622 is turned off (S190).

In the above manner, with the vehicle warning device according to the embodiment, in addition to effects of the vehicle warning device according to the above-described fifth embodiment, the controller generates horn sound (2) when a person is detected around the vehicle during traveling of the vehicle to thereby make the existence of the vehicle recognized by the person around the vehicle while suppressing generation of unnecessary horn sounds.

Seventh Embodiment

A vehicle warning device according to a seventh embodiment of the invention will be described below. A vehicle mounted with the vehicle warning device according to the present embodiment is different from the structure of vehicle 1000 mounted with the vehicle warning device according to the above-described fifth embodiment in that warning device 610 further includes an illuminance measuring device 644 and an illuminance sensor 646. Other structures are the same as those of vehicle 1000 mounted with the vehicle warning device according to the above-described fifth embodiment. They are provided with the same reference numerals. They have the same functions. Therefore, they will not be described repeatedly here in detail.

Warning device 610 according to the embodiment further includes illuminance measuring device 644 and illuminance sensor 646 as shown in FIG. 15.

Illuminance measuring device 644 detects illuminance of the surroundings of vehicle 1000. For example, illuminance measuring device 644 detects whether the illuminance of the surroundings of vehicle 1000 corresponds to the daytime or the nighttime based on signals corresponding to intensity and a wavelength of light received from illuminance sensor 646. However, a method of detecting the illuminance is not especially limited to this.

In the embodiment, controller 612 is characterized in that it suppresses generation of horn sound (2) according to the detected illuminance.

Figure 16:
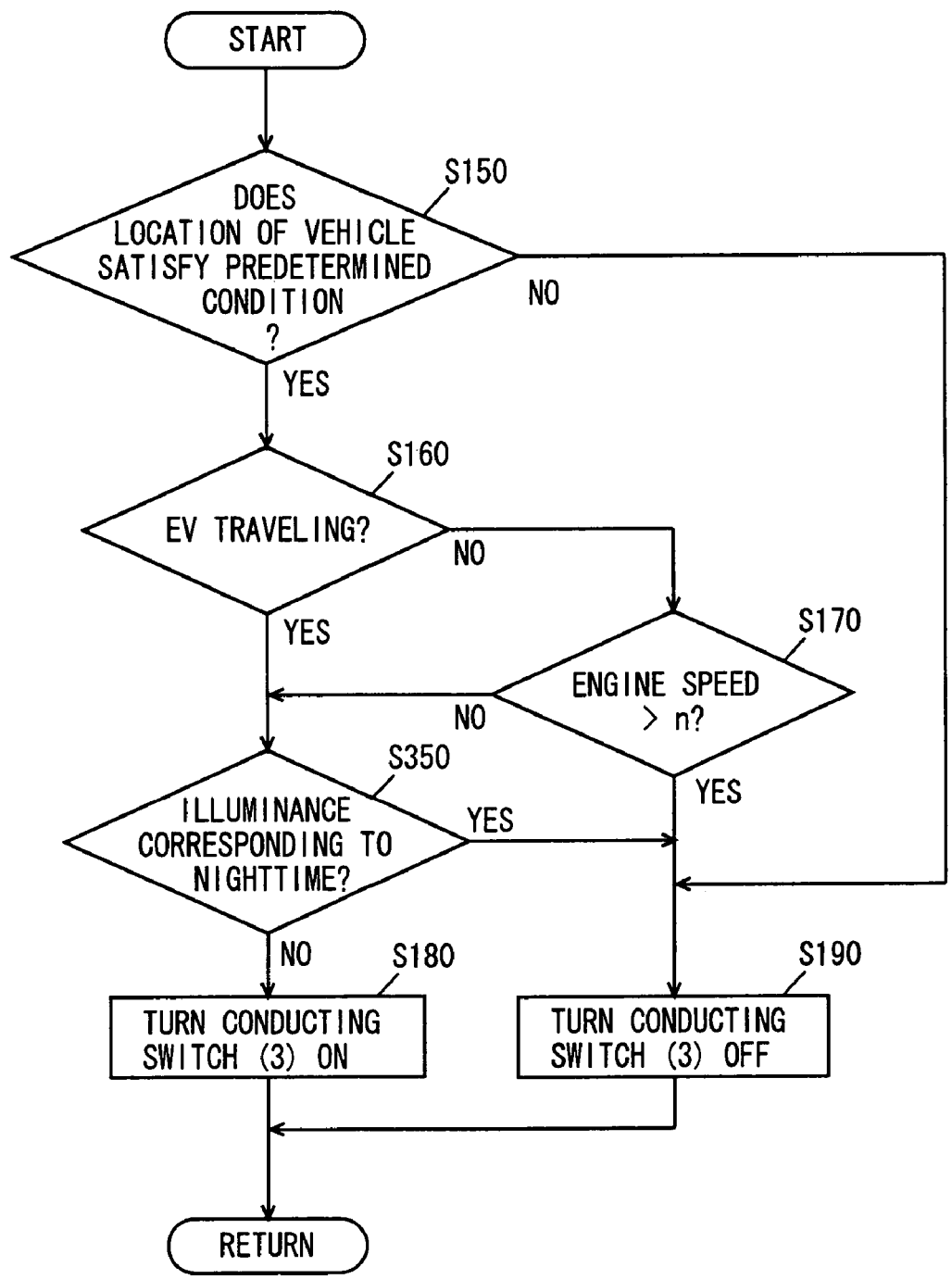
FIG. 16 is a flow chart showing a control configuration of a program executed in a controller of the vehicle warning device according to the seventh embodiment.

With reference to FIG. 16, a control configuration of a program executed in controller 612 of vehicle warning device 610 according to the embodiment will be described below. In the flow chart shown in FIG. 16, the same processings as those in the above-described flow chart shown in FIG. 12 are provided with the same step numbers. They are the same processings. Therefore, they will not be described repeatedly here in detail.

In S350, controller 612 determines whether the detected illuminance of the surroundings of the vehicle is illuminance corresponding to the nighttime or not. Controller 612 determines that the detected illuminance is the illuminance corresponding to the nighttime when it is equal to or lower than predetermined illuminance. If it is determined that the illuminance of the surroundings of the vehicle is the illuminance corresponding to the nighttime (YES in S350), the processing goes to S190. Otherwise, (NO in S350), the processing goes to S180.

Operation of controller 612 of vehicle warning device 610 according to the embodiment based on the above structure and flow chart will be described.

For example, if the assumption is made that the driver has entered a location (e.g., a school) where there are many pedestrians and bicycles in navigation system 670 in advance. If the location of vehicle 1000 is in the predetermined range of distance from the entered location (YES in S150) while vehicle 1000 is during the EV traveling (YES in S160) and the detected illuminance of the surroundings of vehicle 1000 is not the illuminance corresponding to the nighttime (NO in S350), conducting switch (3) 622 is turned on (S180) and horn sound (2) is generated.

Moreover, even when the location of vehicle 1000 is in the predetermined range of distance from the entered location (YES in S150), if engine 100 has started (NO in S160) and the speed of engine 100 is higher than predetermined speed n (YES in S170), conducting switch (3) 622 is turned off (S190).

Furthermore, when the location of vehicle 1000 is in the predetermined range of distance from the entered location (YES in S150), even if engine 100 has been started (NO in S160), conducting switch (3) 622 is turned on (S180) and horn sound (2) is generated when the speed of engine 100 is lower than predetermined speed n (NO in S170) and the illuminance of the surroundings of vehicle 1000 is not the illuminance corresponding to the nighttime (NO in S350).

Moreover, even when the location of vehicle 1000 is in the predetermined range of distance from the entered location (YES in S150), if it is the EV traveling (YES in S160) or engine 100 has started (NO in S160) and the illuminance of the surroundings of vehicle 1000 is the illuminance corresponding to the nighttime (YES in S350), conducting switch (3) 622 is turned off (S190).

If the location of vehicle 1000 gets out of the predetermined range of distance from the entered location (NO in S150), conducting switch (3) 622 is turned off (S190).

In the above manner, with the vehicle warning device according to the embodiment, in addition to effects of the vehicle warning device according to the above-described fifth embodiment, because generation of horn sound (2) is suppressed based on detection that it is the nighttime, it is possible to prevent residents around the vehicle from feeling unpleasant.

Eighth Embodiment

A vehicle warning device according to an eighth embodiment of the invention will be described below. A structure of a vehicle mounted with the vehicle warning device according to the present embodiment is the same as that of vehicle 1000 mounted with the vehicle warning device according to the first embodiment described above by using FIG. 1. Moreover, a structure of warning device 610 according to the embodiment is the same as that of warning device 610 according to the second embodiment described above by using FIG. 4. They are provided with the same reference numerals. They have the same functions. Therefore, they will not be described repeatedly here in detail.

Figure 17:
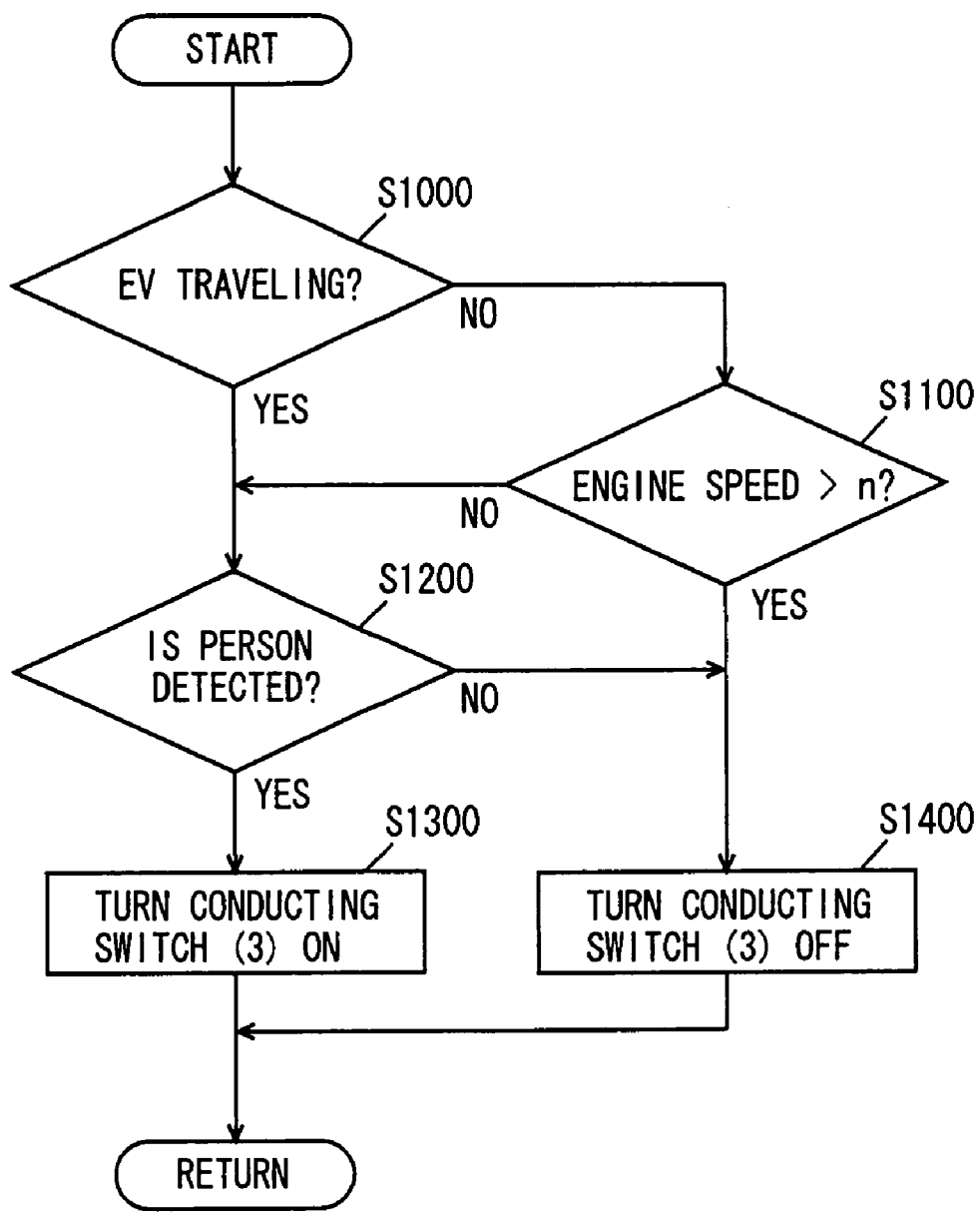
FIG. 17 is a flow chart showing a control configuration of a program executed in a controller of the vehicle warning device according to the eighth embodiment.

With reference to FIG. 17, a control configuration of a program executed in controller 612 of vehicle warning device 610 according to the embodiment will be described below.

In S1000, controller 612 determines whether it is EV (Electric Vehicle) traveling or not. The "EV traveling" refers to traveling of the vehicle by the driving force of MG (2) 500 when engine 100 is at a stop. Controller 612 receives signals indicating a sate of engine 100 and indicating that vehicle 1000 is traveling by the driving force of MG (2) 500 from HV-ECU 600 and determines whether it is the EV traveling or not. If it is determined that it is the EV traveling (YES in S1000), processing goes to S1200. Otherwise (NO in S1000), the processing goes to S1100.

In S1100, controller 612 determines whether or not a speed of engine 100 is higher than a predetermined speed n. "Predetermined speed n" is not especially limited as long as it is such a speed of engine 100 that noise generated from the vehicle is quiet. Controller 612 may receive a signal corresponding to the speed of engine 100 from HV-ECU 600 or may receive the signal corresponding to the speed of engine 100 from an engine ECU (not shown). If the speed of engine 100 is higher than predetermined speed n (YES in S1100), the processing goes to S1300. Otherwise (NO in S1100), the processing goes to S1200.

In S1200, controller 612 determines whether a person is detected around the vehicle or not. For example, controller 612 detects a person who is in a predetermined range of distance from vehicle 1000 and whose attention need be attracted. If it is determined that the person is detected around vehicle 1000 (YES in S1200), the processing goes to S1300. Otherwise (NO in S1200), the processing goes to S1400.

In S1300, controller 612 turns conducting switch (3) 622 on. In other words, controller 612 controls conducting switch (3) 622 to come into conduction. In S1400, controller 612 turns conducting switch (3) 622 off. In other words, controller 612 controls conducting switch (3) 622 to come into a disconnected state.

Operation of controller 612 of vehicle warning device 610 according to the embodiment based on the above structure and flow chart will be described.

If it becomes the EV traveling during traveling of the vehicle (YES in S1000) and a person is detected around vehicle 1000 (YES in S1200), conducting switch (3) 622 is turned on (S1300) and horn sound (2) is generated. Then, if engine 100 has started (NO in S1000) and the speed of engine 100 is higher than predetermined speed n (YES in S1100), conducting switch (3) 622 is turned off (S1400). Even if engine 100 has been started (NO in S1000), conducting switch (3) 622 is turned on (S1300) and horn sound (2) is generated when the speed of engine 100 is lower than predetermined speed n (NO in S1100) and a person is detected around vehicle 1000 (YES in S1200). Even if it is the EV traveling (YES in S1000) or engine 100 has started (NO in S1000) and the speed of engine 100 is lower than predetermined speed n (NO in S1100), conducting switch (3) 622 is turned off (S1400) when no person is detected around the vehicle (NO in S1200).

As described above, with the vehicle warning device according to the embodiment, the controller generates horn sound (2) if a person is detected around the vehicle and if it is during traveling by the driving force of the driving electric motor or if the speed of the engine is lower than the predetermined speed. If horn sound (2) is generated when a person is detected in case where the noise generated from the vehicle is quiet during traveling of the vehicle, e.g., during traveling by the driving force of the driving electric motor or when the speed of the engine is lower than the predetermined speed, it is possible to make the existence of the vehicle recognized by the person around the vehicle to attract his/her attention. Furthermore, by not generating horn sound (2) when a person is detected in case where the noise generated from the vehicle is loud, e.g., when the speed of the engine is higher than the predetermined speed, it is possible to make the existence of the vehicle recognized by utilizing the noise generated from the vehicle to thereby attract attention. As a result, it is possible to suppress generation of unnecessary warnings. Thus, it is possible to provide the vehicle warning device for attracting attention of the people around the vehicle according to the traveling state of the hybrid vehicle. Moreover, because it is possible to generate horn sound (2) without operation by the driver during traveling of the vehicle by the driving force of the driving electric motor or when the speed of the engine is lower than the predetermined speed, it is possible to lighten an operation load for the driver.

Moreover, by detecting a person who is in a predetermined range of distance from the vehicle and whose attention need be attracted to generate horn sound (2) during traveling of the vehicle, it is possible to make the existence of the vehicle recognized by the detected person. Because horn sound (2) is not generated for a person who is outside the predetermined range of distance from the vehicle and whose attention need not be attracted during traveling of the vehicle, it is possible to suppress generation of unnecessary warnings.

If horn (2) satisfies one of a condition that it has a volume level equal to or lower than that of horn sound (1) and a condition that it is a gentle tone less irritant to the human auditory sense, it is possible to attract attention of the people around the vehicle without making them unpleasant.

Although horn sound (2) is generated when the speed of engine 100 is lower than predetermined speed n in the embodiment, the state is not especially limited to the speed of engine 100 as long as it is a state related to the noise generated from the vehicle. For example, it is also possible to generate horn sound (2) if a detected vehicle speed is equal to or lower than a predetermined speed. If the vehicle speed reduces, noise such as pattern noise of tires generated from the vehicle becomes quiet. Therefore, if the control is carried out to generate horn sound (2) when the vehicle speed is lower than the predetermined vehicle speed during traveling of the vehicle, it is possible to make the existence of the vehicle recognized by the people around the vehicle when the noise generated from the vehicle is quiet. It is also possible to set a contribution ratio (weighting factors) of the vehicle speed and the engine speed affecting the noise generated from the vehicle. In other words, if the sum of values obtained by multiplying the detected engine speed and vehicle speed by their respective weighting factors is equal to or smaller than a predetermined value, horn sound (2) may be generated.

Moreover, by properly using the operating forces applied to the one operation switch, it is possible to generate at least one of horn sound (1) and horn sound (2) to thereby improve operability.

Furthermore, a switch for operating horn B may be further provided at a periphery of a passenger's seat of the vehicle. In this way, it is possible to operate horn B in the passenger's seat of the vehicle and therefore a passenger seated in the passenger's seat can generate horn sound (2) to make the existence of the vehicle recognized by the people around the vehicle.

Moreover, the sound generating device can generate the predetermined type of sound in the vehicle interior to notify that horn sound (2) is being generated. As a result, the driver can recognize that horn sound (2) has been generated. Furthermore, if horn sound (2) is set to be generated when a person around the vehicle is detected, the driver can recognize that there is the person around the vehicle based on the notification by the sound generating device. Although the sound generating device generates the sound to thereby notify generation of horn sound (2) in the embodiment, the way of notification is not limited to this. For example, information notifying generation of horn sound (2) may be displayed on display device 660 in synchronization with generation of horn sound (2) by horn B.

It is preferable that the controller receives data corresponding to the type of sound such as a melody through the HV-ECU and the communication device and that the type of sound is set based on the received data. In this way, the melody desired by the driver can be set as the type of sound for notifying generation of horn sound (2).

Moreover, a plurality of horns B may be provided to the vehicle. The controller may select at least one of them to generate horn sound (2) when a person is detected. For example, a plurality of horns B are provided to a periphery of the vehicle and horn B provided in a direction in which the person is detected generates a warning when the person is detected. In this way, it is possible to more effectively make the existence of the vehicle recognized by the person around the vehicle to attract his/her attention.

In the invention, it is essential only that horn B can make the existence of the vehicle recognized by the people around the vehicle and horn B is not limited to generation of a sound as a warning. For example, horn B may generate light or may generate a smell.

Ninth Embodiment

A vehicle warning device according to a ninth embodiment of the invention will be described below. A vehicle mounted with the vehicle warning device according to the present embodiment is different from the structure of vehicle 1000 mounted with the vehicle warning device according to the above-described eighth embodiment in that warning device 610 further includes an illuminance measuring device 644 and an illuminance sensor 646. Other structures are the same as those of vehicle 1000 mounted with the vehicle warning device according to the above-described eighth embodiment. They are provided with the same reference numerals. They have the same functions. Therefore, they will not be described repeatedly here in detail.

Figure 18:
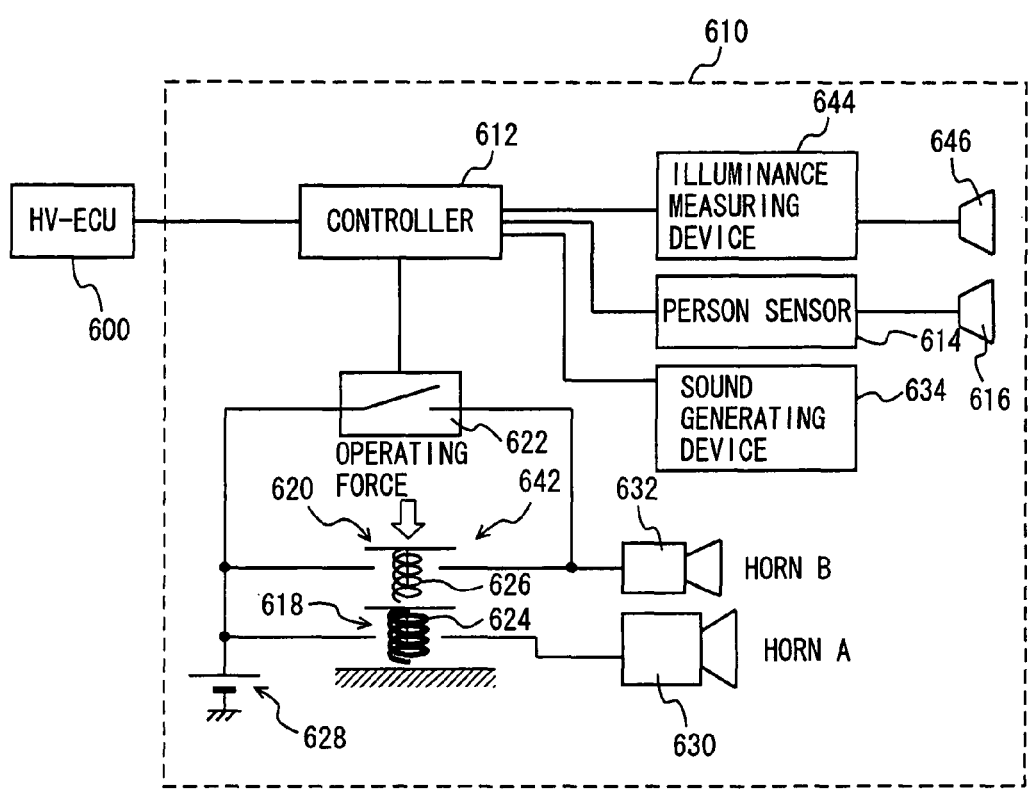
FIG. 18 is a drawing showing a structure of a vehicle warning device according to a ninth embodiment.

As shown in FIG. 18, warning device 610 according to the embodiment further includes illuminance measuring device 644 and illuminance sensor 646.

Illuminance measuring device 644 detects illuminance of the surroundings of vehicle 1000. For example, illuminance measuring device 644 detects whether the illuminance of the surroundings of vehicle 1000 corresponds to the daytime or the nighttime based on signals corresponding to intensity and a wavelength of light received from illuminance sensor 646. However, a method of detecting the illuminance is not especially limited to this.

In the embodiment, controller 612 is characterized in that it suppresses generation of horn sound (2) according to the detected illuminance.

Figure 19:
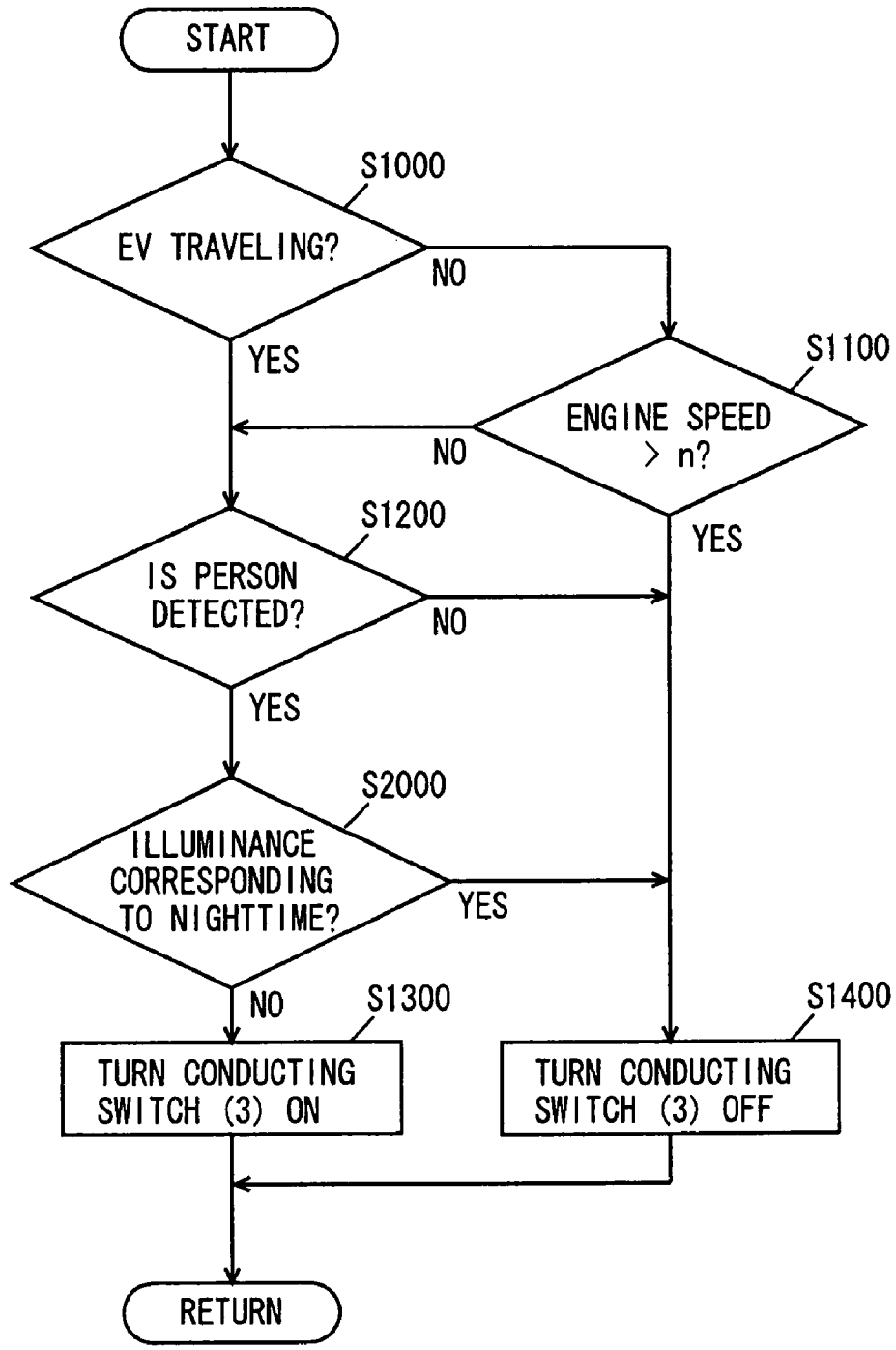
FIG. 19 is a flow chart showing a control configuration of a program executed in a controller of the vehicle warning device according to the ninth embodiment.

With reference to FIG. 19, a control configuration of a program executed in controller 612 of vehicle warning device 610 according to the embodiment will be described below. In the flow chart shown in FIG. 19, the same processings as those in the above-described flow chart shown in FIG. 17 are provided with the same step numbers. They are the same processings. Therefore, they will not be described repeatedly here in detail.

In S2000, controller 612 determines whether or not the detected illuminance of the surroundings of the vehicle is illuminance corresponding to the nighttime. Controller 612 determines that the detected illuminance is the illuminance corresponding to the nighttime when it is equal to or lower than predetermined illuminance. If it is determined that the illuminance of the surroundings of the vehicle is the illuminance corresponding to the nighttime (YES in S2000), the processing goes to S1400. Otherwise, (NO in S2000), the processing goes to S1300.

Operation of controller 612 of vehicle warning device 610 according to the embodiment based on the above structure and flow chart will be described.

If the vehicle comes into the EV traveling state (YES in S1000) during traveling of the vehicle while a person is detected (YES in S1200) and the detected illuminance of surroundings of vehicle 1000 is not the illuminance corresponding to the nighttime (NO in S2000), conducting switch (3) 622 is turned on (S1300) to generate horn sound (2). If engine 100 has started (NO in S1000) and the speed of engine 100 is higher than predetermined speed n (YES in S1100), conducting switch (3) 622 is turned off (S1400). Even when engine 100 has started (NO in S1000), if the speed of engine 100 is lower than predetermined speed n (NO in S1100) while a person is detected (YES in S1200) and the detected illuminance of the surroundings of vehicle 1000 is not the illuminance corresponding to the nighttime (NO in S2000), conducting switch (3) 622 is turned on (S1300) to generate horn sound (2). Even when it is the EV traveling (YES in S1000) and a person is detected (YES in S1200) or even when engine 100 has started (NO in S1000) while the speed of engine 100 is lower than predetermined speed n (NO in S1100) and a person is detected (YES in S1200), conducting switch (3) 622 is turned off (S1400) when the detected illuminance of surroundings of the vehicle is the illuminance corresponding to the nighttime (YES in S2000).

In the above manner, with the vehicle warning device according to the embodiment, in addition to effects of the vehicle warning device according to the above-described eighth embodiment, because generation of horn sound (2) is suppressed based on detection that it is the nighttime, it is possible to prevent residents around the vehicle from feeling unpleasant.

Tenth Embodiment

A vehicle warning device according to a tenth embodiment of the invention will be described below. A vehicle mounted with the vehicle warning device according to the present embodiment is different from the structure of vehicle 1000 mounted with the vehicle warning device according to the first embodiment described above by using FIG. 1 in that the vehicle includes an ignition switch 670, a parking brake switch 672, a brake switch 674, and a shift position sensor 676. A structure of warning device 610 according to the embodiment is the same as that of warning device 610 according to the second embodiment described above by using FIG. 4. They are provided with the same reference numerals. They have the same functions. Therefore, they will not be described repeatedly here in detail.

As shown in FIG. 20, if ignition switch 670 (hereafter referred to as "IG switch") is turned on by key operation by the driver, the vehicle comes into such a state that it can start. In other words, when IG switch 670 is turned on, vehicle 1000 comes into such a state that MG (2) 500 as a driving source can be actuated.

Parking brake switch 672 is provided to a parking lever (not shown). If the driver operates the parking lever to an actuation side and the parking lever comes into a predetermined operated position, parking brake switch 672 sends an ON signal indicating actuation of a parking brake device to HV-ECU 600. If the driver operates the parking lever to a cancellation side and the parking lever comes into a predetermined operated position, parking brake switch 672 sends an OFF signal indicating cancellation of actuation of the parking brake device to HV-ECU 600. When the driver operates the parking lever to the cancellation side, parking brake switch 672 may not send the ON signal to HV-ECU 600.

Brake switch 674 is provided to a brake pedal (not shown). If the driver operates the brake pedal to a pressed-down side and the brake pedal comes into a predetermined pressed-down position, brake switch 674 sends an ON signal indicating actuation of the brake to HV-ECU 600. If the driver operates the brake pedal to a cancellation side and the brake pedal comes into a predetermined operated position, the brake switch 674 sends an OFF signal indicating cancellation of actuation of the brake to HV-ECU 600. When the driver operates the brake pedal to the cancellation side, the brake switch 672 may not send the ON signal to HV-ECU 600. It is also possible to use a brake lamp switch, for example, as the brake switch 674.

Shift position sensor 676 is provided to a shift lever (not shown). If the driver operates the shift lever and the shift lever is moved to any one of a plurality of shift positions, shift position sensor 676 sends a position signal corresponding to the shift position where the lever has been moved to HV-ECU 600.

The invention is characterized in that controller 612 controls warning device 610 to generate a warning when parked vehicle 1000 is operated to enable the vehicle to start, i.e., IG switch 670 is turned on and a person is detected by person sensor 614.

Figure 21:
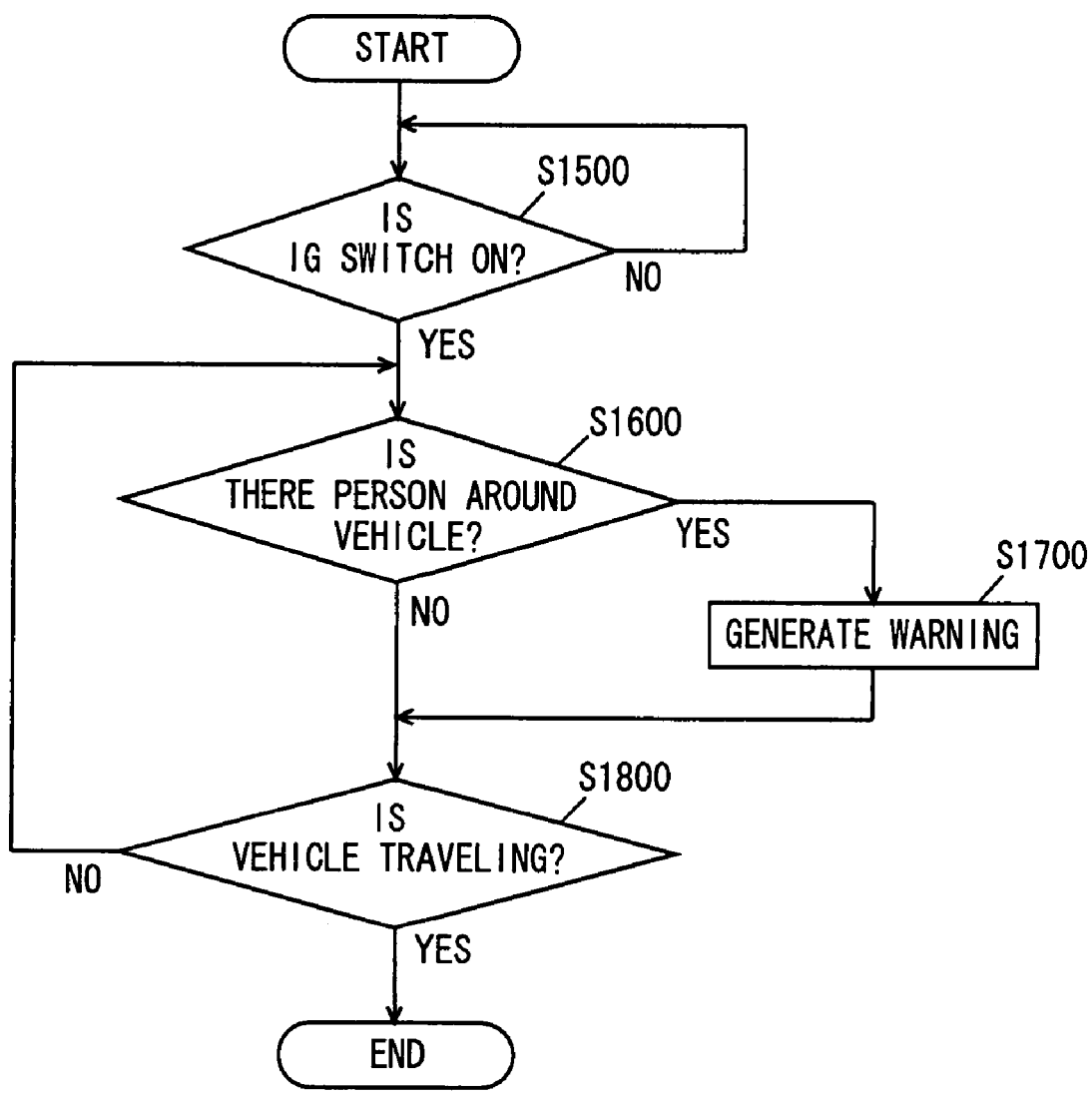
FIG. 21 is a flow chart showing a control configuration of a program executed in a controller of the vehicle warning device according to the tenth embodiment.

With reference to FIG. 21, a control configuration of a program executed in controller 612 of vehicle warning device 610 according to the embodiment will be described below.

In S1500, controller 612 determines whether the IG switch is turned on or not. Controller 612 determines whether IG switch 670 is turned on or not based on the ON signal of IG switch 670 received from HV-ECU 600. If IG switch 670 is turned on (YES in S1500), the processing goes to S1600. Otherwise (NO in S1500), the processing returns to S1500.

In S1600, controller 612 determines whether or not a person is detected around the vehicle. For example, controller 612 detects a person who is in a predetermined range of distance from vehicle 1000 and whose attention need be attracted. If it is determined that the person is detected around vehicle 1000 (YES in S1600), the processing goes to S1700. Otherwise (NO in S1600), the processing goes to S1800.

In S1700, controller 612 generates a warning. To put it concretely, controller 612 carries out a control to bring conducting switch (3) 622 into conduction to thereby generate an audible alert. Controller 612 may stop generation of the audible alert when a predetermined time has elapsed or may stop generation of the audible alert when no person is detected. The method of stopping the warning is not especially limited.

In S1800, controller 612 determines whether vehicle 1000 is traveling or not. For example, controller 612 determines whether or not vehicle 1000 is traveling based on a vehicle speed signal received from HV-ECU 600. However, the method of determination is not especially limited. If it is determined that vehicle 1000 is traveling (YES in S1800), the processing ends. Otherwise (NO in S1800), the processing returns to S1600.

Operation of controller 612 of vehicle warning device 610 according to the embodiment based on the above structure and flow chart will be described.

If the driver turns IG switch 670 on when vehicle 1000 is at the stop to enable MG (2) 500 to be actuated (YES in S1500) and a person is detected around vehicle 1000 (YES in S1600), a warning is generated (S1700). If vehicle 1000 does not start (NO in S1800), the warning is generated (S1700) as long as a person is detected (YES in S1600).

If IG switch 670 is turned on (YES in S1500) and no person is detected around vehicle 1000 (NO in S1600), the warning is not generated.

In the above manner, with the vehicle warning device according to the embodiment, the controller generates the warning to the detected person when the IG switch is turned on to enable the parked vehicle to start. Thus, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely. Therefore, it is possible to provide the vehicle warning device for making the existence of the vehicle recognized early before the start of the vehicle. Moreover, because horn sound (2) can be generated without operation by the driver, it is possible to lighten an operation load for the driver.

Moreover, by detecting a person who is in a predetermined range of distance from the vehicle and whose attention need be attracted to generate horn sound (2) during traveling of the vehicle, it is possible to make the existence of the vehicle recognized by the detected person. Because horn sound (2) is not generated for a person who is outside the predetermined range of distance from the vehicle and whose attention need not be attracted during traveling of the vehicle, it is possible to suppress generation of unnecessary warnings.

If horn (2) satisfies one of a condition that it has a volume level equal to or lower than that of horn sound (1) and a condition that it is a gentle tone less irritant to the human auditory sense, it is possible to attract attention of the people around the vehicle without making them unpleasant.

Moreover, by properly using the operating forces applied to the one operation switch, it is possible to generate at least one of horn sound (1) and horn sound (2) to thereby improve operability.

Furthermore, a switch for operating horn B may be further provided at a periphery of a passenger's seat of the vehicle. In this way, it is possible to operate horn B in the passenger's seat of the vehicle and therefore a passenger seated in the passenger's seat can generate horn sound (2) to make the existence of the vehicle recognized by the people around the vehicle.

Moreover, the sound generating device generates the predetermined type of sound in the vehicle interior to notify that horn sound (2) is being generated. As a result, the driver can recognize that horn sound (2) has been generated. Furthermore, if horn sound (2) is set to be generated when a person around the vehicle is detected, the driver can recognize that there is the person around the vehicle based on the notification by the sound generating device. Although the sound generating device generates the sound to thereby notify generation of horn sound (2) in the embodiment, the way of notification is not especially limited to this. For example, information notifying generation of horn sound (2) may be displayed on display device 660 in synchronization with generation of horn sound (2) by horn B.

It is preferable that the controller receives data corresponding to the type of sound such as a melody through the HV-ECU and the communication device and that the type of sound is set based on the received data. In this way, the melody desired by the driver can be set as the type of sound for notifying generation of horn sound (2).

Moreover, a plurality of horns B may be provided to the vehicle. The controller may select at least one of them to generate horn sound (2) when a person is detected. For example, a plurality of horns B are provided to a periphery of the vehicle and horn B provided in a direction in which the person is detected generates a warning when the person is detected. In this way, it is possible to more effectively make the existence of the vehicle recognized by the person around the vehicle to attract his/her attention.

In the embodiment, it is essential only that horn B can make the existence of the vehicle recognized by the people around the vehicle and horn B is not limited to generation of a sound as a warning. For example, horn B may generate light or may generate a smell.

Although the warning device generates the audible alert by horn B when a person is detected in the above description, the audible alert may be the operating sound of the engine. In other words, the controller may carry out a control to forcibly actuate the engine when a person is detected. In this way, it is possible to make the existence of the vehicle recognized by the person around the vehicle to attract his/her attention.

It is also possible that the warning device generates a predetermined type of melody or music as the audible alert. For example, the warning device may receive data corresponding to the type of audible alert through the communication device and the HV-ECU to set the received type as the audible alert. In this way, the melody or music desired by the driver can be set as the type of audible alert and it is possible to make the existence of the vehicle recognized by the people around the vehicle to attract their attention without making them unpleasant.

Eleventh Embodiment

A vehicle warning device according to an eleventh embodiment of the invention will be described below. A vehicle mounted with the vehicle warning device according to the present embodiment is different from the structure of vehicle 1000 mounted with the vehicle warning device according to the above-described tenth embodiment in a control configuration of a program executed in controller 612. Other structures are the same as those of vehicle 1000 mounted with the vehicle warning device according to the above-described tenth embodiment. They are provided with the same reference numerals. They have the same functions. Therefore, they will not be described repeatedly here in detail.

In the embodiment, controller 612 is characterized in that it controls warning device 610 to generate a warning if a person is detected when IG switch 670 is turned on and a foot brake is operated.

Figure 22:
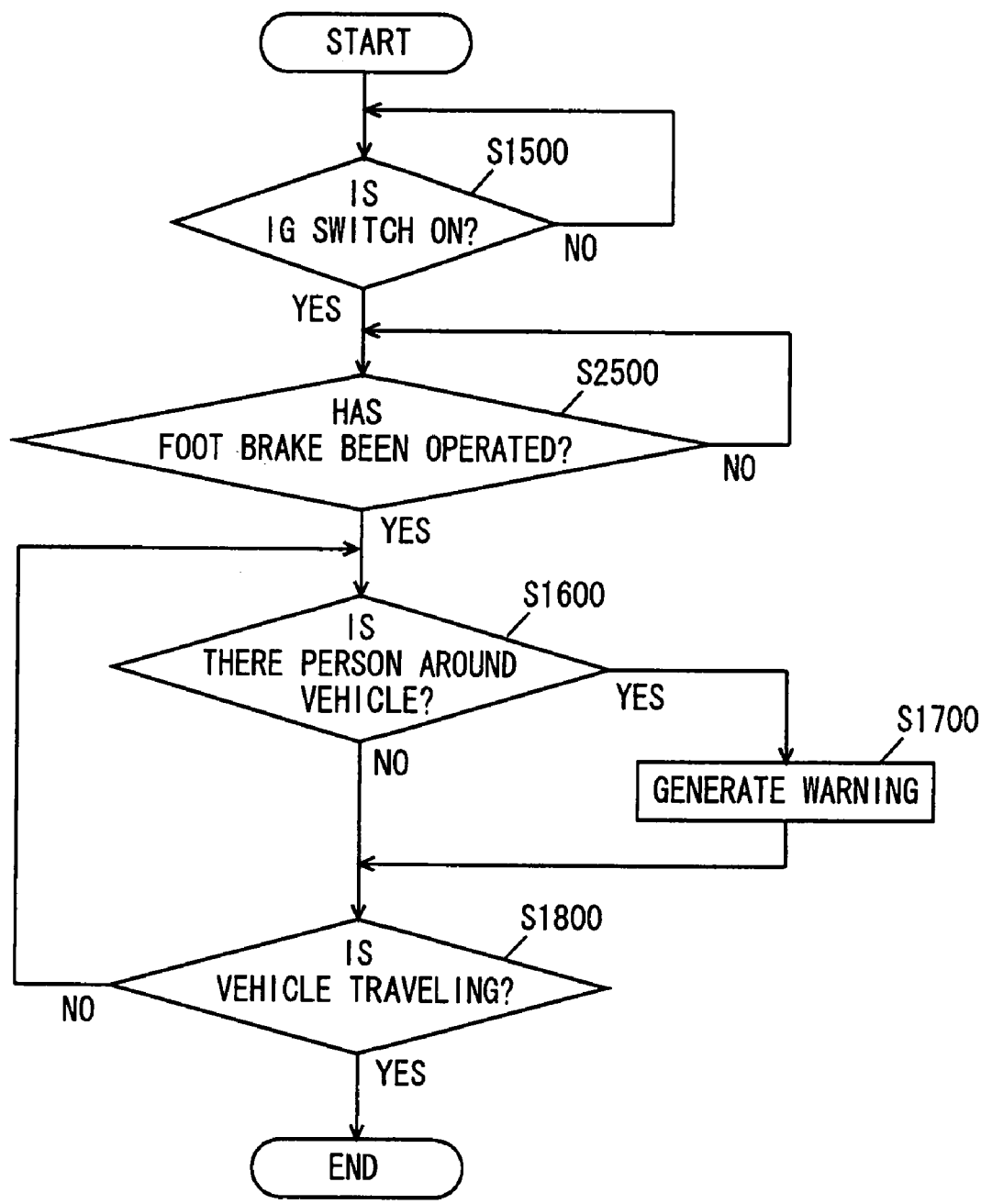
FIG. 22 is a flow chart showing a control configuration of a program executed in a controller of a vehicle warning device according to an eleventh embodiment.

With reference to FIG. 22, the control configuration of the program executed in controller 612 of vehicle warning device 610 according to the embodiment will be described below. In the flow chart shown in FIG. 22, the same processings as those in the above-described flow chart shown in FIG. 21 are provided with the same step numbers. They are the same processings. Therefore, they will not be described repeatedly here in detail.

In step S2500, controller 612 determines whether the foot brake has been operated or not. Controller 612 determines that the foot brake has been operated when a signal received from brake switch 674 via HV-ECU 600 turns from an OFF signal into an ON signal, for example. In other words, controller 612 determines whether or not the foot brake has been operated to a pressed-down side. If it is determined that the foot brake has been operated (YES in S2500), the processing goes to S1600. Otherwise (NO in S2500), the processing returns to S2500. Alternatively, controller 612 may determine that the foot brake has been operated when the signal received from brake switch 674 via HV-ECU 600 turns from the ON signal into the OFF signal.

Operation of controller 612 of vehicle warning device 610 according to the embodiment based on the above structure and flow chart will be described.

If the driver turns IG switch 670 on when vehicle 100 is parked to enable MG (2) 500 to be actuated (YES in S1500) and the foot brake is operated to the pressed-down side by the driver (YES in S2500), a warning is generated (S1700) when a person is detected around vehicle 1000 (YES in S1600). If vehicle 1000 does not start (NO in S1800), the warning is generated (S1700) as long as a person is detected (YES in S1600).

When IG switch 670 is turned on (YES in S1500) and the foot brake is operated to the pressed-down side (YES in S2500), the warning is not generated if no person is detected around vehicle 1000 (NO in S1600).

In the above manner, with the vehicle warning device according to the embodiment, in addition to effects of the vehicle warning device according to the above-described tenth embodiment, the controller generates the warning to the detected person when the IG switch is turned on to enable MG (2) of the vehicle to be actuated and the foot brake is operated. Before the start of the vehicle after the IG switch is turned on, there are two cases, i.e., a case where the IG switch is turned on after the driver operates the foot brake to the pressed-down side to actuate the brake and a case where the driver operates the foot brake to a cancellation side to cancel actuation of the brake before the driver starts the vehicle. Therefore, by generating the warning to the detected person when the IG switch is turned on and the foot brake is operated to the pressed-down side or the cancellation side, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

Twelfth Embodiment

A vehicle warning device according to a twelfth embodiment of the invention will be described below. A vehicle mounted with the vehicle warning device according to the present embodiment is different from the structure of vehicle 1000 mounted with the vehicle warning device according to the above-described tenth embodiment in a control configuration of a program executed in controller 612. Other structures are the same as those of vehicle 1000 mounted with the vehicle warning device according to the above-described tenth embodiment. They are provided with the same reference numerals. They have the same functions. Therefore, they will not be described repeatedly here in detail.

In the embodiment, controller 612 is characterized in that it controls warning device 610 to generate a warning if a person is detected when IG switch 670 is turned on and a shift lever is operated.

Figure 23:
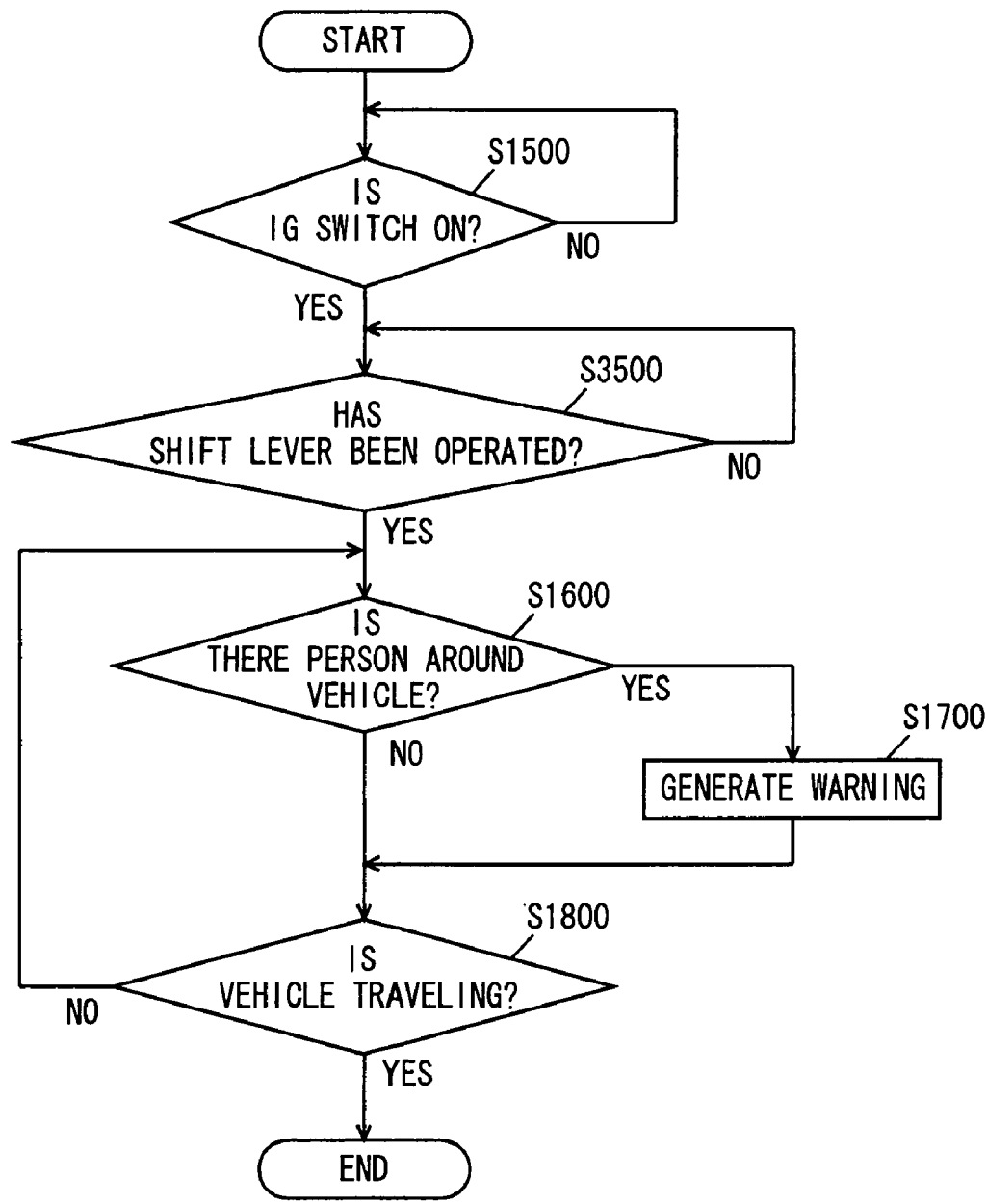
FIG. 23 is a flow chart showing a control configuration of a program executed in a controller of a vehicle warning device according to a twelfth embodiment.

With reference to FIG. 23, the control configuration of the program executed in controller 612 of vehicle warning device 610 according to the embodiment will be described below. In the flow chart shown in FIG. 23, the same processings as those in the above-described flow chart shown in FIG. 21 are provided with the same step numbers. They are the same processings. Therefore, they will not be described repeatedly here in detail.

In step S3500, controller 612 determines whether the shift lever has been operated or not. Controller 612 determines whether or not the shift lever has been operated from a parking position to a driving position based on a shift position signal received from a shift position sensor 676 via HV-ECU 600, for example. If it is determined that the shift lever has been operated (YES in S3500), the processing goes to S1600. Otherwise (NO in S3500), the processing returns to S3500. Alternatively, controller 612 may determine whether or not the shift lever has been operated based on whether or not the shift position has been changed indicated by the shift position signal received from shift position sensor 676 via HV-ECU 600.

Operation of controller 612 of vehicle warning device 610 according to the embodiment based on the above structure and flow chart will be described.

If the driver turns IG switch 670 on when vehicle 1000 is parked to enable MG (2) 500 to be actuated (YES in S1500) and the shift lever is operated from the parking position to the driving position by the driver (YES in S3500), a warning is generated (S1700) when a person is detected around vehicle 1000 (YES in S1600). If vehicle 1000 does not start (NO in S1800), the warning is generated (S1700) as long as a person is detected (YES in S1600).

When IG switch 670 is turned on (YES in S1500) and the shift lever is operated from the parking position to the driving position (YES in S3500), the warning is not generated if no person is detected around vehicle 1000 (NO in S1600).

In the above manner, with the vehicle warning device according to the embodiment, in addition to effects of the vehicle warning device according to the above-described tenth embodiment, the controller generates the warning to the detected person when the IG switch is turned on to enable MG (2) of the vehicle to be actuated and the shift lever is operated from the parking position to the driving position. By the time the vehicle starts after the IG switch is turned on, the shift lever may be operated from the parking position to the driving position. Therefore, by generating the warning to the detected person when the shift lever is operated after the IG switch is turned on, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

Thirteenth Embodiment

A vehicle warning device according to a thirteenth embodiment of the invention will be described below. A vehicle mounted with the vehicle warning device according to the present embodiment is different from the structure of vehicle 1000 mounted with the vehicle warning device according to the above-described tenth embodiment in a control configuration of a program executed in controller 612. Other structures are the same as those of vehicle 1000 mounted with the vehicle warning device according to the above-described tenth embodiment. They are provided with the same reference numerals. They have the same functions. Therefore, they will not be described repeatedly here in detail.

In the embodiment, controller 612 is characterized in that it controls warning device 610 to generate a warning if a person is detected when IG switch 670 is turned on and a parking brake device is operated to cancel actuation of a parking brake.

Figure 24:
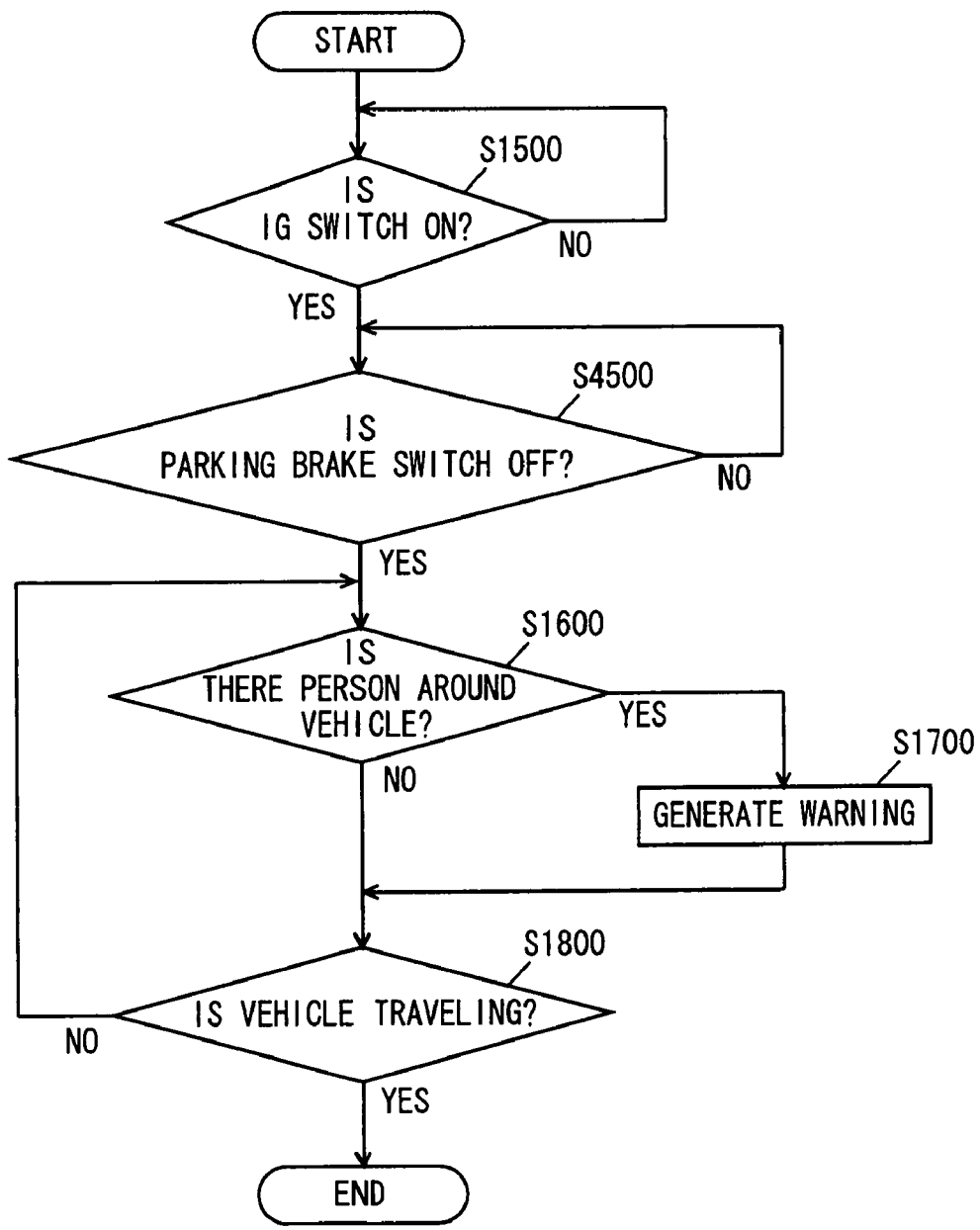
FIG. 24 is a flow chart showing a control configuration of a program executed in a controller of a vehicle warning device according to a thirteenth embodiment.

With reference to FIG. 24, the control configuration of the program executed in controller 612 of vehicle warning device 610 according to the embodiment will be described below. In the flow chart shown in FIG. 24, the same processings as those in the above-described flow chart shown in FIG. 21 are provided with the same step numbers. They are the same processings. Therefore, they will not be described repeatedly here in detail.

In step S4500, controller 612 determines whether parking brake switch 672 is off or not. Controller 612 determines that actuation of the parking brake has been canceled when a signal received from parking brake switch 672 via HV-ECU 600 turns from an ON signal into an OFF signal or when the ON signal is not received. If it is determined that parking brake switch 672 is off (YES in S4500), the processing goes to S1600. Otherwise (NO in S4500), the processing returns to S4500.

Operation of controller 612 of vehicle warning device 610 according to the embodiment based on the above structure and flow chart will be described.

If the driver turns IG switch 670 on when vehicle 1000 is in a parked state to enable MG (2) 500 to be actuated (YES in S1500) and the driver operates the parking lever to cancel actuation of the parking brake (YES in S4500), a warning is generated (S1700) when a person is detected around vehicle 1000 (YES in S1600). If vehicle 1000 does not start (NO in S1800), the warning is generated (S1700) as long as a person is detected (YES in S1600).

When IG switch 670 is turned on (YES in S1500) and operation is carried out to cancel actuation of the parking brake (YES in S4500), the warning is not generated if no person is detected around vehicle 1000 (NO in S1600).

In the above manner, with the vehicle warning device according to the embodiment, in addition to effects of the vehicle warning device according to the above-described tenth embodiment, the controller generates the warning to the detected person when the IG switch is turned on to enable MG (2) to be actuated and operation is carried out to cancel actuation of the parking brake. By the time the vehicle starts after the IG switch is turned on, actuation of the parking brake is canceled. Therefore, by generating the warning to the detected person when the IG switch is turned on and the parking brake device is operated, it is possible to make the existence of the vehicle recognized by the person around the vehicle to attract his/her attention earlier before the start of the vehicle. Because it is possible to make the existence of the vehicle recognized before the start of the vehicle even if the person approaches the vehicle, the vehicle can start more safely.

Fourteenth Embodiment

Figure 25:
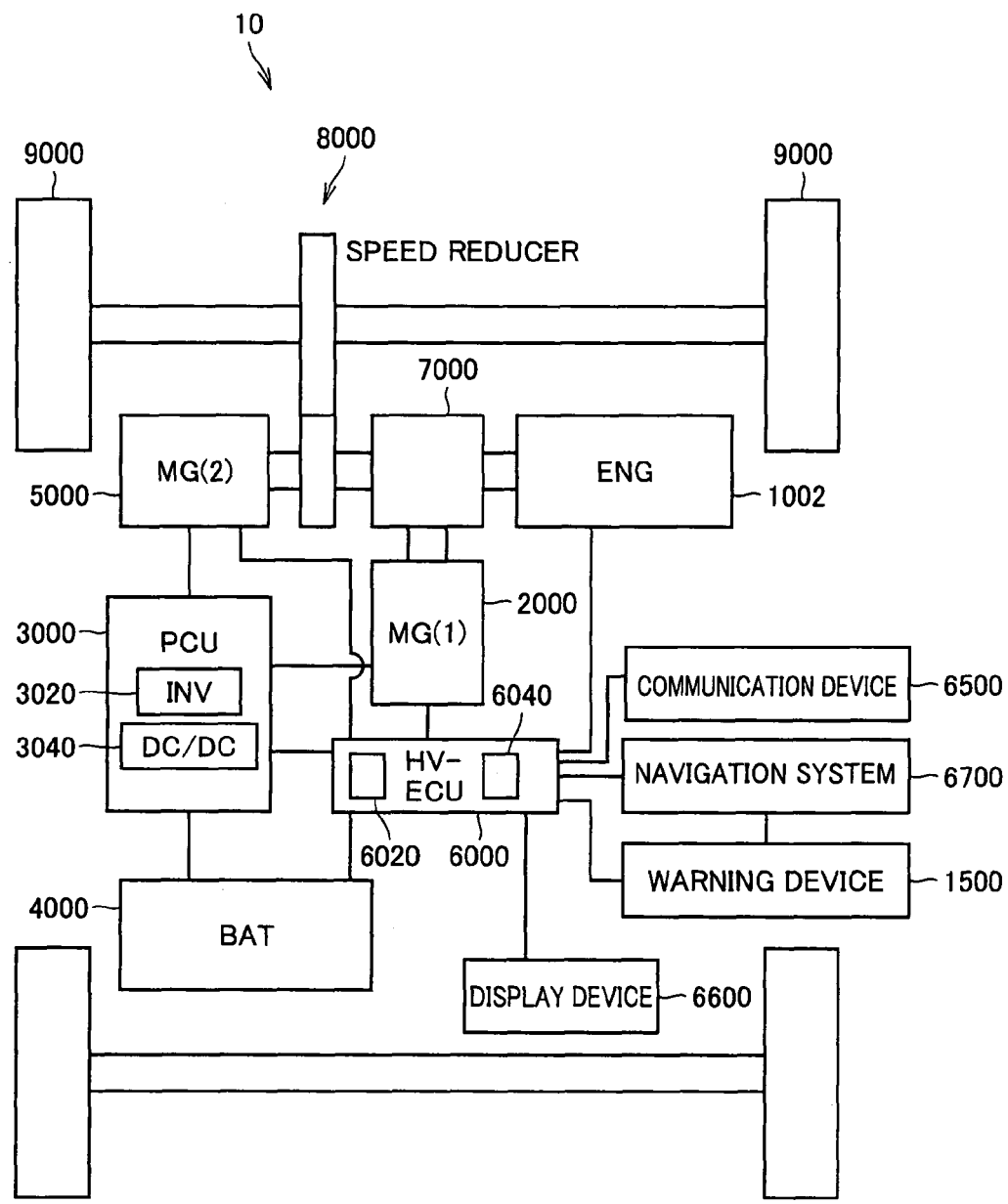
FIG. 25 is a block diagram showing a structure of a hybrid car mounted with a vehicle warning device according to a fourteenth embodiment of the invention.

As shown in FIG. 25, a hybrid vehicle 10 (hereafter simply referred to as "vehicle") mounted with a warning device 1500 that is a vehicle warning device according to the present embodiment includes an engine 1002, a Motor Generator (hereafter abbreviated as MG) (1) 2000, a PCU (Power Control Unit) 3000, a battery 4000 as an electric storage device, an MG (2) 5000, a communication device 6500, a display device 6600, and an HV-ECU (Hybrid Vehicle Electronic Control Unit) 6000 connected to all of them.

Engine 1002 that is an "internal combustion engine" burns an air-fuel mixture of fuel and air and rotates a crankshaft (not shown) to generate a driving force. The driving force generated by engine 1002 is split by a power split device 7000 into two paths. One of them is a path for driving wheels 9000 through a speed reducer 8000. The other is a path for driving MG (1) 2000 to generate electricity.

MG (1) 2000 is driven by mechanical power of engine 1002 split by power split device 7000 to generate electricity. Electric power generated by MG (1) 2000 is used properly according to a driving state of the vehicle and an SOC (State Of Charge) of battery 4000. During normal traveling or abrupt acceleration, for example, the electric power generated by MG (1) 2000 is supplied to MG (2) 5000 via PCU 3000.

On the other hand, if the SOC of battery 4000 is lower than a predetermined value, the electric power generated by MG (1) 2000 is converted from alternating-current electric power into direct-current electric power by an inverter 3020 of PCU 3000 and stored in battery 4000 after its voltage is adjusted by a converter 3040.

Battery 4000 as the electric storage device is an assembled battery formed by connecting a plurality of battery modules in series, each battery module being formed by integrating a plurality of battery cells. As the electric storage device, it is also possible to use a capacitor (condenser) instead of battery 4000.

MG (2) 5000 that is an "electric motor" functioning as a driving force source is a three-phase AC rotating electrical machine. MG (2) 5000 drives by at least one of the electric power stored in battery 4000 and the electric power generated by MG (1) 2000.

A driving force of MG (2) 5000 is transmitted to wheels 9000 via speed reducer 8000. Thus, MG (2) 5000 assists engine 1002 to cause the vehicle to travel or causes the vehicle to travel only by the driving force from MG (2) 5000.

At a time of regenerative braking of the vehicle, MG (2) 5000 is driven by wheels 9000 through speed reducer 8000 and MG (2) 5000 is actuated as a power generator. Thus, MG (2) 5000 is actuated as a regenerative brake for converting braking energy into electric power. The electric power generated by MG (2) 5000 is stored in battery 4000 via inverter 3020 and converter 3040.

HV-ECU 6000 includes a CPU (Central Processing Unit) 6020 and a memory 6040. CPU 6020 performs arithmetic processing based on a traveling state of the vehicle, an accelerator pedal position, a brake pedal press-down amount, a shift position, the SOC of battery 4000, maps and programs stored in memory 6040, and the like. In this way, HV-ECU 6000 controls devices mounted on the vehicle so as to bring the vehicle into a desired driving state.

Communication device 6500 carries out bidirectional information communication with a base station (not shown) outside vehicle 10. For example, communication device 6500 receives the information from a communication network via the base station. The communication network may be the Internet or a private communication line. In the embodiment, a known technique may be used for communication device 6500 and therefore the device will not be described in detail. Display device 6600 is provided in a vehicle interior and displays various pieces of information. Display device 6600 is an LCD (Liquid Crystal Display), for example.

Navigation system 6700 detects a present location of vehicle 10 by utilizing the GPS (Global Positioning System). A signal corresponding to the detected present location is sent to HV-ECU 6000. In navigation system 6700, map information around the present location of the own vehicle is stored in advance. Moreover, in navigation system 6700, a location on the map and entered by input from an operating portion (not shown) provided to navigation system 6700 or a location on the map and entered in advance are stored.

Next, by using FIG. 26, a structure of warning device 1500 shown in FIG. 25 will be described in further detail.

Figure 26:
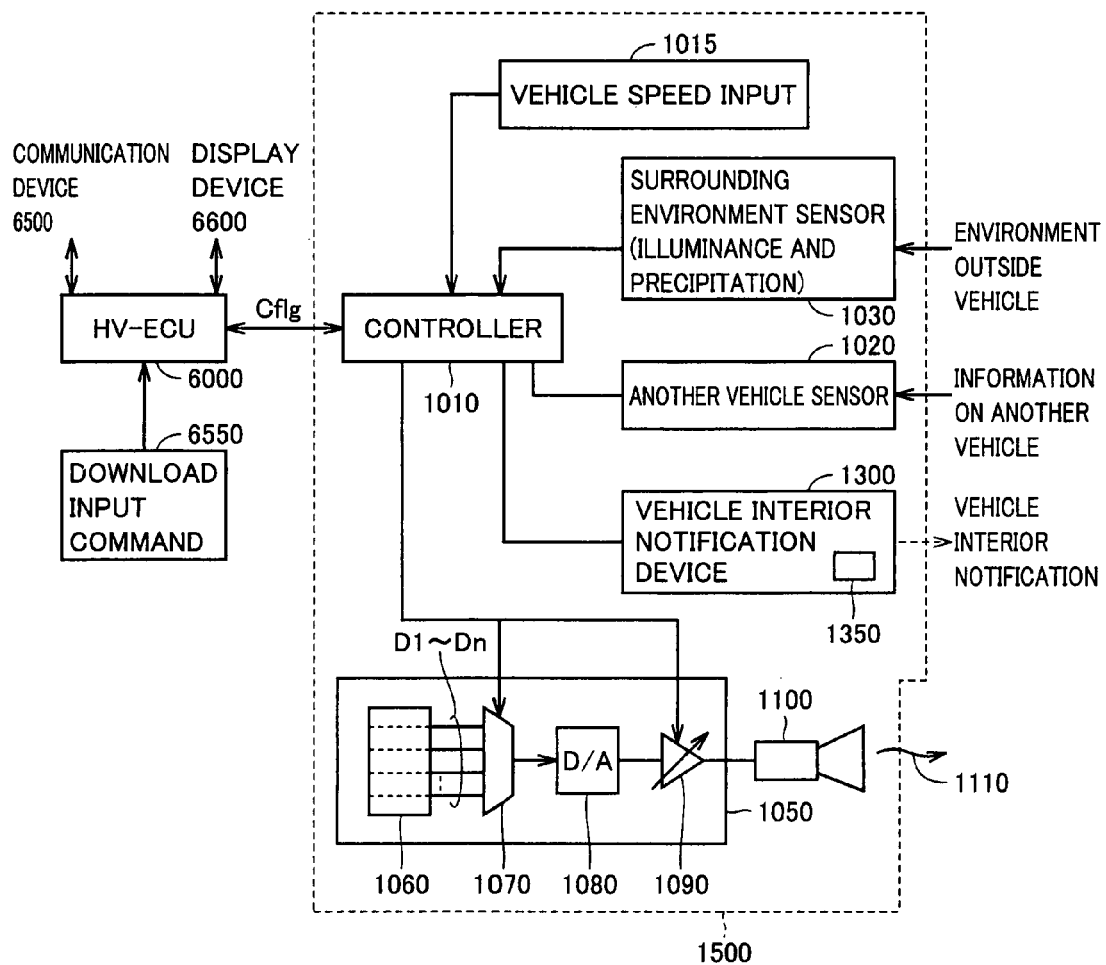
FIG. 26 is a block diagram showing a structure of the vehicle warning device according to the fourteenth embodiment.

With reference to FIG. 26, warning device 1500 includes a controller 1010, an another vehicle sensor 1020, a surrounding environment sensor 1030, a warning setting device 1050, a warning output device 1100, and a vehicle interior notification device 1300 including a memory portion 1350.

The controller 1010 is connected to be able to communicate with HV-ECU 6000 and controls output of a warning 1110 from warning device 1500. As shown in FIG. 25, HV-ECU 6000 can communicate with communication device 6500 and display device 6600 and can receive a download input command 6550 from a passenger of vehicle 10. The controller 1010 can detect a vehicle speed based on a vehicle speed input 1015 corresponding to taking in of detection data of a speedometer (not shown) provided to vehicle 10.

Another vehicle sensor 1020 can be formed of millimeter-wave radar for measuring an inter-vehicle distance and is structured to be able to carry out sensing of a leading vehicle in a certain distance range in a direction of travel of own vehicle and measurement of a distance between the sensed vehicle ahead and own vehicle. As another vehicle sensor 1020, an arbitrary mechanism known to a person skilled in the art can be employed as long as the above function can be achieved by the mechanism. Information obtained by another vehicle sensor 1020 is sent to controller 1010.

Surrounding environment sensor 1030 is provided to detect an environment outside the vehicle represented by illuminance and precipitation around vehicle 10. As surrounding environment sensor 1030, an arbitrary mechanism known to the person skilled in the art can be employed. Information obtained by surrounding environment sensor 1030 is sent to controller 1010.

Warning setting device 1050 controls a warning output from warning output device 1100 based on a control command from controller 1010. Warning setting device 1050 includes a memory portion 1060, a readout selecting portion 1070, a playback portion 1080, and an amplifying portion 1090.

Memory portion 1060 can store a plurality of kinds of data D1 to Dn (n: an integer equal to or greater than 2) respectively corresponding to different types of warning 1110. Readout selecting portion 1070 selectively reads one of the plurality of kinds of data D1 to Dn based on the control command (warning selection command) from controller 1010. Playback portion 1080 converts data read by readout selecting portion 1070 into an analog voltage signal for giving warning 1110. Amplifying portion 1090 amplifies the analog voltage signal played back by playback portion 1080 according to a control command (amplification factor command) from controller 1010. Warning output device 1100 outputs warning 1110 of an audible alert type, for example, based on the analog voltage signal output from amplifying portion 1090.

In other words, warning 1110 output from warning output device 1100 can be set of a predetermined type based on data D1 to Dn stored in memory portion 1060. Especially when a horn (not shown) that is sounded in response to an operation switch (not shown) provided to a driver's seat is provided in addition to warning device 1500, warning 1110 is set to satisfy at least one of a condition that it has a volume level equal to or lower than the horn and a condition that it is a tone less irritant to a human auditory sense, which makes it possible to attract attention of people around the vehicle without making them unpleasant. From such a viewpoint, warning 1110 may be a melody, music, dummy traveling noise, a siren, and the like respectively generated by data D1 to Dn.

Readout selecting portion 1070 may be achieved by software processing by addressing in memory portion 1060 without providing a hardware mechanism. As a concrete structure of amplifying portion 1090, a disclosure of FIG. 4 in Japanese Patent Laying-Open No. 7-182587 is incorporated.

In other words, with the warning device according to the invention, it is possible to select a kind of warning and to set an output level of warning in response to the control commands from controller 1010.

HV-ECU 6000 can communicate with a base station (not shown) through communication device 6500 in response to a download input command 6550 from the passenger in the vehicle. Through communication with the base station, it is possible to receive (download) data corresponding to the type of warning 1110. Downloaded data are stored as data D1 to Dn in memory portion 1060 in warning setting device 1050 thorough controller 1010. Thus, it is possible to set warning 1110 from warning device 1500 of the type desired by the driver by downloading.

Vehicle interior notification device 1300 informs a vehicle interior that warning 1110 has been generated when warning 1110 is generated from warning output device 1100 in response to the control command from controller 1010.

From HV-ECU 6000 to controller 1010, a warning necessity flag Cflg set based on the traveling state of vehicle 10 is sent. Controller 1010 controls actuation of warning device 1500 according to warning necessity flag Cflg.

Warning necessity flag Cflg is a flag for setting necessity of automatically generating a warning so as to make approach of own vehicle recognized by people around the vehicle according to a traveling of the vehicle 10. To put it concretely, HV-ECU 6000 sets warning necessity flag Cflg according to a traveling noise level of vehicle 10. In other words, warning necessity flag Cflg is turned on when the traveling noise level of vehicle 10 is low and it is determined that there is a necessity to automatically generating the warning and flag Cflg is turned off in other cases.

For example, when vehicle 10 is in a traveling mode only by the driving force of MG (2) that is a driving electric motor or when a speed of engine 1002 is equal to or lower than a predetermined speed, warning necessity flag Cflg is turned on.

Alternately, when a traveling noise parameter PS calculated according to the following expression (1) based on the speed of MG (2) and the speed of engine 1002 is equal to or lower than a reference value, warning necessity flag Cflg is turned on.

$$PS = k1 \cdot NE1 + k2 \cdot NE2 \tag{1}$$

Here, k1 and k2 are predetermined weighting constants, NE1 is the speed of engine 1002, and NE2 is the speed of MG (2). By setting proper constants k1, k2 based on relationships between the speeds NE1, NE2 and the traveling noise in advance by experiment or the like, it is possible to estimate the vehicle traveling noise based on the traveling noise parameter PS.

As a result, warning device 1500 in the embodiment of the invention can generate warning 1110 for making approach of own vehicle recognized by people around the vehicle in response to setting of warning necessity flag Cflg in HV-ECU 6000. Because warning 1110 of the desired type can be generated according to the data stored in memory portion 1060, it is possible to make approach of own vehicle recognized without excessively attract attention of people around the vehicle to make them unpleasant.

Out of structures shown in FIG. 26, warning output device 1100 corresponds to a "warning output portion" in the invention and vehicle interior notification device 1300 corresponds to a "notification portion" in the invention. Communication device 6500 corresponds to a "communication portion" in the invention and memory portions 1060, 1350 corresponds to a "memory portion" in the invention.

Next, with reference to FIG. 27, the control configuration of the program executed in controller 1010 of warning device 1500 according to the fourteenth embodiment of the invention will be described.

In step S20, controller 1010 determines whether or not the traveling noise of vehicle 10 is equal to or lower than the predetermined level based on warning necessity flag Cflg from HV-ECU 6000. If warning necessity flag Cflg is "OFF" (NO determination in S20), output of the warning from warning device 1500 is not carried out to end the control.

On the other hand, if warning necessity flag Cflg is "ON" (YES determination in step S20), step S40 for controlling generation of warning 1110 from warning output device 1100 is carried out. Step S40 includes a group of steps S42 to S56 which will be described below.

In step S42, controller 1010 obtains data sensed by another vehicle sensor 1020 to thereby detect a vehicle ahead existing in a predetermined range from own vehicle and a distance between own vehicle and the vehicle ahead.

Moreover, in step S44, controller 1010 obtains data sensed by surrounding environment sensor 1030 to detect environment around vehicle 10, e.g., surrounding environmental conditions such as illuminance and precipitation related to recognition of the vehicle by pedestrians.

In step S46, controller 1010 sets a reference distance according to the surrounding environmental conditions obtained in step S44. The reference distance is set of a relatively large value under environmental conditions such as low illuminance around vehicle 10 and a rainfall (precipitation>reference value) which make it difficult for the pedestrians to recognize the vehicle. By contrast, the reference distance is set of a relatively small value under environmental conditions such as high illuminance around vehicle 10 and no rainfall which make it easy for the pedestrians to recognize the vehicle.

In step S50, controller 1010 determines whether or not another vehicle (vehicle ahead) exists within the reference distance based on the information detected in step S42, the reference distance determined in step S46.

If there is no other vehicle within the reference distance (NO determination in step S50), controller 1010 carries out step S56 to carry out output setting of warning 1110 at the reference level. In other words, a warning output level (volume level) is set in view of a purpose of making existence of vehicle 10 recognized by the surrounding people.

On the other hand, when another vehicle exists within the reference distance (YES determination in step S50), controller 1010 further determines whether or not vehicle 10 is at the start time in step S52. The determination in step S52 can be carried out based on a selected shift position and brake operation (ON/Off of the parking brake, a press-down amount of the brake pedal).

At the start time of vehicle 10 (YES determination in step S52), controller 1010 carries out step S56 to carry out output setting of warning 1110 at the reference level, i.e., so that it is possible to make existence of own vehicle recognized by people around vehicle 10 even if another vehicle exists within the reference distance.

On the other hand, when the vehicle is not at the start time (NO determination in step S52), controller 1010 carries out the warning output setting so that the output level of warning 1110 becomes equal to or lower than the reference level in step S56 or so as to stop output of warning 1110 (step S54) based on existence of another vehicle within the reference distance in step S54.

In step S60, controller 1010 issues the warning control commands according to the warning output setting (step S54 or S56) carried out in step S40 and sends it to warning setting device 1050. Out of the control commands, an amplification factor command in amplifying portion 1090 is set to correspond to the reference level (step S56) or a lower level (step S54). By a command, "amplification factor=0", it is possible to stop output of warning 1110. Out of the control commands, the warning selection command, i.e., readout selection command in readout selecting portion 1070 is basically set according to a selection by the driver.

Warning output device 1100 generates warning 1110 according to the output settings in step S40 out of vehicle 10 at the warning control commands from controller 1010. Moreover, in step S62, vehicle interior notification device 1300 informs that warning 1110 has been output from warning output device 1100 in the vehicle interior. The notification in the vehicle interior may be carried out by display on display device 6600 instead of above-described generation of the predetermined sound from a speaker (not shown) in the vehicle. In this way, the passenger (and especially driver) in vehicle 10 can know that warning 1110 for making own vehicle recognized has been output.

Figure 28:
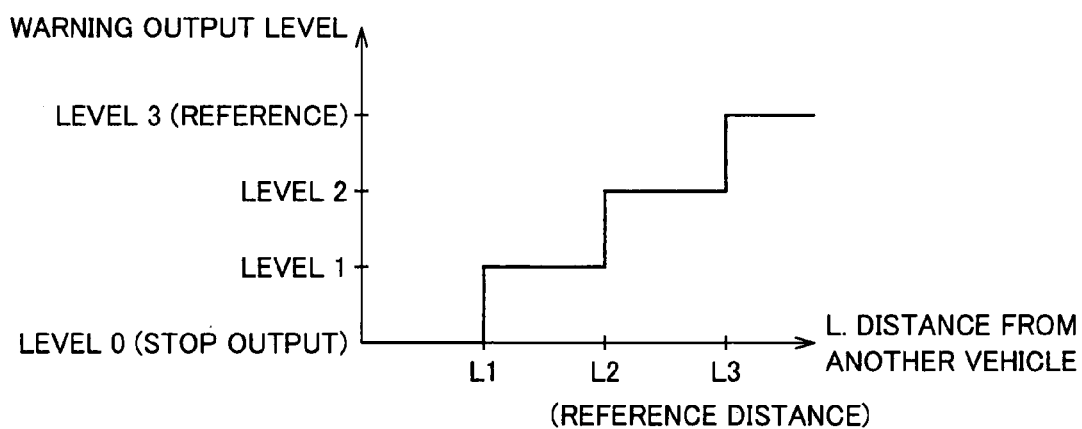
FIG. 28 is a conceptual diagram showing an example of a warning output setting by the vehicle warning device according to the fourteenth embodiment.

FIG. 28 shows an example of the warning output setting in step S40.

A horizontal axis in FIG. 28 represents a distance from another vehicle (vehicle ahead) and a vertical axis represents an output level of warning 1110.

If the distance from another vehicle is a reference distance L3 or longer, the output level of warning 1110 is set of a reference level (level 3) in step S56. On the other hand, during execution of step S54, the output level of warning 1110 is set of a level 2, a level 1, or a level 0 (stop of output) lower than level 3 (reference level) according to distance L from another vehicle. For example, a range of level equal to or lower than reference distance L3 is subdivided. Output level of warning 1110 is set of level 2 in a range of L2≦L<L3 and set of lower level 1 in a range of L1≦L<L2. Furthermore, in a range of L<L1, output of warning 1110 is stopped. In this way, it is possible to set output of warning 1110 at the plurality of levels according to the distance from another vehicle (vehicle ahead).

Figure 27:
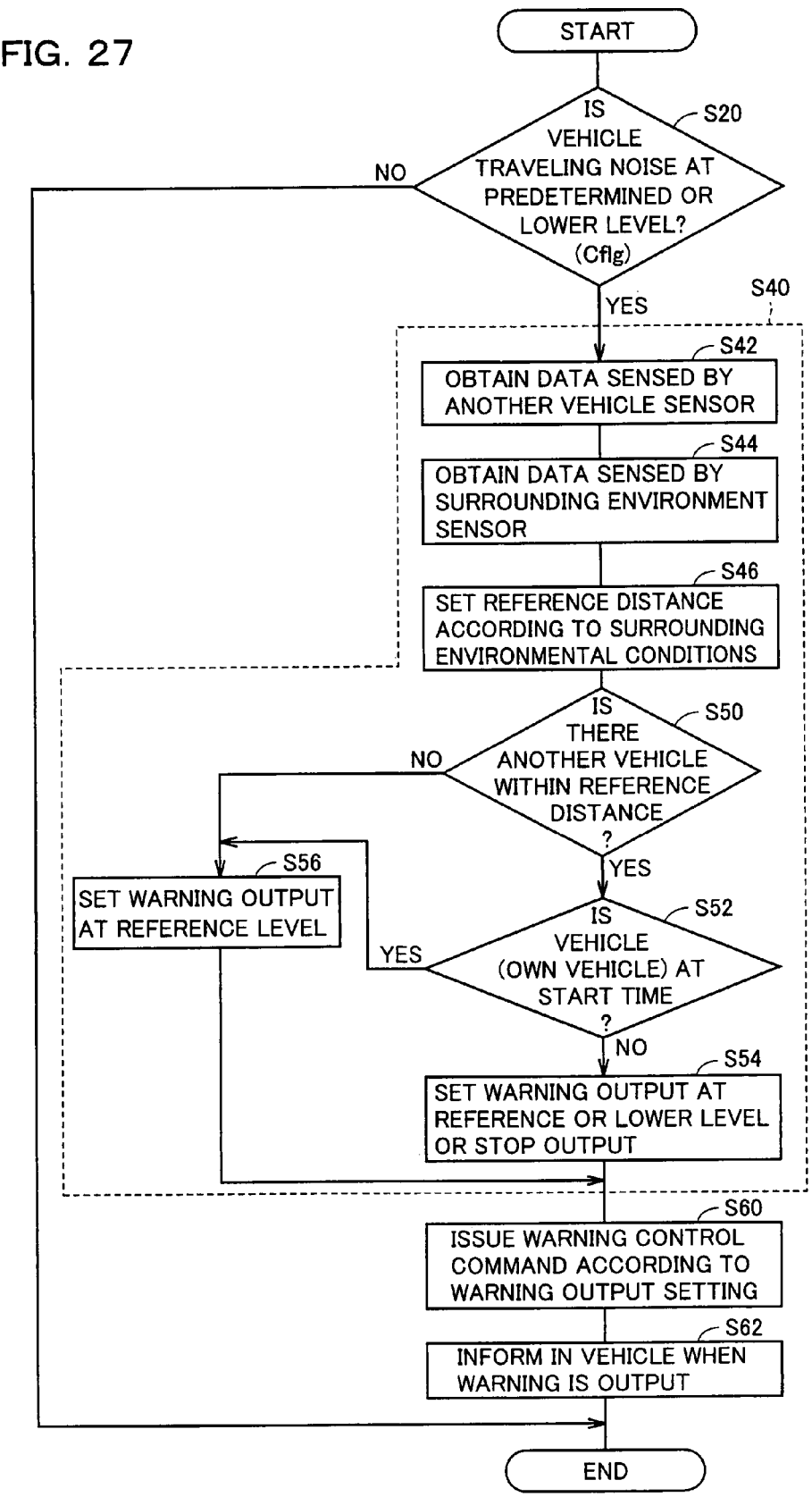
FIG. 27 is a flow chart showing a control configuration of a program executed in a controller of the vehicle warning device according to the fourteenth embodiment.

By following the flow chart shown in FIG. 27, warning device 1500 of the embodiment can generate warning 1110 for making existence of own vehicle recognized by the surrounding people during traveling with quiet traveling noise of a hybrid car or the like and stops generation of warning 1110 or reduces the output level of warning 1110 when the vehicle ahead exists within the predetermined distance. In such a case, even if output of warning 1110 is reduced or stopped, it is possible to make existence of vehicles including own vehicle recognized by surrounding pedestrians or the like by utilizing existence of the vehicle ahead. Therefore, it is possible to prevent excessively attracting attention to make the people around the vehicle unpleasant due to further generation of warning 1110 from own vehicle in such circumstances.

On the other hand, at the start time of the vehicle when there is a special necessity for making existence of own vehicle recognized by people around the vehicle, it is possible to generate warning 1110 at the predetermined reference level for making existence of own vehicle recognized by the surrounding people regardless of presence or absence of another vehicle within the reference distance. As a result, it is possible to sufficiently attract attention of each person around the vehicle at the start time of vehicle 10.

Moreover, setting of the reference distance used for determination in step S50 is variable according to the environmental conditions related to recognition of the vehicle by the pedestrians around vehicle 10. Therefore, the reference distance can be set of a long distance in a situation where recognition of the vehicle is difficult for the pedestrians to actively attract attention by warning 1110. On the other hand, the reference distance can be set of a short distance in a situation where recognition of the vehicle is easy for the pedestrians to restrict generation of warning 1110 to prevent making surrounding people unpleasant.

Next, in FIG. 29, a variation of a control configuration of a program executed in controller 1010 in warning device 1500 of the fourteenth embodiment will be described.

Figure 29:
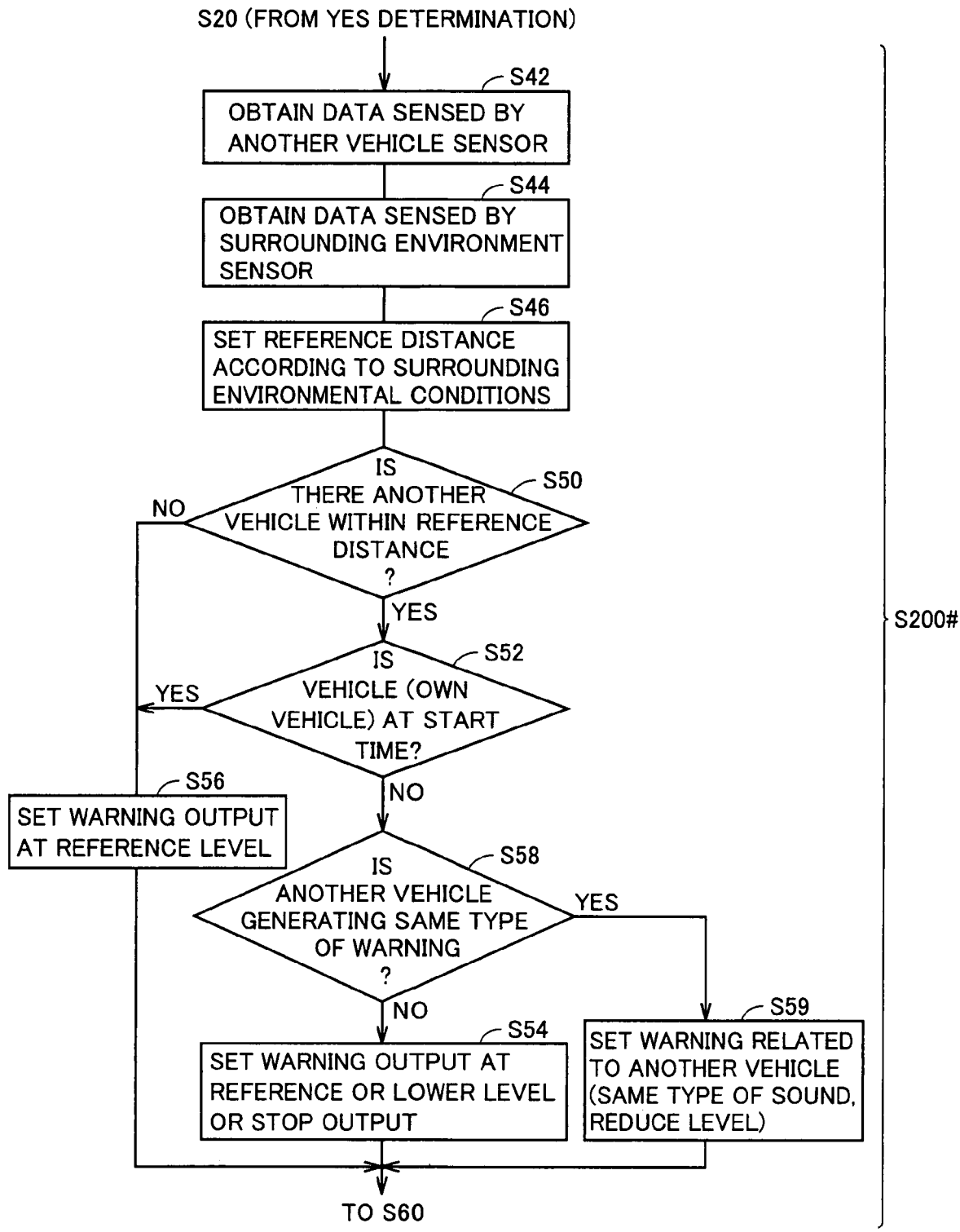
FIG. 29 is a flow chart showing a variation of a control configuration of a program executed in a controller of the vehicle warning device according to the fourteenth embodiment.

In FIG. 29, step S200# that can be executed instead of step S40 in the flow chart in FIG. 27.

If a comparison is made between FIG. 29 and FIG. 27, step S200# further includes steps S58 and S59 in addition to steps S42 to S56 in step S40 shown in FIG. 27.

Step S58 is carried out prior to step S54 at the time of NO determination in step S52. In other words, step S58 is carried out when the vehicle is not at the start time and there is another vehicle within the reference distance. In step S58, whether or not another vehicle existing within the reference distance is generating the same or the same type of warning 1110 as vehicle 10 is determined. The determination in step S58 can be made based on communication between the vehicles or information communication with a public network through communication device 6500.

If another vehicle (vehicle ahead) is also generating the same or the same type of warning 1110 (YES determination in step S58), the controller carries out output setting of the warning related to another vehicle in step S59.

In step S59, controller 1010 controls output settings of warning 1110 according to a relationship between the warning generated by another vehicle and warning 1110 of own vehicle. For example, a sound related to warning 1110 generated by the vehicle ahead and specifically the same type of or the same sound is selected as warning 1110. Furthermore, output setting of warning 1110 can be carried out so as to shift phase of the same kind of or the same sound from that of another vehicle (e.g., slightly delay the melody). The output level of warning 1110 is set of a level lower than the reference level.

By the processings in steps S58 and S59, it is possible to suppress unpleasant feelings given to the surrounding people by different melodies and meaningful sounds overlapping each other when another vehicle (vehicle ahead) mounted with the same type of warning device is generating the same type of warning 1110.

On the other hand, if determination in step S58 is NO and another vehicle (vehicle ahead) does not include the same type of warning device or is not giving the same warning 1110, controller 1010 carries out output setting of warning 1110 in step S54 similar to that in FIG. 27.

By following the flow chart shown in FIG. 29, when vehicle 10 travels to follow the vehicle ahead mounted with the same warning device 1500 and generating warning 1110, the vehicle travels while generating the same kind of or the same sound (warning 1110) as that of the vehicle ahead and therefore unpleasant sounds which are mixture of many types of sounds are not generated around the vehicle. As a result, it is possible to make existence of own vehicle recognized by the surrounding people without increasing unpleasant feelings given to the people around the vehicle.

Correspondences between the flow charts shown in FIG. 27 and FIG. 29 and the structures of the invention will be described. Step S20 corresponds to a "situation determination portion" in the invention and steps S40 and S200# correspond to a "warning control portion" in the invention. Step S54 corresponds to a "warning restricting portion" in the invention and step S56 corresponds to a "warning setting portion" in the invention. Step S52 corresponds to a "restriction prohibiting portion" in the invention and steps S58, S59 correspond to a "warning regulating portion" in the invention. Step S44 corresponds to a "state detecting portion" in the invention and step S46 corresponds to a "reference distance setting portion" in the invention.

Fifteenth Embodiment

In a fifteenth embodiment, an actuation command configuration of the vehicle warning device according to the fourteenth embodiment will be described.

Figure 30:
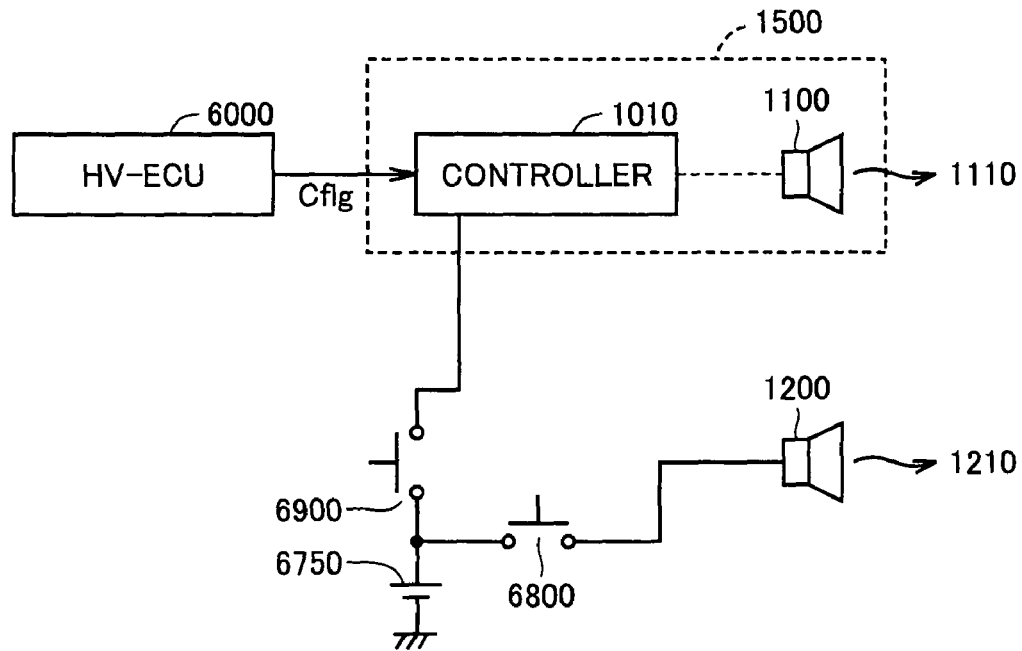
FIG. 30 is a block diagram showing an example of a structure of a first actuation command of a vehicle warning device according to a fifteenth embodiment.

FIG. 30 shows an example of a first actuation command configuration of the vehicle warning device according to the fifteenth embodiment.

With reference to FIG. 30, vehicle 10 is provided with a horn sound generating device 1200 separately from warning device 1500. Horn sound generating device 1200 generates horn sound 1210 when it is connected to a power supply 6750 in response to operation of a horn switch 6800. For example, horn sound 1210 is a horn sound generated when horn sound generating device 1200 supplies compressed air in response to supply from power supply 6750. In other words, horn sound 1210 has a volume level equal to or higher than the legal standard of so-called "klaxon" provided to general automobiles other than the hybrid car.

On the other hand, warning 1110 output from warning device 1500 is set to satisfy at least one of a condition that it has a volume level equal to or lower than horn sound 1210 and a condition that it is a tone less irritant to the human auditory sense. In this way, it is possible to attract attention of the people around the vehicle by warning 1110 without making them unpleasant. From such a viewpoint, warning 1110 may be of types such as melody, music, and dummy traveling noise, for example.

Moreover, a warning switch 6900 for actuating warning device 1500 is disposed so that controller 1010 is connected to power supply 6750 in response to operation of warning switch 6900. Thus, controller 1010 can sense operation of warning switch 6900.

As described already, warning necessity flag Cflg is sent to controller 1010 from HV-ECU 6000. Controller 1010 controls output of warning 1110 according to warning necessity flag Cflg and by following the flow charts shown in FIG. 27 and FIG. 29.

Furthermore, controller 1010 outputs warning 1110 at a predetermined level (e.g., reference level) independently of the control configuration following the flow charts shown in FIG. 27 and FIG. 29 when operation of warning switch 6900 is sensed.

It is preferable that warning switch 6900 is disposed in such a position that it can be operated from a passenger's seat (not shown) of vehicle 10. By disposing warning switch 6900 in such a position, it is possible to generate warning to the people around the vehicle by operation by the passenger seated in the passenger's seat.

Figure 31:
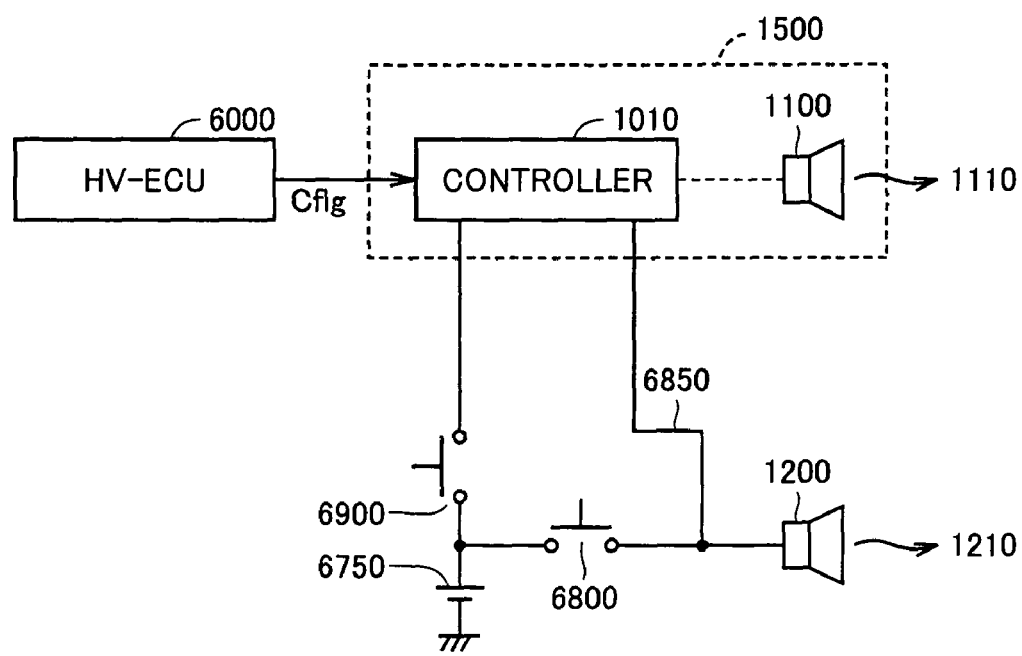
FIG. 31 is a block diagram showing an example of a structure of a second actuation command of a vehicle warning device according to the fifteenth embodiment.

As shown in FIG. 31, it is also possible to further provide a route 6850 through which controller 1010 is connected to power supply 6750 in response to operation of horn switch 6800. In the configuration in FIG. 31, warning 1110 as well as horn sound 1210 is output in response to operation of horn switch 6800.

As shown in FIG. 30 or FIG. 31, if warning device 1500 can be actuated in response to input to the operation switches (horn sound switch 6800 and warning switch 6900), it is possible to output warning 1110 different from horn sound 1210 by operation by the passenger of vehicle 10 in addition to when HV-ECU 6000 determines that the traveling noise of vehicle 10 is quiet. As a result, it is possible to more reliably output the warning to the people around the vehicle by warning device 1500 to thereby more reliably make approach of vehicle 10 recognized to attract attention.

Correspondences between structures shown in the fifteenth embodiment and structures of the invention will be described. Horn switch 6800 and warning switch 6900 correspond to "operating portions" in the invention. Especially, horn switch 6800 corresponds to the "first operating portion" and warning switch 6900 corresponds to the "second operating portion".

The embodiments disclosed this time are examples in all points and should not be considered restrictive. The scope of the invention is not defined in the above description but is defined in claims and includes meanings equivalent to the claims and all modifications in the scope of claims.

The invention claimed is:

1. A vehicle warning device, the warning device being for a vehicle mounted with a driving electric motor and an internal combustion engine, the device comprising:
    a first horn portion for generating a first horn sound having a volume level satisfying the legal standard;
    a second horn portion for generating a second horn sound satisfying at least one of a condition that it has a volume level equal to or lower than that of said first horn sound and a condition that it is of a different type from said first horn sound;
    a control portion for controlling said second horn portion, wherein
        said control portion controls said second horn portion to generate said second horn sound during traveling by a driving force of said driving electric motor or at a start time, and
    an illuminance detecting portion for detecting illuminance around said vehicle, wherein
    said control portion suppresses generation of said second horn sound according to said detected illuminance.

2. A vehicle warning device, the warning device being for a vehicle mounted with a driving electric motor and an internal combustion engine, the device comprising:
    a first horn portion for generating a first horn sound having a volume level satisfying the legal standard;
    a second horn portion for generating a second horn sound satisfying at least one of a condition that it has a volume level equal to or lower than that of said first horn sound and a condition that it is of a different type from said first horn sound;
    a state detecting portion for detecting a state of the vehicle related to noise generated from said vehicle; and
    a control portion for controlling said second horn portion, wherein
    said control portion controls said second horn portion to generate said second horn sound according to said state during traveling of said vehicle.

3. The vehicle warning device according to claim 2, wherein
    said state detecting portion includes one or both of a vehicle speed detecting portion for detecting a vehicle speed of said vehicle and a speed detecting portion for detecting a speed of said internal combustion engine.

4. A vehicle warning device, the warning device being for a vehicle mounted with a driving electric motor and an internal combustion engine, the device comprising:
    a first horn portion for generating a first horn sound having a volume level satisfying the legal standard;
    a second horn portion for generating a second horn sound satisfying at least one of a condition that it has a volume level equal to or lower than that of said first horn sound and a condition that it is of a different type from said first horn sound; and
    an operating portion for operating said first horn portion and said second horn portion, wherein
    said operating portion includes a generating portion for generating at least one of said first horn sound and said second horn sound according to an operating force.

5. The vehicle warning device according to claim 4, wherein
    said first horn portion includes a first horn sound generating portion for generating said first horn sound when it is electrically connected to a power supply mounted in said vehicle,
    said second horn portion includes a second horn sound generating portion for generating said second horn sound when it is electrically connected to said power supply, and
    said operating portion includes:
    a first conducting portion for electrically connecting said first horn portion and said power supply when a predetermined or greater operating force is applied to the portion; and
    a second conducting portion for electrically connecting said second horn portion and said power supply if said operating force is smaller than said predetermined operating force.

6. A vehicle warning device, the warning device being for a vehicle mounted with a driving electric motor and an internal combustion engine, the device comprising:
    a first horn portion for generating a first horn sound having a volume level satisfying the legal standard; and
    a second horn portion for generating a second horn sound satisfying at least one of a condition that it has a volume level equal to or lower than that of said first horn sound and a condition that it is of a different type from said first horn sound;
    said vehicle is mounted with a communication device that can communicate with a base station outside said vehicle, and
    said warning device further comprises:
    a receiving portion for receiving data corresponding to a type of said sound via said communication device; and
    a type setting portion for setting said type based on said received data.

7. A vehicle warning device, the warning device being for a vehicle mounted with a driving electric motor and an internal combustion engine, the device comprising:
    a first horn portion for generating a first horn sound having a volume level satisfying the legal standard;
    a second horn portion for generating a second horn sound satisfying at least one of a condition that it has a volume level equal to or lower than that of said first horn sound and a condition that it is of a different type from said first horn sound;
    a warning portion for generating a warning to surroundings of said vehicle;
    a detecting portion for detecting a present location of said vehicle;
    a state detecting portion for detecting a state of the vehicle related to noise generated from said vehicle; and
    a control portion for controlling said warning portion to generate said warning, wherein
    said control portion includes a warning control portion for controlling said warning portion to generate said warning according to said state if the location of said vehicle satisfies a predetermined condition during traveling of said vehicle,
    said vehicle is mounted with a horn device for generating the first horn sound, and
    said warning portion generates the second horn sound satisfying at least one of a condition that it has a volume level equal to or lower than that of said first horn sound and a condition that it is of a different type from said first horn sound.

8. The vehicle warning device according to claim 7, wherein said state detecting portion further includes a traveling state detecting portion for detecting that said vehicle is traveling by a driving force of said driving electric motor.

9. The vehicle warning device according to claim 7, wherein
the plurality of warning portions are provided in said vehicle, and
said control portion selects at least one of said warning portions to control it to generate said warning if said predetermined condition is satisfied.

10. The vehicle warning device according to claim 7, said warning device further comprising:
an operating portion for operating said horn device and said warning portion, wherein
said operating portion includes a generating portion for generating at least one of said first horn sound and said second horn sound according to an operating force.

11. The vehicle warning device according to claim 7, said warning device further comprising:
a warning operating portion provided at a periphery of a passenger's seat of said vehicle for operating said warning portion.

12. A vehicle warning device, the warning device being for a vehicle mounted with a driving electric motor and an internal combustion engine, the device comprising:
a first horn portion for generating a first horn sound having a volume level satisfying the legal standard;
a second horn portion for generating a second horn sound satisfying at least one of a condition that it has a volume level equal to or lower than that of said first horn sound and a condition that it is of a different type from said first horn sound;
a warning portion for generating a warning to surroundings of said vehicle;
a person detecting portion for detecting a person around said vehicle; and
a control portion for controlling said warning portion to generate said warning, wherein
said control portion includes a warning control portion for controlling said warning portion to generate said warning according to a traveling state of said vehicle if said person is detected,
said vehicle is mounted with a horn device for generating the first horn sound, and
said warning portion generates the second horn sound satisfying at least one of a condition that it has a volume level equal to or lower than that of said first horn sound and a condition that it is of a different type from said first horn sound; and
a state detecting portion for detecting a state of the vehicle related to noise generated from said vehicle, wherein
said control portion controls said warning portion to generate said warning according to said state if said person is detected during traveling of said vehicle.

13. A vehicle warning device, the warning device being for a vehicle mounted with a driving electric motor and an internal combustion engine, the device comprising:
a first horn portion for generating a first horn sound having a volume level satisfying the legal standard;
a second horn portion for generating a second horn sound satisfying at least one of a condition that it has a volume level equal to or lower than that of said first horn sound and a condition that it is of a different type from said first horn sound;
a situation determination portion for determining that generation of the warning for making existence of the vehicle recognized by surrounding people is necessary when traveling noise of said vehicle is at a predetermined or lower level;
a warning output portion for outputting the warning to the surroundings of said vehicle when it is determined by said situation determination portion that output of said warning is necessary;
another vehicle sensing portion for sensing another vehicle around or in a vicinity of the vehicle;
a control portion for controlling generation of the warning from said warning output portion according to a relationship between the vehicle and said another vehicle when said another vehicle is sensed by said another vehicle sensing portion; and
a warning generating portion for generating the first horn sound, wherein
said warning output portion outputs said warning as the second horn sound satisfying at least one of a condition that it has a volume level equal to or lower than that of said first horn sound and a condition that it is of a different type from said first horn sound.

14. The vehicle warning device according to claim 13, wherein
said control portion includes:
a warning setting portion for setting the warning output from said warning output portion at a reference level when a distance between the vehicle and said another vehicle is longer than a reference distance; and
a warning restricting portion for stopping the warning output from said warning output portion or reducing a level of the warning to a level lower than said reference level when the distance between the vehicle and said another vehicle is a reference or shorter distance.

15. The vehicle warning device according to claim 14, wherein
said control portion further includes a restriction prohibiting portion for prohibiting the stop or reduction of said warning by the warning restricting portion even if the distance between the vehicle and said another vehicle is the reference or shorter distance when a start of the vehicle is detected.

16. The vehicle warning device according to claim 14, further comprising:
a state detecting portion for detecting a situation of said vehicle, wherein
said control portion further includes a reference distance setting portion for setting said reference distance based on at least one of an environment related to recognition of the vehicle by a pedestrian detected by said state detecting portion and a speed of the vehicle.

17. The vehicle warning device according to claim 13, wherein
said control portion further includes a warning regulating portion for regulating generation of the warning from the warning output portion according to a relationship between a warning generated from said another vehicle and the warning generated from said warning output portion of the vehicle when a distance between the vehicle and said another vehicle is said reference or shorter distance.

18. The vehicle warning device according to claim 17, wherein
said warning regulating portion produces a command for outputting a warning from said warning output portion, the warning related to the warning generated from said another vehicle.

19. The vehicle warning device according to claim 17, wherein
said warning regulating portion controls generation of the warning from said warning output portion when another vehicle sensed by said another vehicle sensing portion is outputting said warning similar to that of the vehicle.

20. The vehicle warning device according to claim 13, wherein
said vehicle is mounted with an internal combustion engine and an electric motor as driving power sources, and
said situation determination portion determines necessity for outputting the warning based on at least one of a speed of said internal combustion engine and a speed of said electric motor.

21. The vehicle warning device according to claim 13, wherein
the warning generating portion generates the first horn sound in response to operation of a first operating portion.

22. The vehicle warning device according to claim 21, wherein
said warning device further comprises a second operating portion for generating said second horn sound and outputs said warning as said second horn sound in response to input to said second operating portion.

23. The vehicle warning device according to claim 21, wherein
said warning device outputs said warning as said second horn sound in response to input to said first operating portion.

* * * * *